(12) United States Patent
Takeichi et al.

(10) Patent No.: US 6,654,075 B1
(45) Date of Patent: Nov. 25, 2003

(54) LIQUID CRYSTAL DISPLAY DEVICE AND METHOD FOR FABRICATING THE SAME

(75) Inventors: Masatomo Takeichi, Yasu-gun (JP); Hiroaki Kitahara, Ohtsu (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/517,190

(22) Filed: Mar. 2, 2000

(30) Foreign Application Priority Data

May 13, 1999 (JP) .......................................... 11-133355

(51) Int. Cl.⁷ ...................... G02F 1/1343; G02F 1/1333
(52) U.S. Cl. ............................. 349/43; 349/44; 349/54
(58) Field of Search ............................ 349/43, 44, 54

(56) References Cited

U.S. PATENT DOCUMENTS

| | | | | |
|---|---|---|---|---|
| 4,634,227 A | * | 1/1987 | Nishimura et al. | 350/334 |
| 5,061,040 A | * | 10/1991 | Yaniv et al. | 359/60 |
| 5,274,483 A | * | 12/1993 | Itoh | 359/54 |

* cited by examiner

*Primary Examiner*—Toan Ton
(74) *Attorney, Agent, or Firm*—Robert M. Trepp, Esq.; McGinn & Gibb, PLLC

(57) ABSTRACT

A liquid crystal device (and method for forming the LCD) includes a first transparent substrate having a first surface and a second surface, and a second transparent substrate having a first surface and a second surface. The first transparent substrate and the second transparent substrate are arranged such that the first surface of the first transparent substrate faces the first surface of the second transparent substrate, and a liquid crystal material is enclosed between the first surface of the first transparent substrate and the first surface of the second transparent substrate. A pixel array, in which a plurality of pixel regions are arranged in row and column directions and data signals are applied to the pixel regions through data lines, is formed on the first surface of the first transparent substrate and the first surface of the second transparent substrate.

28 Claims, 27 Drawing Sheets

(A)  (B)

LIQUID CRYSTAL DISPLAY DEVICE AND METHOD FOR FABRICATING THE SAME

BACKGROUND OF THE INVENTION

1. Field of the Invention

The present invention generally relates to a liquid crystal display (LCD) device, and to a method for fabricating the LCD device.

2. Description of the Related Art

The LCD device has been used as a display device of a data processing apparatus, such as a desktop computer, a notebook computer, and as a display terminal of a television. FIG. 1 shows an array formed on one substrate of a conventional LCD device. In FIG. 1, a plurality of gate lines, a plurality of data lines, which are arranged in a perpendicular direction to the gate lines, and a plurality of pixels, each of which is formed at an intersection of the gate line and the data line, are formed on one glass substrate, for example, a lower glass substrate 2 shown in FIG. 2. Only four data lines (e.g., D1 through D4), and only four gate lines (e.g., G1 through G4) are shown in FIG. 1. The pixel includes a thin film transistor (TFT) 7 and a capacitor 8. The gate line is connected to a gate of the TFT 7, the data line is connected to a drain of the TFT, a source of the TFT is connected to one terminal of the capacitor, and the other terminal of the capacitor is connected to a reference potential.

A data line driver is connected to the data lines to apply the data pulses to the data lines, and a gate line driver is connected to the gate lines to sequentially apply the gate pulses to the gate lines. During the application of the gate pulse to one gate line, such as the gate line G1, the data line driver applies the data pulses to the data lines to display the image.

FIG. 2 shows a cross sectional structure of the conventional LCD device 1 along dotted line 2A–2B in FIG. 1. The conventional LCD device 1 includes a lower glass substrate 2, an upper glass substrate 3, a lower polarizer plate 4, an upper polarizer plate 5 and a backlight device 6. The data lines D1 through D4 and the gate lines G1 through G4 are formed on the lower glass substrate 2, but the gate lines are not shown in FIG. 2. The upper terminals or a display electrode of the capacitor 8, which is made of Indium Tin Oxide (ITO) layers 9, is formed in an area between the data lines. Passivation layers 10 are formed to cover the data lines and to isolate the ITO layers from the data lines.

An alignment layer 11 is formed to cover the entire structure. Black matrices 12 are formed on the upper glass substrate 3 to face the data lines, respectively. Red, green and blue color filters 13 are formed to face the ITO layers 9, respectively. An insulating layer 14 is formed on the color filters 13 to provide a flat surface. The ITO layer 15, which is called as a common electrode for operating as the lower electrode of the capacitor 8 shown in FIG. 1, is formed on the insulating layer 14. An alignment layer 16 is formed on the ITO layer 15. A twisted nematic liquid crystal is sandwiched between the lower alignment layer 11 and the upper alignment layer 16. A length L1 represents an aperture size defined by the adjacent black matrices 12, and a length L2 represents an overlap of the black matrix 12 and the ITO layer 9.

FIG. 3 shows a normally white mode operation of the LCD device 1. The backlight device 6 generates a white light. The polarizer plate 4 has a polarizing plane as shown by the vertical lines and passes the light parallel to the polarizing plane. The alignment layer 11 is rubbed in the vertical direction, the alignment layer 16 is rubbed in the horizontal direction, and the polarizer plate 5 has a polarizing plane in the horizontal direction. It is noted that the ITO layers 9 and 15 are not shown to simplify the drawing. FIG. 3(A) shows the case in which the voltage is not applied across the pixel electrode (e.g., the ITO layer 9), and the common electrode (e.g., the ITO layer 15 through the TFT 7), shown in FIG. 1, so that liquid crystal molecules 17 is twisted by 90 degrees between the pixel electrode 9 and the common electrode 15. In this case, the polarized light passing through the polarizer plate 4 is rotated by the 90 degrees through the twisted liquid crystal molecules 17, and passes through the polarizer plate 5, so that the white image is displayed.

When the voltage is applied across the ITO layer 9 and the ITO layer 15, the liquid crystal molecules 17 are aligned along the electric field, as shown in FIG. 3(B), so that the polarized light from the polarizer plate 4 passes through the liquid crystal molecules 17 without being rotated, whereby the polarized light is shut off by the polarizing plate 5, and the black image is displayed. In this manner, the operation mode, in which the white image is displayed when the voltage is not applied across the pixel electrode 9 and the common electrode 15, is called as the normally white mode.

However, the following problems are found in the conventional LCD device.

FIG. 4 shows a first problem in the conventional LCD device due to a dot defect or a line defect. The dot defect means that the pixel, for example the pixel P11, becomes inoperative since the gate electrode of the TFT is cut at a portion A. In the conventional technology, an additional connection B is formed to directly connect the data line D1 to the display electrode of the pixel P11. This technology, however, causes the following additional problem.

When the gate pulse is applied to the gate line G1 to activate the pixels connected to the gate line G1, the pixel P11 is applied with the data pulse on the data line D1. In this case, the pixel P11 display the correct image since the data line D1 is connected to the pixel P11 through the connection B. But, when the pixel P11 displays the white image, as shown in FIG. 3(A) and the pixel P31 displays the black image, as shown in FIG. 3(B), the data pulse for displaying the black image on the pixel P31 is also applied to the pixel P11 through to the direct connection B between the data line D1 and the pixel P11, so that the pixel P11 displays the black image or the wrong image.

The line defect means that the gate line, for example the gate line G1, is cut at a portion C so that the horizontal pixels succeeding to the pixel P12 always display the white image, or that the data line, for example the data line D2 is cut at a portion D so that the vertical pixels succeeding to the pixel P22 always display the white image. It has been difficult to repair the line defect in the conventional art.

A second problem in the conventional LCD device is that when it is desired to realize a high resolution image display, it is necessary to increase the size of the glass substrates for the following reasons. The increase of the resolution has been accomplished by increasing the number of pixels. The increase of the pixels means the increase of the number of data and gate lines which dissipate a large area on the glass substrate, so that the aperture size, through which the light passes, becomes small, and the displayed image becomes dark. To solve the problem of the dark image, the size of the glass substrates is increased, whereby the aperture size is increased. But, the increased size of the glass substrates causes a new problem in that the length of the data line and the gate lines is increased, so that a voltage drop along the data line and the gate line is increased, whereby luminance of each pixel along the data line and the gate line is gradually decreased. To solve the gradual decrease of the luminance, a cross sectional area of the data line and the gate line must be increased, or the data line and the gate line made of a high electrically conductive material must be used. These technical changes, however, require a development of a new fabrication process.

A third problem in the conventional LCD device is achieving a wide viewing angle with a good image quality. To realize the wide viewing angle, a technology called an In-Plane switching (IPS) mode had been recently developed. In the IPS mode, the liquid crystal molecules are always switched in a parallel plane to the surface of the glass substrate, without being aligned in a perpendicular direction to the surface of the glass substrate. But, in the IPS mode, a white color viewed by an user varies depending upon a viewing angle.

Before describing a fourth problem in the conventional LCD device, a driving scheme of the LCD device is described. It is required to apply the voltage, such as 5V, across the pixel electrode 9 and the common electrode 15 to align the liquid crystal molecules along the electric field, as shown in FIG. 3(B). But, the liquid crystal material deteriorates if the DC voltage field is continuously applied to the liquid crystal material. Accordingly, the polarity of the voltage field applied to the liquid crystal material is alternately switched. Describing the driving of one pixel, the voltage −2.5V is applied to the pixel electrode 9 and the voltage +2.5V is applied to the common electrode 15 during odd frame periods, and the voltage +2.5V is applied to the pixel electrode 9 and the voltage −2.5V is applied to the common electrode 15 during even frame periods. This is called a "voltage inversion scheme".

To perform the voltage inversion of the pixels on the display screen, two schemes have been used. The first scheme is an H (horizontal) common inversion scheme. In this scheme, the common electrode is divided into N common sub-electrodes along the horizontal direction, and the gate lines are divided into N groups in corresponding to the N common sub-electrodes.

During the odd frame periods, the voltage +2.5V is applied to the odd sub-common electrode and the voltage −2.5V is applied to the pixel electrode facing the odd sub-common electrodes, and the voltage −2.5V is applied to the even sub-common electrodes and the voltage +2.5V is applied to the pixel electrodes facing the even sub-common electrodes.

During the even frames periods, the voltage −2.5V is applied to the odd sub-common electrodes and the voltage +2.5V is applied to the pixel electrodes facing the odd sub-common electrodes, and the voltage +2.5V is applied to the even sub-common electrode and the voltage −2.5V is applied to the pixel electrode facing the even sub-common electrodes. This means that the data line driver connected to the data lines and the common electrode driver connected to the sub-common electrodes shares the voltage amplitude of 5.0V. That is, the load of both the data line and common electrode driver is small.

However, such voltage share is not possible in the second scheme called an "H/V inversion scheme". In the H/V inversion scheme, the inversion is performed for each pixel. The voltage 5V is not shared by the data line driver and the common electrode driver, so that the data line driver generates the data signal with the amplitude of the 5V. This is the fourth problem in the conventional LCD device.

SUMMARY OF THE INVENTION

In view of the foregoing and other problems, disadvantages and drawbacks of the conventional LCD devices, the present invention has been devised, and it is an object of the present invention to provide a structure and method for an LCD device which can decrease the affect of the dot defect and the line defect.

Another object of the present invention is to provide an LCD device which realizes the high resolution without increasing the number of data lines and gate lines.

Another object of the present invention is to provide an LCD device which realizes the wide viewing angle.

Another object of the present invention is to provide an LCD device which decreases the value of the voltage applied to the data lines and the gate lines in the H/V inversion scheme.

A further object of the present invention is to provide a method for fabricating the above LCD devices.

In a first aspect, a liquid crystal display device according to the present invention includes a first transparent substrate having a first surface and a second surface, and a second transparent substrate having a first surface and a second surface. The first transparent substrate and the second transparent substrate are arranged to face the first surface of the first transparent substrate to the first surface of the second transparent substrate, and a liquid crystal material is enclosed between the first surface of the first transparent substrate and the first surface of the second transparent substrate. A pixel array, in which a plurality of pixel regions are arranged in row and column directions and data signals are applied to the pixel regions through data lines, is formed on the first surface of the first transparent substrate and the first surface of the second transparent substrate.

Preferably, the data lines are arranged in one of the row and column directions, gate lines are arranged in the other direction of the row and column directions, and each of the pixel regions on the first transparent substrate is aligned to each of the pixel regions on the second transparent substrate.

Preferably, the gate lines on the first transparent substrate are aligned to the gate lines on the second transparent substrate, respectively, and the data lines on the first transparent substrate are aligned to the data lines on the second transparent substrate, respectively.

Preferably, the gate lines on the first surface of the first transparent substrate are connected to a first gate line driver, the data lines on the first surface of the first transparent substrate are connected to a first data line driver, the gate lines on the first surface of the second transparent substrate are connected to a second gate line driver, and the data lines on the first surface of the second transparent substrate are connected to a second data line driver.

Preferably, the pixel regions in the pixel array is formed adjacent to each intersection of the gate line and the data lines, and the pixel region includes a display electrode and a switching element connected between the gate and data lines and the display electrode.

Preferably, the switching element is a thin film transistor having a gate electrode connected to the gate line, a drain electrode connected to the data line and a source electrode connected to the display electrode.

Preferably, each of the first and second transparent substrates has a top edge, a bottom edge, a left side edge and a right side edge, data line pads respectively connected to the data lines on the first transparent substrate are formed in a first area adjacent to one of the top edge and bottom edge of the first transparent substrate, gate line pads respectively connected to the gate lines on the first transparent substrate are formed in a second area adjacent to one of the left side edge and the right edge of the first transparent substrate, data line pads respectively connected to the data lines on the second transparent substrate are formed in a third area adjacent to the other of the top edge and the bottom edge of the second transparent substrate, and gate line pads respectively connected to the gate lines are formed in a fourth area adjacent to the other of the left edge and the right side edge of the second transparent substrate, and the first data line driver is connected to the data line pads in the first area, the first gate line driver is connected to the gate line pads in the second area, and the second data line driver is connected to the data line pads in the third area, and the second gate line driver is connected to the gate line pads in the fourth area.

Preferably, the liquid crystal is switched from a first state, in which no voltage is applied, to a second state, in which the voltage is applied, by a switching voltage, the first gate line driver applies a gate pulse to a selected one gate line on the first transparent substrate, the second gate line driver applies a gate pulse to one gate line, which faces the selected one gate line, on the second transparent substrate, and the application of the two gate pulses are simultaneously performed, and the first data line driver applies a data signal of a value, which is half of the switching voltage, to at least one data line on the first transparent substrate during the application of the gate pulse to the gate line on the first transparent substrate, and the second data line driver applies a data signal of an amplitude, which is half of the switching voltage, to a data line on the second transparent substrate, which is faced to the one data line on the first transparent substrate, during the application of the gate pulse to the gate line on the second transparent substrate.

Preferably, a first alignment layer is formed to cover the pixel array on the first transparent substrate, a second alignment layer is formed to cover the pixel array on the second transparent substrate, and the liquid crystal material is a twisted nematic liquid crystal material.

Preferably, the liquid crystal device further includes a memory for storing dot defect information, which includes data representing the position of the defective pixel and an identifying data representing one of the first and second transparent substrates on which a pixel region of the defective pixel is formed, and a control means for responding to the dot defect information to increase a value of data signal applied to a pixel region, which is formed on the other of the first and second transparent substrates, of the defective pixel to the value of the switching voltage to the liquid crystal material.

Preferably, the controller determines whether the defective pixel requires an application of the switching voltage, or not, and if the defective pixel requires the application of the switching voltage, the controller increases the value of data signal applied to the pixel region, which is formed on the other of the first and second transparent substrate, of the defective pixel to the value of the switching voltage to the liquid crystal material.

Preferably, the liquid crystal device further includes a memory for storing a data line defect information, which includes data representing the position of the defect on the data line and an identifying data representing one of the first and second transparent substrates on which the defective data line is formed, and a control means for responding to the data line defect information to increase a value of data signal applied to pixel regions, which are formed on the other of the first and second transparent substrates, of pixels affected by the data line defect to the value of the switching voltage to the liquid crystal material.

Preferably, the controller determines as to whether the pixels affected by the data line defect require an application of the switching voltage, or not, and if the pixels affected by the data line defect require the application of the switching voltage, the controller increases the value of data signal applied to pixel regions, which are formed on the other of the first and second transparent substrates, of the pixels affected by the data line defect, to the switching voltage to the liquid crystal material.

Preferably, the liquid crystal device further includes a memory for storing gate line defect information, which includes data representing the position of the defect on the gate line and an identifying data representing one of the first and second transparent substrates on which the defective gate line is formed, and a controller for responding to the gate line defect information to increase a value of data signal applied to pixel regions, which are formed on the other of the first and second transparent substrates, of pixels affected by the gate line defect to the value of the switching voltage to the liquid crystal material.

Preferably, the controller determines as to whether the pixels affected by the gate line defect require an application of the switching voltage, or not, and if the pixels affected by the gate line defect require the application of the switching voltage, the controller increases the value of data signal applied to the pixel regions, which are formed on the other of the first and second transparent substrate, of the pixels affected by the gate line defect, to the switching voltage to the liquid crystal material.

In another aspect, a liquid crystal display device according to the present invention includes a first transparent substrate having a first surface and a second surface, and a second transparent substrate having a first surface and a second surface. The first transparent substrate and the second transparent substrate are arranged to face the first surface of the first transparent substrate to the first surface of the second transparent substrate, and a liquid crystal material is enclosed between the first surface of the first transparent substrate and the first surface of the second transparent substrate. A pixel array, in which a plurality of pixel regions are arranged in row and column directions and data signals are applied to the pixel regions through data lines, is formed on the first surface of the first transparent substrate and the first surface of the second transparent substrate. The data lines are arranged in one of the row and column directions, gate lines are arranged in the other direction of the row and column directions, and wherein each of the pixel regions on the first transparent substrate is shifted with respect to each of the pixel regions on the second transparent substrate, in the direction along the gate lines, by a distance which is the half of a width of the pixel region along the gate lines.

Preferably, the gate lines on the first transparent substrate are aligned to the gate lines on the second transparent substrate, respectively, and each of the data lines on the first transparent substrate is aligned to an intermediate position between the data lines on the second transparent substrate, respectively.

Preferably, the intermediate position is separated by LX/2 from a center of the data line, wherein LX is a distance between a center of one data line and a center of a next data line.

Preferably, a plurality of black matrices, each of which is positioned to face one data line formed on the second transparent substrate, are formed on the first transparent substrate, and a plurality of black matrices, each of which is positioned to face one data line formed on the first transparent substrate, are formed on the second transparent substrate.

Preferably, a plurality of color filters are formed on the first transparent substrate, and each of the color filters is formed on the first transparent substrate at a position between the data line and the black matrix.

In yet another aspect, a liquid crystal display device according to the present invention includes a first transparent substrate having a first surface and a second surface, and a second transparent substrate having a first surface and a second surface. The first transparent substrate and the second transparent substrate are arranged to face the first surface of the first transparent substrate to the first surface of the second transparent substrate, and a liquid crystal material is enclosed between the first surface of the first transparent substrate and the first surface of the second transparent substrate. A pixel array, in which a plurality of pixel regions are arranged in row and column directions and data signals are applied to the pixel regions through data lines, is formed on the first surface of the first transparent substrate and the first surface of the second transparent substrate. The data lines are arranged in one of the row and column directions, gate lines are arranged in the other direction of the row and column directions, and wherein each of the pixel regions on the first transparent substrate is shifted with respect to each of the pixel regions on the second transparent substrate, in the direction along the data lines, by a distance which is the half of a height of the pixel region along the data lines.

Preferably, the data lines on the first transparent substrate are aligned to the data lines on the second transparent substrate, respectively, and each of the gate lines on the first transparent substrate is aligned to an intermediate position between the gate lines on the second transparent substrate. The intermediate position is separated by LY/2 from a center of the gate line, wherein LY is a distance between a center of one gate line and a center of a next gate line.

Preferably, a plurality of black matrices, each of which is positioned to face one gate line formed on the second transparent substrate, are formed on the first transparent substrate, and a plurality of black matrices, each of which is positioned to face one gate line formed on the first transparent substrate, are formed on the second transparent substrate.

Preferably, a plurality of color filters are formed on the first transparent substrate, and each of the color filters is formed on the first transparent substrate at a position between the gate line and the black matrix.

In a further aspect, a liquid crystal display device according to the present invention includes a first transparent substrate having a first surface and a second surface, and a second transparent substrate having a first surface and a second surface. The first transparent substrate and the second transparent substrate are arranged to face the first surface of the first transparent substrate to the first surface of the second transparent substrate, and a liquid crystal material is enclosed between the first surface of the first transparent substrate and the first surface of the second transparent substrate. A pixel array, in which a plurality of pixel regions are arranged in row and column directions and data signals are applied to the pixel regions through data lines, is formed on the first surface of the first transparent substrate and the first surface of the second transparent substrate. The data lines are arranged in one of the row and column directions and gate lines are arranged in the other direction of the row and column directions. Each of the pixel regions on the first transparent substrate is shifted, in the direction along the gate lines, by a distance which is equal to the half of a width of the pixel region along the gate lines, and is shifted, in the direction along the data lines, by a distance which is equal to the half of a height of the pixel region along the data lines, with respect to each of the pixel region on the second transparent substrate.

Preferably, each of the data lines on the first transparent substrate are aligned to an intermediate position between the data lines on the second transparent substrate, respectively, and each of the gate lines on the first transparent substrate is aligned to an intermediate position between the gate lines on the second transparent substrate, respectively.

Preferably, the intermediate position between the data lines is separated by LX/2 from a center of the data line, wherein the LX is a distance between a center of one data line and a center of a next data line, and the intermediate position between the gate lines is separated by LY/2 from a center of the gate line, wherein LY is a distance between a center of one gate line and a center of a next gate line.

Preferably, a plurality of black matrices, each of which is positioned to face one data line and one gate line formed on the second transparent substrate, are formed on the first transparent substrate, and a plurality of black matrices, each of which is positioned to face one data line and one gate line formed on the first transparent substrate, are formed on the second transparent substrate.

In another aspect, a liquid crystal display device according to the present invention includes a first transparent substrate having a first surface and a second surface, and a second transparent substrate having a first surface and a second surface. The first transparent substrate and the second transparent substrate are arranged to face the first surface of the first transparent substrate to the first surface of the second transparent substrate, and a vertical alignment liquid crystal material is enclosed between the first surface of the first transparent substrate and the first surface of the second transparent substrate. A pixel array, in which a plurality of pixel regions are arranged in row and column directions, and a data signal is applied to the pixel regions through data lines, is formed on the first surface of the first transparent substrate and the first surface of the second transparent substrate. The data lines are arranged in one of the row and column directions and gate lines are arranged in the other direction of the row and column directions. Each of the pixel regions on the first transparent substrate is shifted with respect to each of the pixel regions on the second transparent substrate, in the direction along the gate lines, by a distance which is the half of a width of the pixel region along the gate lines. A plurality of black matrices, each of which is positioned to face one data line formed on the second transparent substrate, are formed on the first transparent substrate, and a plurality of black matrices, each of which is positioned to face one data line formed on the first transparent substrate, are formed on the second transparent substrate, and each of the black matrices has a trapezoidal cross section.

Preferably, a separate transparent substrate, on which color filters are formed, is positioned on the second surface of the first transparent substrate or the second surface of the second transparent substrate.

In a further aspect, a liquid crystal display device according to the present invention includes a first transparent substrate having a first surface and a second surface, and a second transparent substrate having a first surface and a second surface. The first transparent substrate and the second transparent substrate are arranged to face the first surface of the first transparent substrate to the first surface of the second transparent substrate, and a vertical alignment liquid crystal material is enclosed between the first surface of the first transparent substrate and the first surface of the second transparent substrate. A pixel array, in which a plurality of pixel regions are arranged in row and column directions and data signals are applied to the pixel regions through data lines, is formed on the first surface of the first transparent substrate and the first surface of the second transparent substrate. The data lines are arranged in one of the row and column directions and gate lines are arranged in the other direction of the row and column directions. Each of the pixel regions on the first transparent substrate is shifted with respect to each of the pixel regions on the second transparent substrate, in the one direction along the data lines, by a distance which is half of a height of the pixel region along the data lines. A plurality of black matrices, each of which is positioned to face one gate line formed on the second transparent substrate, are formed on the first transparent substrate, and a plurality of black matrices, each of which is positioned to face one gate line formed on the first transparent substrate, are formed on the second transparent substrate, and each of the black matrices has a trapezoidal cross section.

In yet another aspect, a liquid crystal display device according to the present invention includes a first transparent substrate having a first surface and a second surface, and a second transparent substrate having a first surface and a second surface. The first transparent substrate and the second transparent substrate are arranged to face the first surface of the first transparent substrate to the first surface of the second transparent substrate, and a vertical alignment liquid crystal material is enclosed between the first surface of the first transparent substrate and the first surface of the second transparent substrate. A pixel array, in which a plurality of pixel regions are arranged in row and column directions and data signals are applied to the pixel regions through data lines, is formed on the first surface of the first transparent substrate and the first surface of the second transparent substrate. The data lines are arranged in one of the row and column directions, gate lines are arranged in the other direction of the row and column directions; wherein each of the pixel regions on the first transparent substrate is shifted, in the direction along the gate lines, by a distance which is equal to the half of a width of the pixel region along the gate lines, and is shifted, in the direction along the data lines, by a distance which is equal to the half of a height of the pixel region along the data lines, with respect to each of the pixel region on the second transparent substrate. A plurality of black matrices, each of which is positioned to face one data line and one gate line formed on the second transparent substrate, are formed on the first transparent substrate, and a plurality of black matrices, each of which is positioned to face one data line and one gate line formed on the first transparent substrate, are formed on the second transparent substrate, and each of the black matrices has a trapezoidal cross section.

In a different aspect, a method for fabricating a liquid crystal display device according to the present invention comprises:

(a) forming a pixel array, in which a plurality of pixel regions are arranged in row and column directions and a data signal is applied to the pixel regions through data lines, in a first portion and a second portion of one transparent substrate;

(b) cutting the transparent substrate into the first portion and the second portion;

(c) arranging the first portion and the second portion such that the pixel array on the first portion faces the pixel array on the second portion;

(d) bonding the first portion and the second portion at a sealing area to surround the pixel arrays on the first and second portions; and (e) filling a liquid crystal material into a space surrounded by the sealing area.

Preferably, in the pixel array, data lines are arranged in one of the row and column directions, gate lines are arranged in the other direction of the row and column directions, and each of the pixel regions is formed at a region adjacent to each intersection of the gate line and the data lines. Each of the pixel regions includes a display electrode and a thin film transistor connected between the gate and data lines and the display electrode.

Preferably, each of the first and second portions has a top edge, a bottom edge, a left side edge and a right side edge, and in step (a), data line pads connected to the data lines on the first portion, respectively, are formed in a first area adjacent to one of the top edge and the bottom edge of the first portion. Gate line pads connected to the gate lines on the first portion, respectively, are formed in a second area adjacent to one of the left side edge and the right side edge of the first portion. Data line pads connected to the data lines on the second portion, respectively, are formed in a third area adjacent to the other of the top edge and the bottom edge of the second portion. Gate line pads connected to the gate lines on the second portion, respectively, are formed in a fourth area adjacent to the other of the left side edge and the right side edge of the second portion.

Preferably, the method further includes connecting a first data line driver to the data line pads in the first area, connecting a first gate line driver to the gate line pads in the second area, connecting a second data line driver to the data line pads in the third area, and connecting a second gate line driver to the gate line pads in the fourth area.

Preferably, in step (c), the first portion and the second portion are arranged to align the gate lines on the first portion to the gate lines on the second portion, respectively, and to align the data lines on the first portion to the data lines on the second portion, respectively.

Preferably, in step (c), each of the pixel regions on the first portion is shifted with respect to each of the pixel regions on the second portion, in the direction along the gate lines, by a distance which is the half of a width of the pixel region along the gate lines.

Preferably, in step (a), a plurality of black matrices, each of which is positioned to face one data line on the second portion, are formed on the first portion, and a plurality of black matrices, each of which is positioned to face one data line on the first portion, are formed on the second portion.

Preferably, the thin film transistor is a reversed staggered type thin film transistor, and in step (a), gate electrodes of the reversed staggered type thin film transistors and a plurality of black matrices are simultaneously formed on the first and second portions.

Preferably, the thin film transistor is a staggered type thin film transistor which includes a light shielding layer below a gate electrode; and in the step (a), the light shielding layers of the staggered type thin film transistors and a plurality of black matrices are simultaneously formed on the first and second portions.

Preferably, in step (a), a plurality of color filters are formed on the first portion, and each of the color filters is formed at a position between the data line and the black matrix.

Preferably, in step (c), each of the pixel regions on the first portion is shifted with respect to each of the pixel regions on the second portion, in the direction along the data lines, by a distance which is half of a height of the pixel region along the data lines.

Preferably, in step (a), a plurality of black matrices, each of which is positioned to face one gate line on the second portion, are formed on the first portion, and a plurality of black matrices, each of which is positioned to face one gate line on the first portion, are formed on the second portion.

Preferably, in step (a), a plurality of color filters are formed on the first portion, and wherein each of the color filters is formed at a position between the gate line and the black matrix.

In step (c), each of the pixel regions on the first portion is shifted, in the direction along the gate lines, by a distance which is half of a width of the pixel region along the gate lines, and is shifted, in the direction along the data lines, by a distance which is half of a height of the pixel region along the data lines, with respect to the pixel regions on the second portion.

In step (a), a plurality of black matrices, each of which is positioned to face one data line and one gate line on the second portion, are formed on the first portion, and a plurality of black matrices, each of which is positioned to face one data line and one gate line on the first portion, are formed on the second portion.

The present disclosure relates to subject matter contained in Japanese Patent Application 11-133355, filed May 13, 1999, which is expressly incorporated herein by reference in its entirety.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
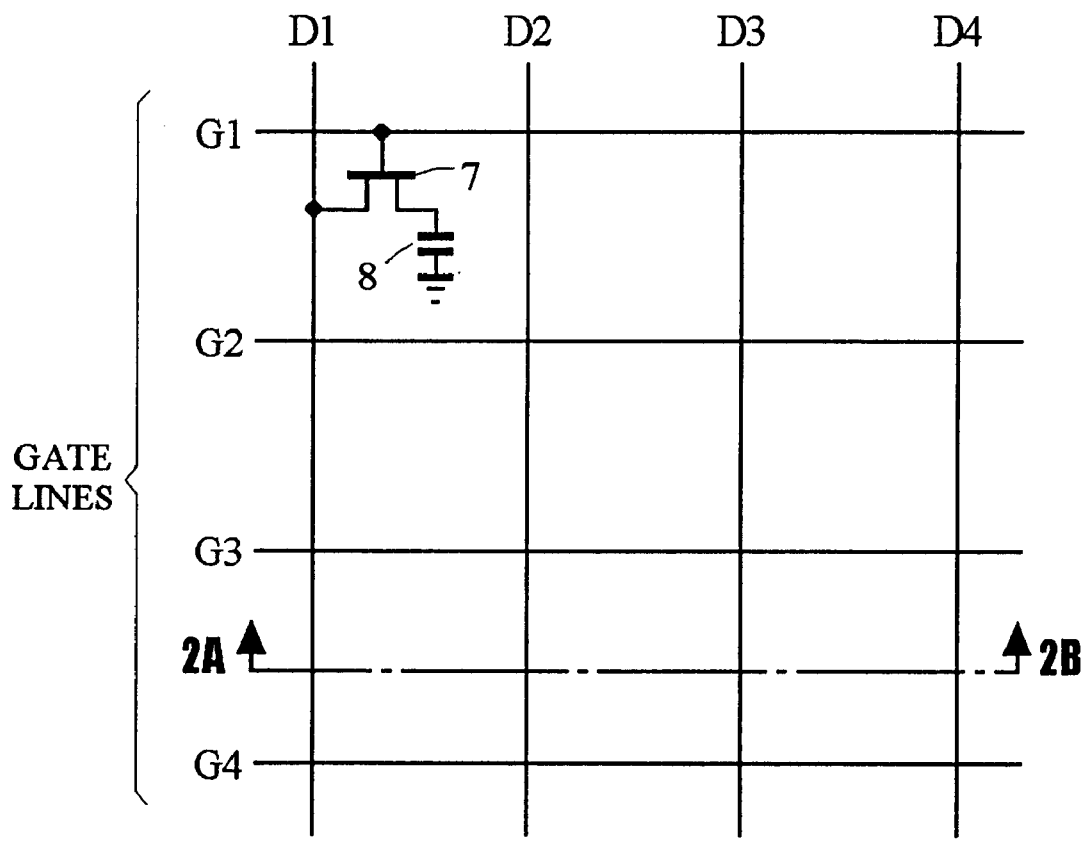
FIG. 1 shows an array formed on one substrate of a conventional LCD device.
Figure 2:
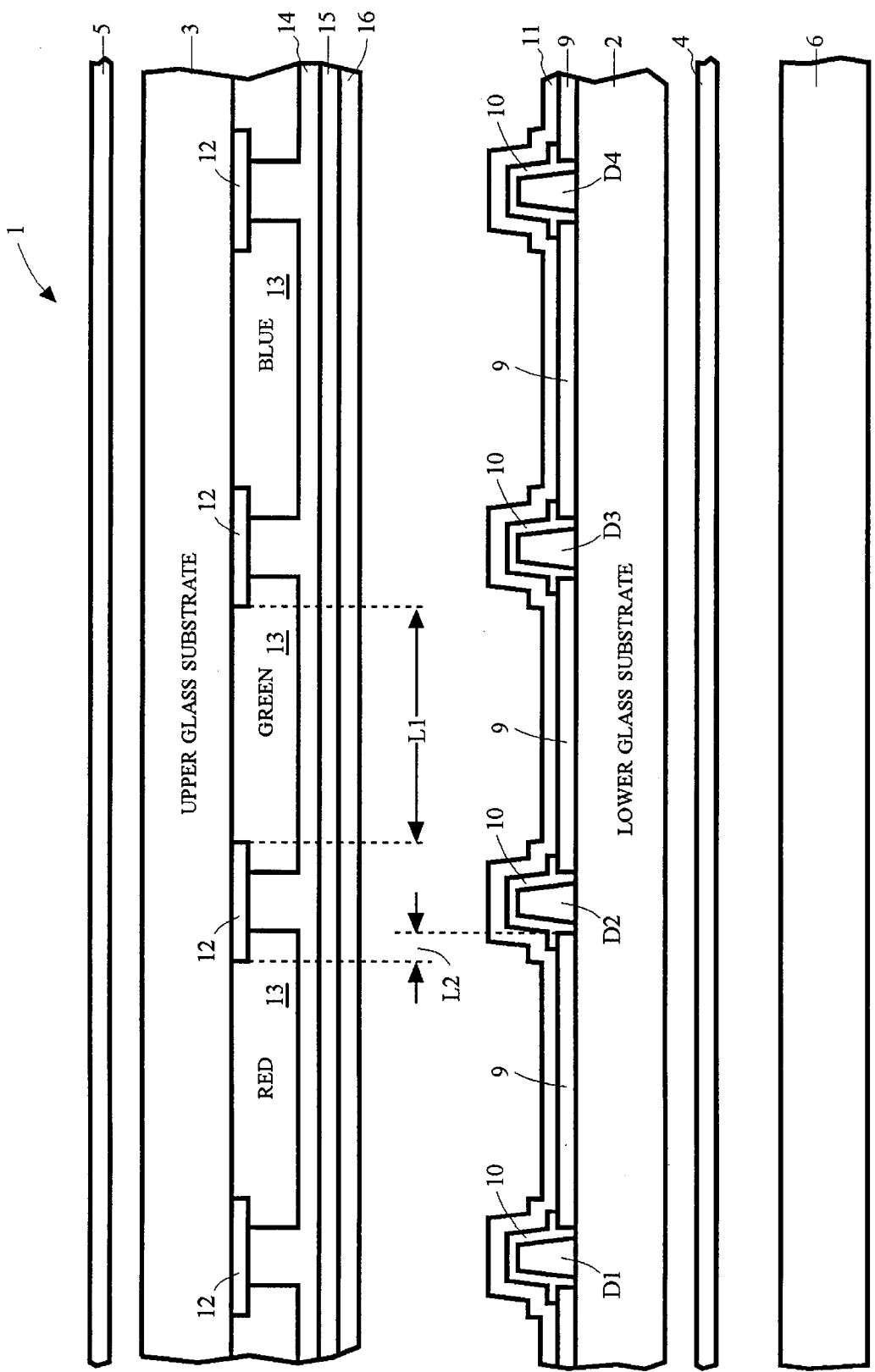
FIG. 2 shows a structure of the conventional LCD device.

Referring now to the drawings, and more particularly to FIGS. 1–29, a uniquely structured LCD panel according to the present invention will be described.

Figure 5:
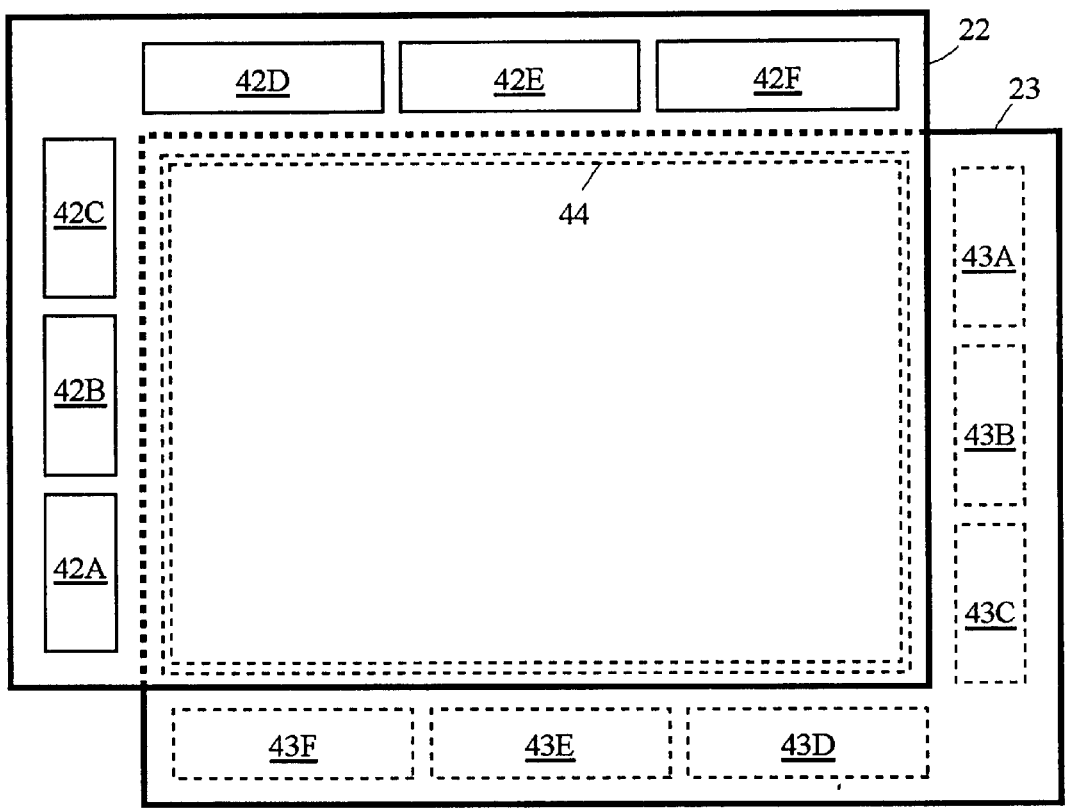
FIG. 5 shows a basic structure of a LCD panel in accordance with the present invention.

FIG. 5 shows a basic structure of a LCD panel according to the present invention. The LCD panel includes a first transparent substrate or an upper glass substrate 22 and a second transparent substrate or a lower glass substrate 23. Each of the two glass substrates 22 and 23 has a first surface or an inside surface and a second surface or an outside surface. The inside surfaces of the two glass substrates 22 and 23 are faced to each other and are bonded at a sealing area 44. A liquid crystal material is enclosed or contained within a space enclosed by the sealing area 44.

A pixel array including the gate lines, the data lines and the pixel regions is formed in the area of the inside surfaces surrounded by the sealing area 44 of each of both the glass substrates 22 and 23. Integrated circuit (IC) modules 42D through 42F, constituting a first data line driver, are mounted on a first area adjacent to the top edge of the first or upper glass substrate 22. IC modules 42A through 42C, constituting a first gate line driver, are mounted on a second area adjacent to the left side edge of the upper glass substrate 22. IC modules 43D through 43F, constituting a second data line driver, are mounted on a third area adjacent to the bottom edge of the lower glass substrate 23. IC modules 43A through 43C, constituting a second gate line driver, are mounted on a fourth area adjacent to the right side edge of the lower glass substrate 23. IC modules, constituting a control unit, a memory, a data buffer, etc., are mounted on the above areas. However, these IC modules are not shown in FIG. 5 to simplify the drawing. The above array is called a TFT (Thin Film Transistor) array since the pixel region includes a TFT connected between the data line and the display electrode, as described below.

First Embodiment

Referring to FIG. 6(A), a pixel array, in which a plurality of pixel regions are arranged in a row or horizontal direction and in a column or vertical direction and data signals are applied to the pixel regions through the data lines, is formed on each of the inside surfaces of the upper and lower glass substrates 22 and 23.

More particularly, in the pixel array, a plurality of gate lines G1 through GN are arranged in the row directions, a plurality of data lines D1 through DN are arranged in the column direction, and each of a plurality of pixel regions is formed at an intersection of the gate line and the data line. One pixel region on the upper glass substrate 22 and one pixel region on the lower glass substrate 23, which faces the above one pixel region, forms one pixel of the LCD device. The gate and data lines and the connecting pads formed on the inside surface of the upper glass substrate 22 are shown by the solid lines, as shown in FIG. 10(A). The gate and data lines and the connecting pads are formed on the inside surface of the lower glass substrate 23. The pixel region, which is formed adjacent to each intersection of the gate line and the data line, includes a switching element or a TFT 27 and an Indium Tin Oxide layer 29 (33), as shown in FIG. 6(B). It is noted that the TFT and the ITO layer in each of the pixel regions are not shown in FIG. 6(A) to simplify the drawing. The gate line made of MoW (molybdenum tungsten) is connected to a gate of the TFT 27, the data line is connected to a drain of the TFT, a source of the TFT is connected to the ITO 29 (33) or the display electrode.

Figure 6:
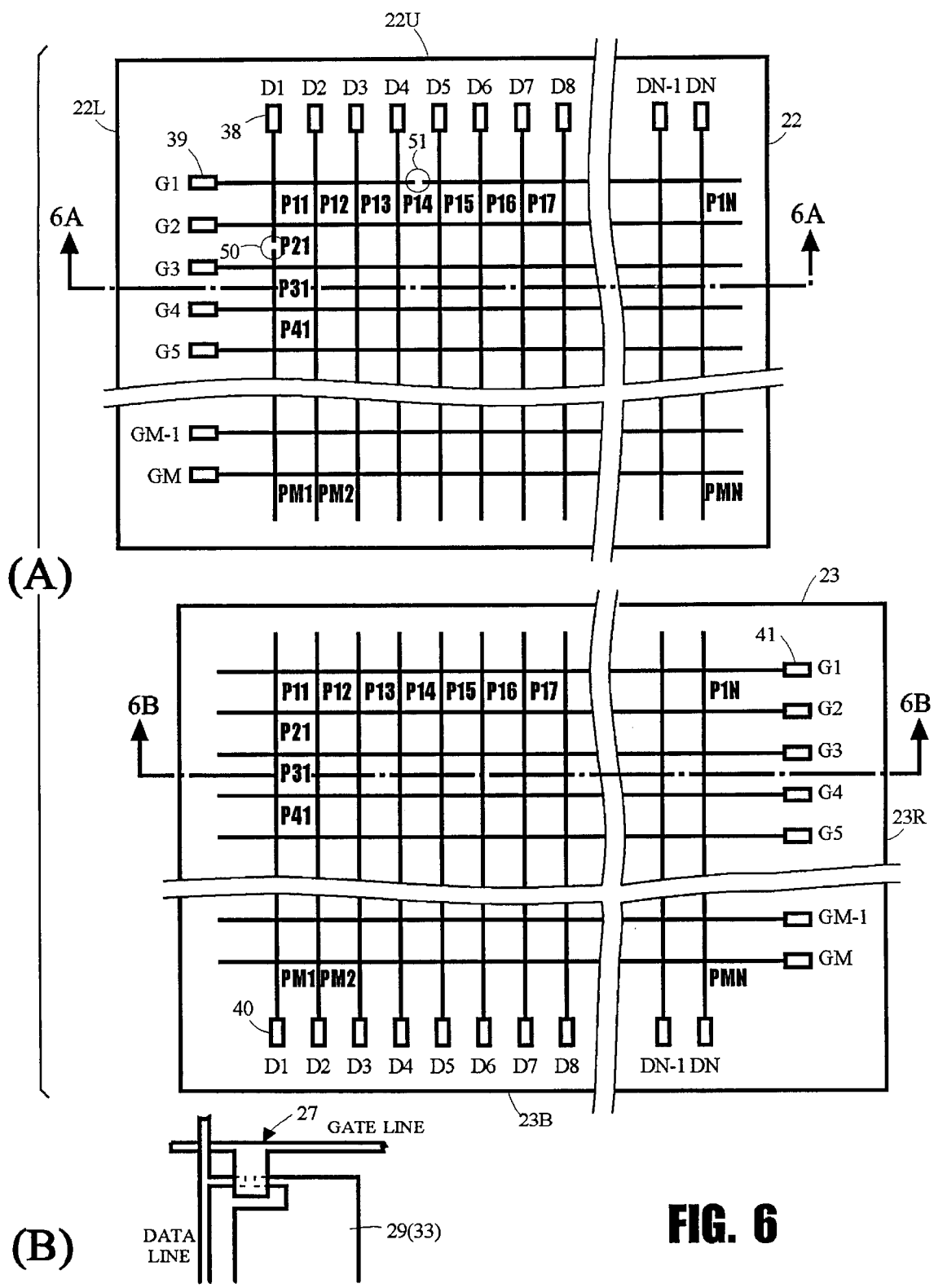
FIG. 6 shows the arrangement of the data lines D1 through DN and the gate lines G1 through GN on the upper and lower glass substrates 22 and 23.
Figure 8:
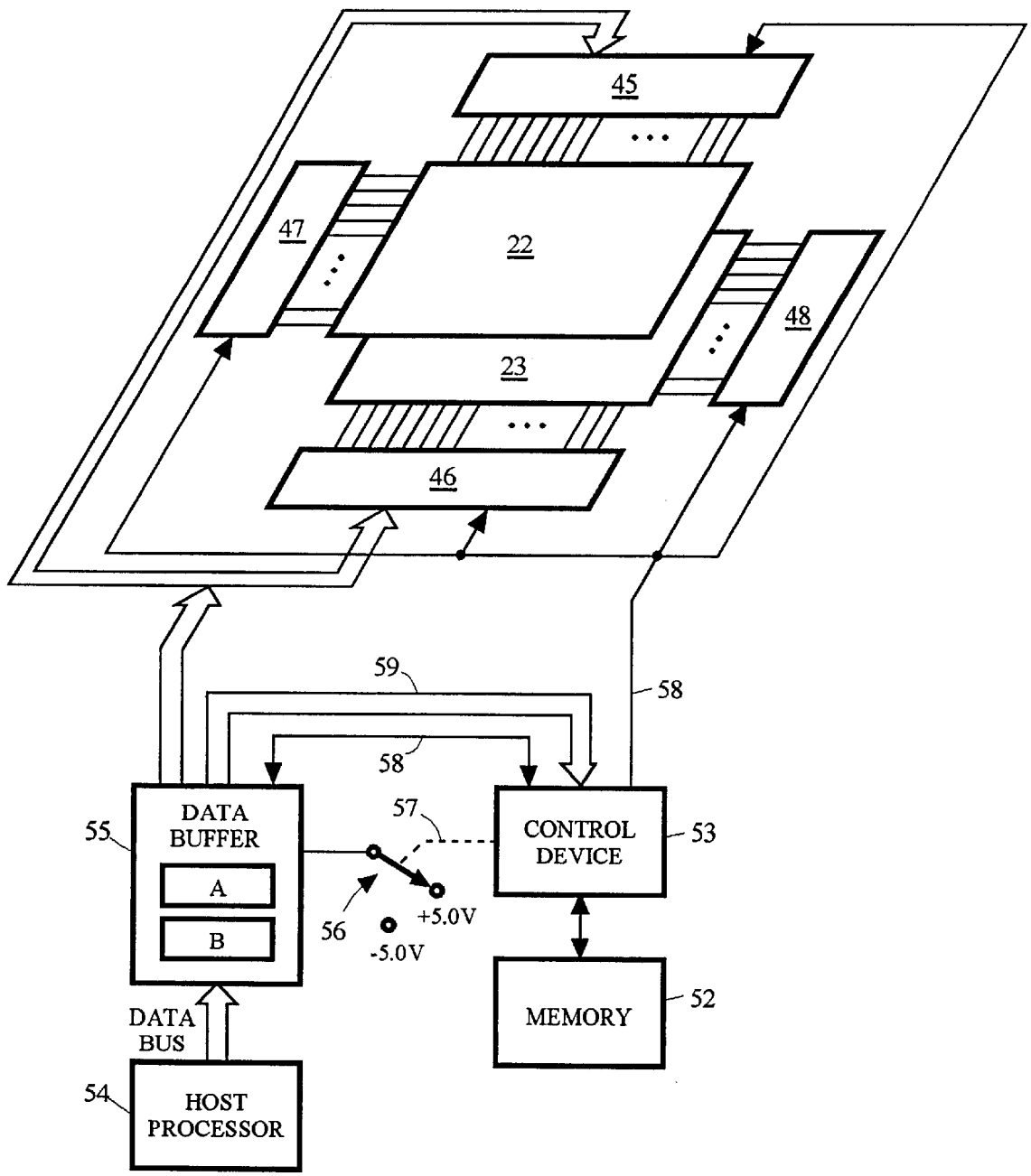
FIG. 8 shows a block diagram of circuits for controlling the LCD panel.

A first data line driver 45, as shown in FIGS. 6 and 8, is connected to the data lines D1–DN through connecting pads or data line pads 38 formed along one horizontal edge (e.g., the upper horizontal edge 22U, of the upper glass substrate 22), to apply the data pulses to the data lines. A first gate line driver 47, as shown in FIG. 8, is connected to the gate lines G1–GN through connecting pads or gate line pads 39 formed along one vertical edges, (e.g., the left side edge 22L, of the upper glass substrate 22), to sequentially apply the gate pulses to the gate lines.

A second data line driver 46, as shown in FIG. 8, is connected to the data lines D1–DN through connecting pads or the data line pads 40 formed along the other horizontal edges, (e.g., the lower horizontal edge 23B, of the lower glass substrate 23), to apply the data pulses to the data lines. A second gate line driver 48 is connected to the gate lines G1–GN through connecting pads or gate line pads 41 formed along the other vertical edge (e.g., the right side edge 23R, of the lower glass substrate 23), to sequentially apply the gate pulses to the gate lines on the lower glass substrate 23.

In the first embodiment, each of the pixel regions on the upper glass substrate 22 is aligned to each of the pixel regions on the lower glass substrate 23. Since a space between the gate line and the display electrode on the glass substrate, and a space between the data line and the display electrode on the glass substrate are smaller than the width of the gate and the data lines, and the size of the display electrode is substantially larger than the width of the gate and data lines, each of the pixel regions on the upper glass substrate 22 can be aligned to each of the pixel regions on the lower glass substrate 23 by facing the data lines and the gate lines on the upper glass substrate 22 to the data lines and the gate lines on the lower glass substrate 23, respectively.

For example, the data lines D1 through DN on the upper glass substrate 22 are aligned to the data lines D1 through DN on the lower glass substrate 23, respectively, and the gate lines G1 through GM on the upper glass substrate 22 are aligned to the gate lines G1 through GM on the lower glass substrate 23, respectively.

Figure 7:
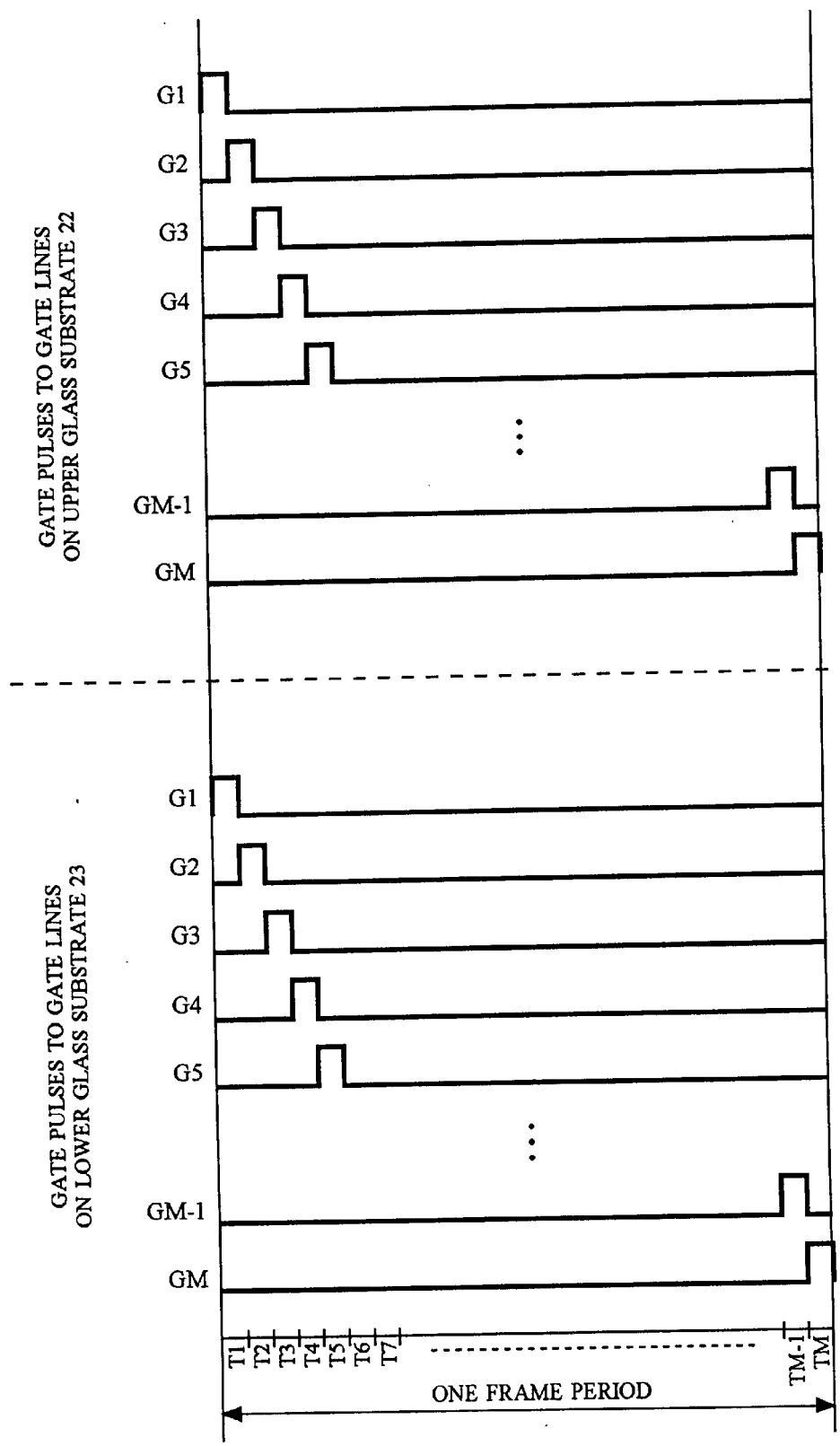
FIG. 7 shows the gate pulses applied to the gate lines on both the upper and lower glass substrates 22 and 23.

As shown in FIG. 7, one frame period is divided into a plurality of time periods T1 through TM. At time period T1, the first gate line driver 47 applies the gate pulse to the gate line G1 of the upper glass substrate 22, and the second gate line driver 48 applies the gate pulse to the gate line G1 of the lower glass substrate 23. At time period T2, the first gate line driver 47 applies the gate pulse to the gate line G2 of the upper glass substrate 22, and the second gate line driver 48 applies the gate pulse to the gate line G2 of the lower glass substrate 23. At time period T3, the first gate line driver 47 applies the gate pulse to the gate line G3 of the upper glass substrate 22, and the second gate line driver 48 applies the gate pulse to the gate line G3 of the lower glass substrate 23, and so on.

During the application of the gate pulses to the gate lines of the upper and lower glass substrate 22 and 23, the first data line driver 45 and the second data line driver 46 simultaneously supply the data pulses to the data lines D1 through DN of the upper glass substrate 22 and the lower glass substrate 23. It is noted that the data signals are simultaneously applied to all the data lines D1 through DN along one gate line during the application of one gate pulse to this gate line.

Figure 9:
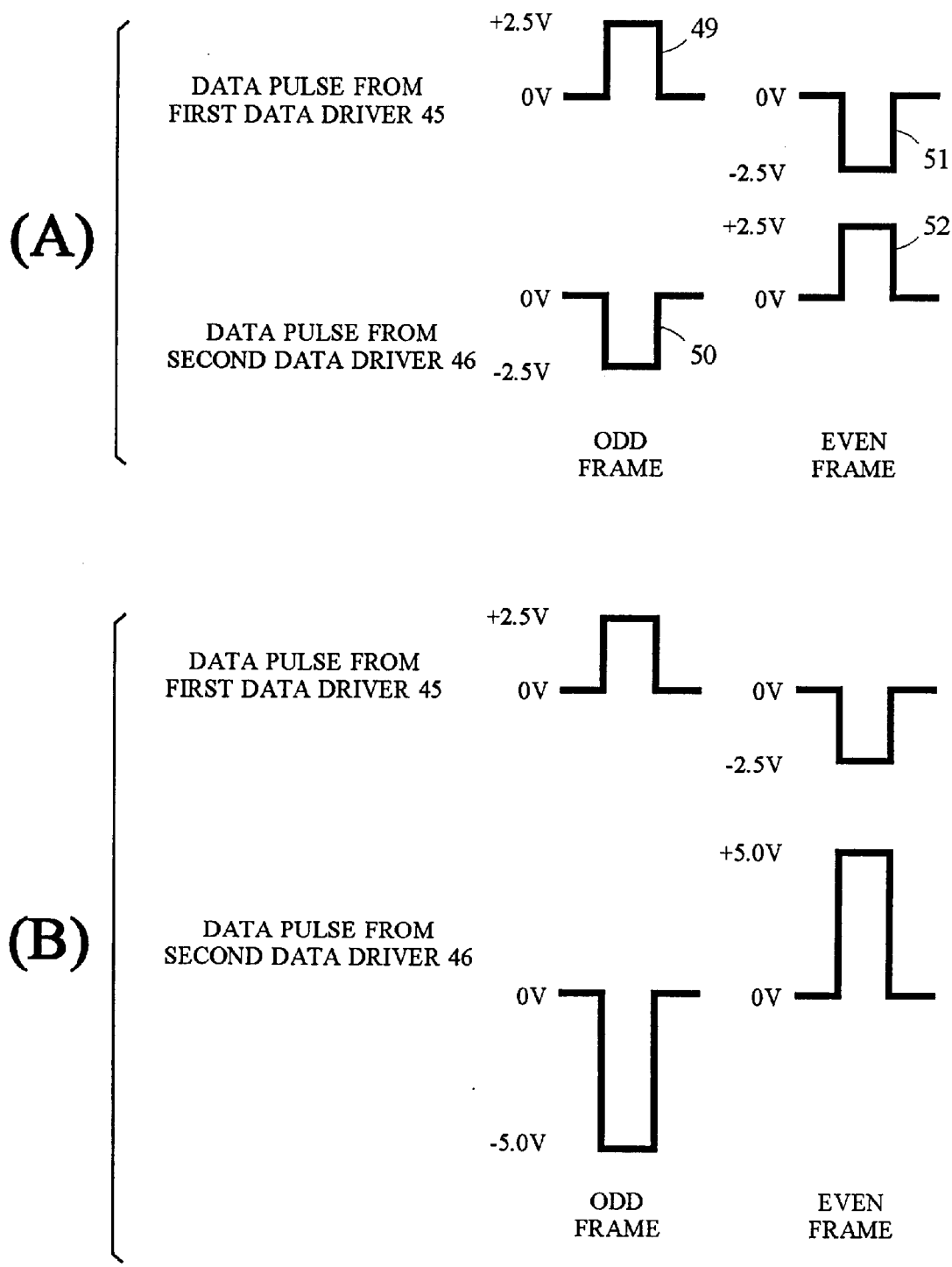
FIG. 9 shows the data pulses applied to the data lines of the upper and lower glass substrate 22 and 23.

When the black image is displayed at the pixel P11 shown in FIG. 6, the data line D1 of the upper glass substrate 22 is applied with the positive data pulse 49 of +2.5V shown in FIG. 9(A), which is half of the switching voltage 5V for switching the liquid crystal molecules in the state shown in FIG. 3(B), and the data line D1 of the lower glass substrate 23 is applied with the negative data pulse 50 of −2.5V, which is half of the switching voltage 5V, so that the full 5V is applied to the liquid crystal material of the pixel P11, whereby the liquid crystal molecules aligns along the electric field, as shown in FIG. 3(B) to display the black image. It is noted that FIG. 9 shows the data pulses for displaying the full black level image, but various voltage levels can be used for displaying the black level, the white level and various gray levels.

When the white image is displayed at the pixel P12 shown in FIG. 6, the data line D2 of the upper glass substrate 22 is applied with the negative data pulse of −2.5V and the data line D2 of the lower glass substrate 23 is applied with the negative data pulse 52 of −2.5V, so that the 0V is applied to the liquid crystal material of the pixel P12, whereby the liquid crystal molecules remains in the twisted state, as shown in FIG. 3(A) to display the white image.

Figure 10:
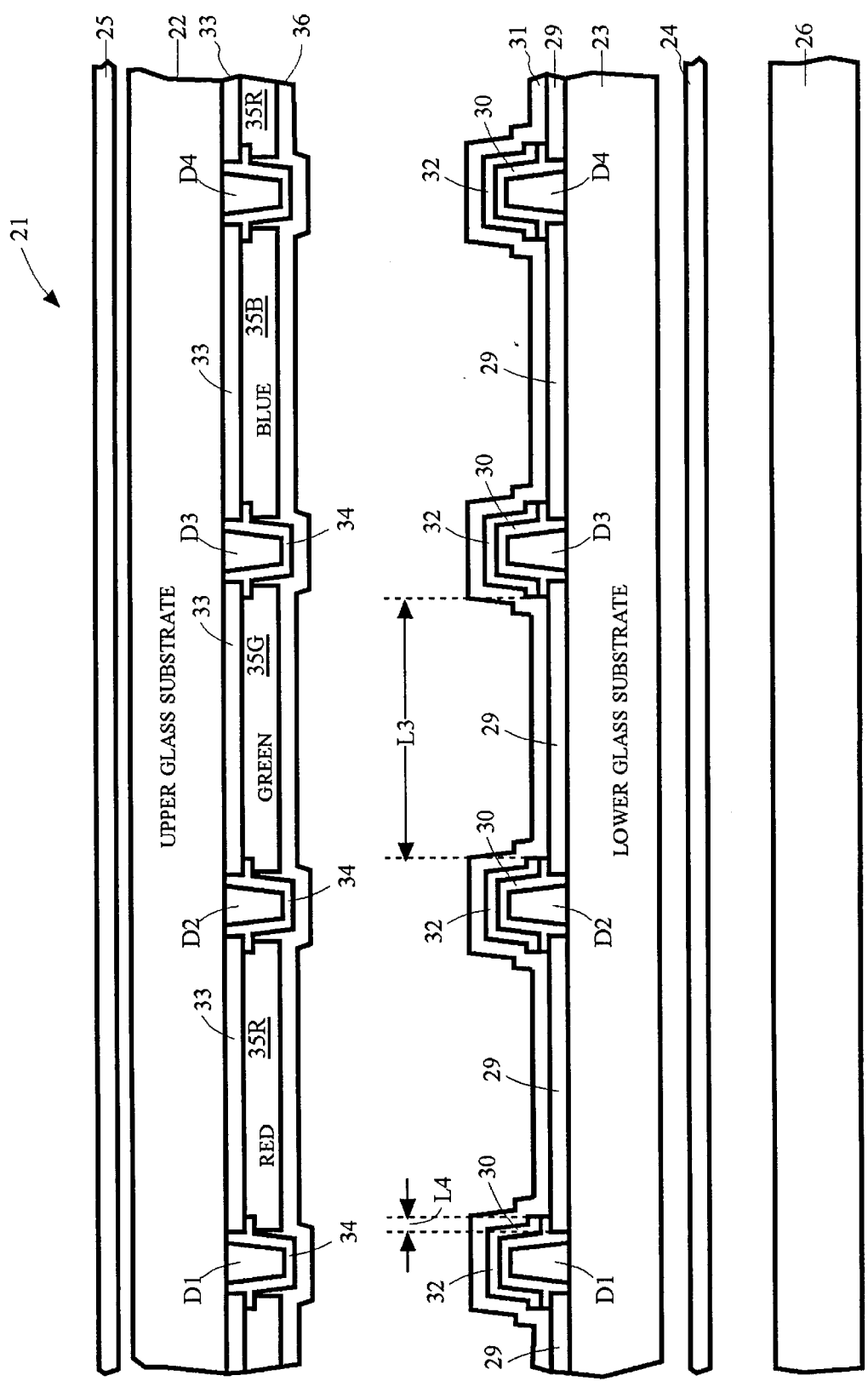
FIG. 10 shows a cross section of the structure formed on the upper and lower glass substrates 22 and 23 along dashed lines 6A—6A and 6B—6B in FIG. 6.

Referring to FIG. 10, the cross section of a portion of the structure of the color LCD device 21 in accordance with the present invention is shown. It is noted that the structure on the glass substrates 22 and 23 is simplified to show the concept of the present invention. The structure of the first embodiment can decrease the affect of the dot defect and the line defect. The LCD device 21 includes the upper glass substrate 22, the lower glass substrate 23, an upper polarizer plate 25, a lower polarizer plate 24 and a backlight device 26.

Regarding the structure on the lower glass substrate 23, the data lines D1 through D4 are formed on the lower glass substrate 23. The data lines are constituted by three layers, i.e. Mo layer, Al layer and Mo layer. The display electrodes 29, (e.g., ITO layers), are formed in the surface region between the data lines. Passivation layers, such as SiN$_x$ layers, 30 are formed to cover the data lines and to isolate the ITO layers 29 from the data lines. A black matrix 32 made of MoW or Cu is formed on each of the passivation layer 30. An alignment layer 31, such as a polyimide layer, is formed to cover the entire structure. A length L3 indicates the length of the aperture through which the light from the backlight device passes. The passivation layer 30 and the black matrix 32 cover the edge of the ITO layer 29 by a length L4 to prevent the electric field from being distorted at the edge of the ITO layer 29.

Regarding the structure on the upper glass substrate 22, the data lines D1 through D4, the passivation layers 34, the display electrodes or the ITO layer 33 and the alignment layer 36 are formed on the upper glass substrate 22, in the same manner as the lower glass substrate 23. Red color filters 35R, green color filters 35G and blue color filters 35B are formed on the ITO layers 33 to face the ITO layers 29 of the lower glass substrate 23, respectively. An alignment layer 36 is formed on the color filters and the passivation layer 34. The angle between the rubbing direction of the alignment layer 31 and the rubbing direction of the alignment layer 36 is about 90 degrees, as in the conventional technology shown in FIG. 3. A twisted nematic liquid crystal material, not shown, is sandwiched between the lower alignment layer 31 and the upper alignment layer 36, and is twisted between the alignment layer 31 and the alignment layer 36 by 90 degrees, as in the case of the conventional technology shown in FIG. 3. A backlight device 26 generates a white light. The polarizer plate 24 has a polarizing plane in a parallel direction to the rubbing direction of the alignment layer 31, and passes the light parallel to the polarizing plane. The polarizer plate 25 has a polarizing plane in a parallel direction to the rubbing direction of the alignment layer 36.

The liquid crystal molecules are twisted by 90 degrees between the alignment layer 31 and the alignment layer 36 when the switching voltage is not applied across the ITO layer 29 and the ITO layer 33. In this case, the polarized light passing through the polarizer plate 24 is rotated by the 90 degrees through the twisted liquid crystal molecules, and passes through the polarizer plate 25, so that the white image is displayed. When the switching voltage is applied between the ITO 29 and the ITO 33, the liquid crystal molecules are aligned along the electric field, as shown in FIG. 3(B), so that the polarized light from the polarizer plate 24 passes through the liquid crystal molecules without being rotated, whereby the polarized light is shut off by the polarizing plate 25, and the black image is displayed. In this manner, the LCD device 21 operates in the normally white mode operation mode, as shown in FIG. 3(A), in which the white image is displayed when the switching voltage is not applied across the ITO layer 29 and the ITO layer 33.

Regarding the recovery of image in accordance with the present invention when the dot defect or the line defect exists in the TFT array, the LCD device in accordance with the present invention can perform a partial recovery of the image and a perfect recovery of the image, which are lost due to the dot defect or the line defect.

Partial Recovery of the Image

It is assumed that the dot defect occurs at the pixel P11 due to a breakage of the TFT on the upper glass substrate 22 in FIG. 6, and the line defects occur at a portion 50 of the data line D1, and a portion 51 of the gate line G1 of the upper glass substrate 22. In the conventional LCD device without the repair at the portions A and B shown in FIG. 4, the black image or dot is not displayed at the defective pixel, since the voltage can not be applied to the liquid crystal material to align the liquid crystal molecules in the manner, as shown in FIG. 3(B).

It is noted that the LCD device according to the present invention can inherently partially recover the dot defect or the line defect without any assistance of an additional compensation circuit, since the array of the gate lines and the data lines are formed on the inside surface of each of both the upper and lower glass substrates 22 and 23.

More particularly, even if the data pulse, such as the data pulse 49 shown in FIG. 9(A), from the first data line driver 45, which has the half value of the switching voltage of the liquid crystal material, is not applied to the display electrode on the upper glass substrate 22 of the pixel P11 due to the breakage of the TFT on the upper glass substrate 22, the data pulse, which has half the value of the switching voltage of the liquid crystal material, such as the data pulse 50 shown in FIG. 9(A) from the second data line driver 46 is applied to the display electrode on the lower glass substrate 23 of the pixel P11, so that the liquid crystal of the pixel P11 is switched to display the gray image which is half the level between the white level and the black level. In this manner, the pixel P11 with the dot defect can inherently display the gray image corresponding to the 2.5V level.

The pixels P31 through PM1, which are classified as the line defect due to the breakage 50 of the data line D1 of the upper glass substrate 22, can display the gray image, in the same manner as that of the above dot defect. Also, the pixels P15 through P1N, which are classified as the line defect due to the breakage 51 of the gate line G1 of the upper glass substrate 22, can display the gray image, in the same manner as that of the above dot defect.

Perfect Recovery of the Image

In this scheme in accordance with the present invention, the black image on the pixels with the dot defect and the pixels included in the line defect can be perfectly restored or recovered. Before describing the perfect recovery, the operation of the circuit shown in FIG. 8 is described.

A control device 53 controls the operation of the first and second data drivers 45 and 46, and the first and second gate drivers 47 and 48 through a control line 58. A host processor 54, such as the personal computer, sequentially supplies the data signals of the pixel lines arranged along the gate lines to a data buffer 55 through the data bus. The data buffer 55 includes various voltage sources corresponding to the data signals representing the white level, the various gray levels and the black level, and includes a first sub-buffers A for the first data line drivers 45 and a second sub-buffer B for the second data line driver 46. It is noted that the example using the white level and the black level is described in this specification for simplifying the description.

Each of the sub-buffers A and B includes a plurality of buffer stages equal to the number of the pixels of one pixel line along the gate line. The data buffer 55 selects a voltage level corresponding to one data signal sent from the host processor 54, and stores the voltage level into one buffer stage of the sub-buffers A or B. For example, when the black image is displayed in the pixel P11, the data buffer 55 stores the +2.5V in the first buffer stage of the sub-buffer A, and stores the −2.5V in the first buffer stage of the sub-buffer B during the odd frame. Such a store operation is performed in all the buffer stages of the sub-buffers A and B. Since the above operation of the data buffer is well known in the art, a detailed operation is not described herein.

To perform the perfect recovery of the image, a control line 57, a switch 56 and a memory space in a memory 52 are additionally provided in accordance with the present invention. In a first step, the positions of the dot defect and the line defects on the upper or lower glass substrates 22 or 23 are detected by an array tester, which is well known in the art. In accordance with the present invention, when the dot defect, the data line defect and the gate line defect, as shown in FIG. 6A, are detected, the following three information are generated and stored in the memory space in the memory 52.

(A) A dot defect information, which includes data representing the position of the defective pixel (P11) and an identifying data (e.g., in this case, a bit "1"representing the upper substrate 22) representing one of the upper and lower glass substrate on which a pixel region of the defective pixel (P11) is formed;

(B) a data line defect information, which includes data representing the position (in this case, the position between the gate line G2 and the gate line G3) of the defect (50) on the data line (D1) and an identifying data (the bit "1") representing one of the upper and lower glass substrate on which the defective data line (D) is formed; and (C) a gate line defect information, which includes data representing the position (in this case, the position between the data line D4 and the data line D5) of the defect (51) on the gate line (G1) and an identifying data (the bit "1") representing one of the upper and lower glass substrate on which the defective gate line (G1) is formed.

In a second step, the control device 53 fetches the dot defect information, the data line defect information and the gate line defect information from the memory space. In a third step, the display of the image is started. To this end, the data buffer 55 receives the data signals of one pixel row along the gate line G1 from the host processor 54, under the control of the control device 53 through a control line 58.

In a fourth step, the control device 53 determines whether there is the pixel(s), which is affected by the dot defect, the data line defect, or the gate line defect, in the first pixel row along the gate line G1, or not, and finds out that the pixel region on the upper glass substrate 22 of the pixel P11 has the dot defect, and the gate line G1 on the upper glass substrate 22 has the breakage at the position between the data line D4 and the data line D5.

In a fifth step, the control device 53 monitors the data signals for the pixel P11, which is affected by the dot defect and the pixels P15 through P1N, which are affected by the gate line defect, through a data bus 59.

Figure 3:
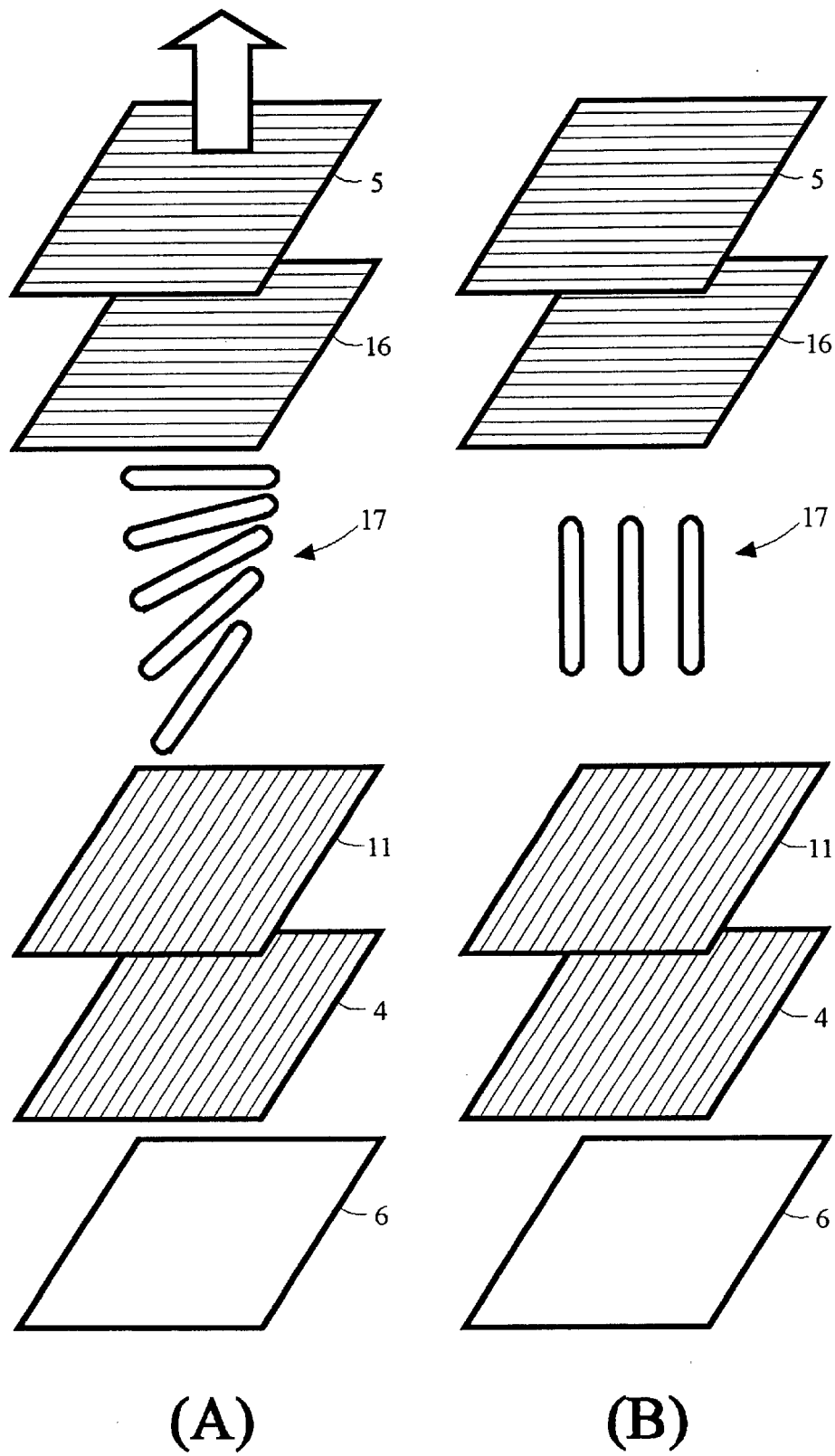
FIG. 3 shows a normally white mode operation of the LCD device 1.
Figure 4:
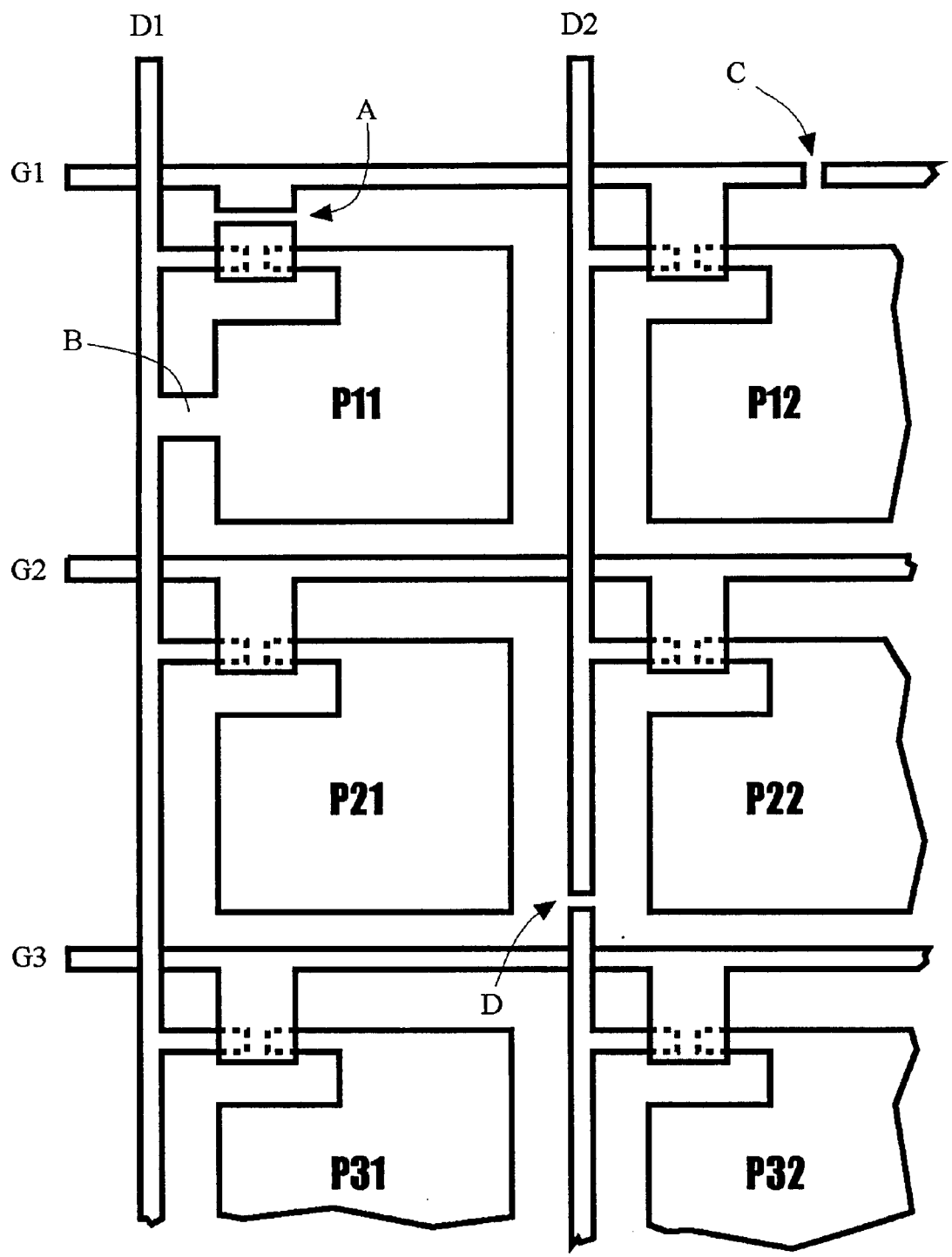
FIG. 4 shows a first problem in the conventional LCD device due to a dot defect or a line defect.

In a sixth step, the control device 53 determines whether these pixels require the application of the voltage for displaying the black level image, (e.g., the voltage for switching the state of the liquid crystal material from its steady state requiring the application of the voltage 0V), or not. It is assumed that the images displayed on the pixels P11 and the pixels P15 through P1N are, as follows:

Pixel P11: Black
Pixel P15: Black
Pixel P16: Black
Pixels P17–P1N: White The pixel displaying the black image requires the application of the voltage across the data lines on both the upper and lower glass substrates 22 and 23, as shown in FIG. 3.

In a seventh step, the control device 53 controls the switch 56 through the control line 57 to apply the voltage −5.0V to the first buffer stage 1 for the pixel P11, the fifth buffer stage for the pixel P15 and the sixth buffer stage for the pixel P16 of the sub-buffer B connected to the second data line driver 46, during the odd frame period, as shown in FIG. 9(B). Thus, the voltage −5.0V is applied to the pixel regions of the pixels P11, P15 and P16 on the lower glass substrate 23 through the data lines D1, D5 and D6, during the application of the gate pulse to the gate line G1 on both the upper and lower glass substrates 22 and 23, whereby the liquid crystal material in the pixels P11, P15 and P16 is aligned along the electric field, as shown in FIG. 3(B). Thus, the black image is displayed in the pixels P11, P15 and P16, which are affected by the dot and gate line defects.

In this manner, the control device 53 responds to the dot defect information, which represents that the pixel region of the pixel P11 on the upper glass substrate 22 is the dot defect, to increase the value of the data signal applied to the pixel region, which is formed on the lower glass substrate 23 of the dot defective pixel P11, to the voltage −5.0V during the odd frame period and the voltage +5.0V during the even frame period, and the control device 53 responds to the gate line defect information, which represents that the gate line G1 on the upper glass substrate 22 includes the breakage portion 51, to increase the value of data signal applied to the pixel regions, which are formed on the lower glass substrate 23, of each of the P15 and P16 affected by gate line defect to the voltage −5.0V during the odd frame periods and the voltage +5.0V during the even frame periods.

Next, the image is displayed on the second pixel row along the gate line G2. It is noted that the control device 53 knows that the pixels P31 through PM1 are affected by the defect 50 on the data line D1 on the upper glass substrate 22. The control device 53 performs the operation of the above described third step through seventh step. Since the second pixel row along the gate line G2 does not include any pixel affected by the dot defect, the data line defect, or the gate line defect, the voltage of the data signals in the sub-buffers A and B is not compensated. Also, the image is displayed on the second pixel row.

Next, the operation for displaying the image on the third pixel row along the gate line G3 is started. The control device 53 performs the operation of the above described third step through seventh step.

In the third step, the data buffer 55 receives the data signals of one pixel row along the gate line G3 from the host processor 54, under the control of the control device 53 through the control line 58.

In the fourth step, the control device 53 determines whether there is the pixel(s), which is affected by the dot defect, the data line defect, or the gate line defect, in the third pixel row along the gate line G3, or not, and finds out that the data line D1 on the upper glass substrate 22 has the defect 50 between the gate line G2 and the gate line G3.

In the fifth step, the control device 53 monitors the data signals for the pixel P31, which is affected by the data line defect, through the data bus 59.

In the sixth step, the control device 53 determines whether the pixel P31 require the application of the voltage for displaying the black level image, or not. The pixel P31 displaying the black image requires the application of the voltage of the amplitude 5.0V across the data lines on both the upper and lower glass substrates 22 and 23, as shown in FIG. 3.

In the seventh step, the control device 53 controls the switch 56 through the control line 57 to apply the voltage –5.0V to the buffer stage 1 for the pixel P31 of the sub-buffer B connected to the second data line driver 46, during the odd frame period, as shown in FIG. 9(B). Thus, the voltage –5.0V is applied to the pixel region of the pixel P31 on the lower glass substrate 23 through the data line D1 during the application of the gate pulse to the gate line G3 on both the upper and lower glass substrates 22 and 23, whereby the liquid crystal material in the pixels P31 is aligned along the electric field, as shown in FIG. 3(B). Hence, the black image is displayed in the pixels P31, which is affected by the data line defect.

The above operation is repeated for the pixel rows along the gate lines G4 through GM, so that the black image of the pixels P31 through PM1 which are affected by the data line defect is perfectly recovered. In this manner, the control device 53 responds to the data line defect information to increase the value of the data signal applied to the pixel region, which is formed on the lower glass substrate 23, of each of a plurality of pixels P31 through PM1 affected by the data line defect on the data line D1 on the upper glass substrate 22, to the voltage –5.0V during the odd frame periods and the voltage +5.0V during the even frame periods.

Figure 11:
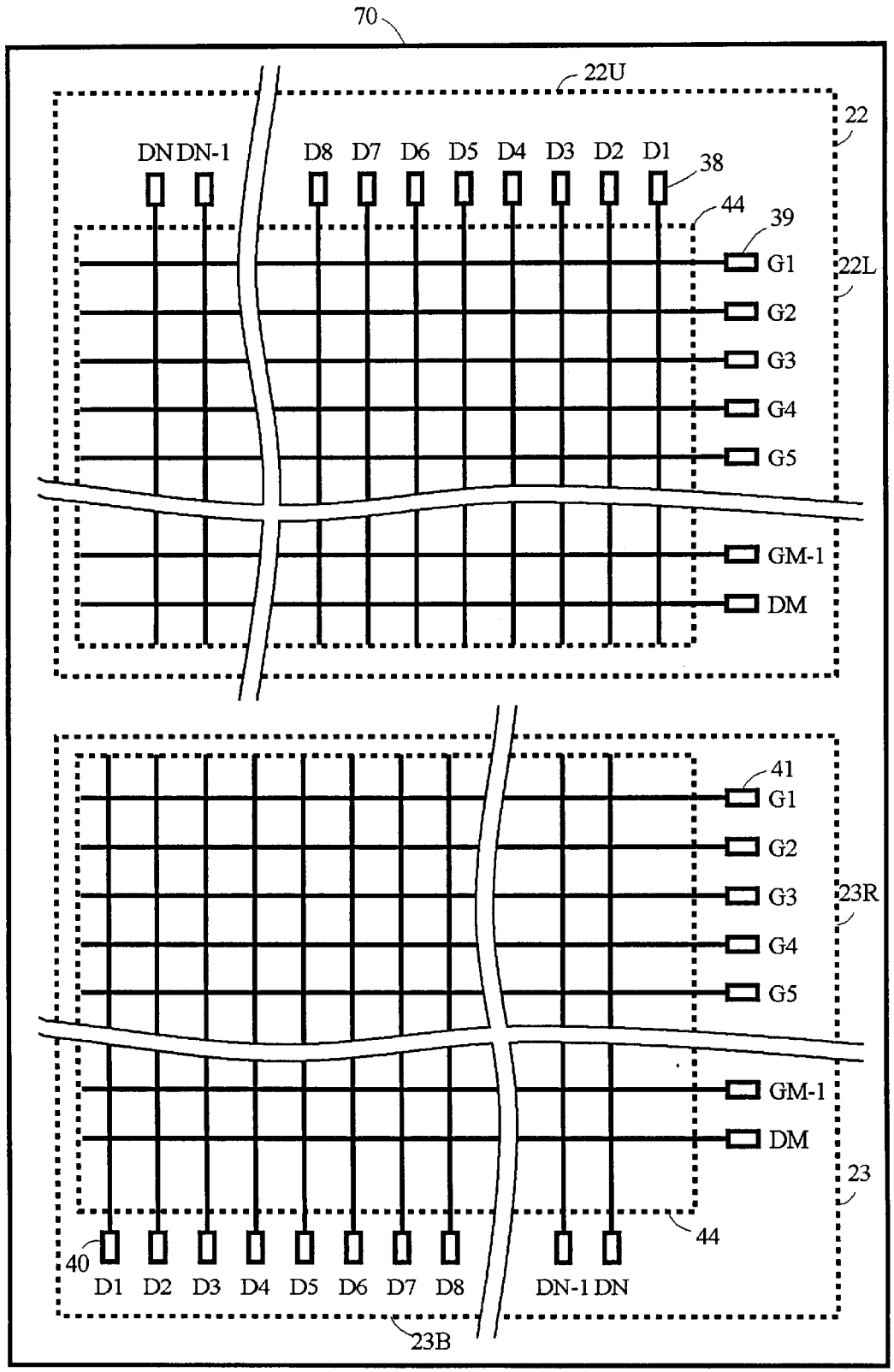
FIG. 11 shows the TFT arrays of the upper glass substrate and the lower glass substrate formed on one glass substrate in a first step of the fabricating method in accordance with the present invention.

The fabricating method of the LCD array of the first embodiment in accordance with the present invention is described. FIG. 11 shows the TFT arrays of the upper glass substrate 22 and the lower glass substrate 23, which are formed on one glass substrate in a first step of the fabricating method in accordance with the present invention.

In the first step, the pixel arrays for the upper glass substrate 22, shown by dashed line, and for the lower glass substrate 23, shown by dashed line, are formed on a first or upper portion (22) and a second or lower portion (23) of one glass substrate 70, respectively. It is noted that the first portion defined by the dashed line 22 becomes the upper glass substrate 22, and the second portion defined by the dashed line 23 becomes the lower glass substrate 23, when the glass substrate 70 is cut along the dashed lines 22 and 23, in a later cutting step. As described before, the pixel array includes the gate lines, the data lines, and the pixel regions, and the data line pads are connected to the data lines, and the gate line pads are connected to the gate lines. The pixel region, which is formed adjacent to each intersection of the gate line and the data line, includes the switching element or the TFT 27 and the ITO layer 29 (33), as shown in FIG. 6(B).

It is noted that the TFT and the ITO layer in each of the pixel regions are not shown in FIG. 11 for simplifying the drawing. The gate line is connected to a gate of the TFT 27, the data line is connected to the drain of the TFT, the source of the TFT is connected to the ITO or the display electrode 29(33). The fabricating steps of the pixel regions is later described with reference to FIGS. 26 and 27.

The pixel arrays for both the upper and the lower glass substrate 22 and 23 are formed on one glass substrate 70 so as to fabricate the two pixel arrays under the same process parameters, so that the dimensional precision of one pixel array can be the same as that of the other pixel array. The dimensional precision is very important in the LCD device of the present invention since the one pixel array faces the other pixel array. Such dimensional precision was not required in the conventional LCD device in which the common electrode and the color filter are formed on one glass substrate, and the pixel array is formed on the other glass substrate. Each of the first and second portions has a top edge, a bottom edge, a left side edge and a right side edge. More particularly, the first portion of the upper glass substrate 22 has the top edge 22U and the left side edge 22L.

It is noted that the left side edge 22L of the first portion 22 shown in the right side in FIG. 11 becomes the left side edge when the pixel array on the first portion 22 faces the pixel array on the second portion 23 in a third step later described. The second portion or the lower glass substrate 23 has the right side edge 23R and the bottom edge 23B.

The data line pads 38 in the first area adjacent to the top edge 22U of the first portion 22 are connected to the data lines D1–DN, respectively, the gate line pads 39 in a second area adjacent to the left side edge 22L of the first portion 22 are connected to the gate lines G1–GM, respectively, the data line pads 40 in a third area adjacent to the bottom edge 23B of the second portion 23 are connected to the data lines D1–DN, respectively, and the gate line pads 41 in a fourth area adjacent to the right side edge 23R of the second portion 23 are connected to the gate lines G1–GM, respectively.

In a second step, the glass substrate 70 is cut along the dashed lines 22 and 23. In a third step, the upper glass substrate 22 and the lower glass substrate 23 are arranged to align the pixel array on the upper glass substrate 22 to the pixel array on the lower glass substrate 23, as shown in FIG. 5. It is noted that the sealing material is applied in the sealing area 44 shown in FIG. 5 and FIG. 11. In the fabrication of the LCD device of the first embodiment, the gate lines G1 through GM on the upper glass substrate 22 face the gate lines G1 through GM on the lower glass substrate 23, respectively, and the data lines D1 through DN on the upper glass substrate 22 face the data lines D1 through DN on the lower glass substrate 23, respectively, as shown in FIG. 6(A).

In a fourth step, the sealing material is cured, so that the upper glass substrate 22 and the lower glass substrate 23 are bonded along the sealing area 44, as shown in FIGS. 5 and 11, and the pixel arrays on both the upper and lower glass substrates 22 and 23 are enclosed within the area surrounded by the sealing area 44.

In a fifth step, the liquid crystal material, the TN liquid crystal in the case of the first embodiment, is filled into the space surrounded by the sealing area 44 through a small port in the sealing area 44, and the small port is closed.

In a sixth step, the IC modules 42A–42F and 43A–43F are mounted to connect the connecting pads, as shown in FIG. 5. More particularly, the first data line driver 45 is connected to the data line pads 38 in the first area adjacent to the top edge of the upper glass substrate 22, the first gate line driver 47 is connected to the gate line pads 39 in the second area adjacent to the left side edge of the upper glass substrate 22, the second data line driver 46 is connected to the data line pads 40 in the third area; and the second gate line driver 48 is connected to the gate line pads 41 in the fourth area.

Second Embodiment

Figure 12:
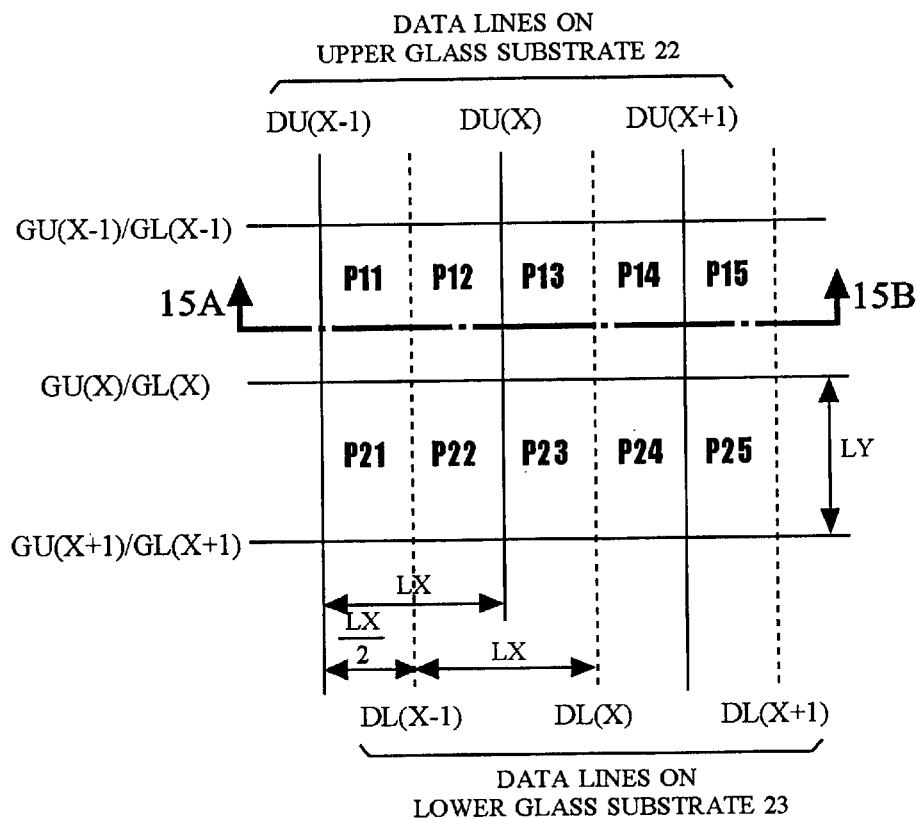
FIG. 12 shows the arrangement of the array on the first or upper glass substrate 22 and the array on the lower glass substrate 23 in a second embodiment of the present invention.
Figure 13:
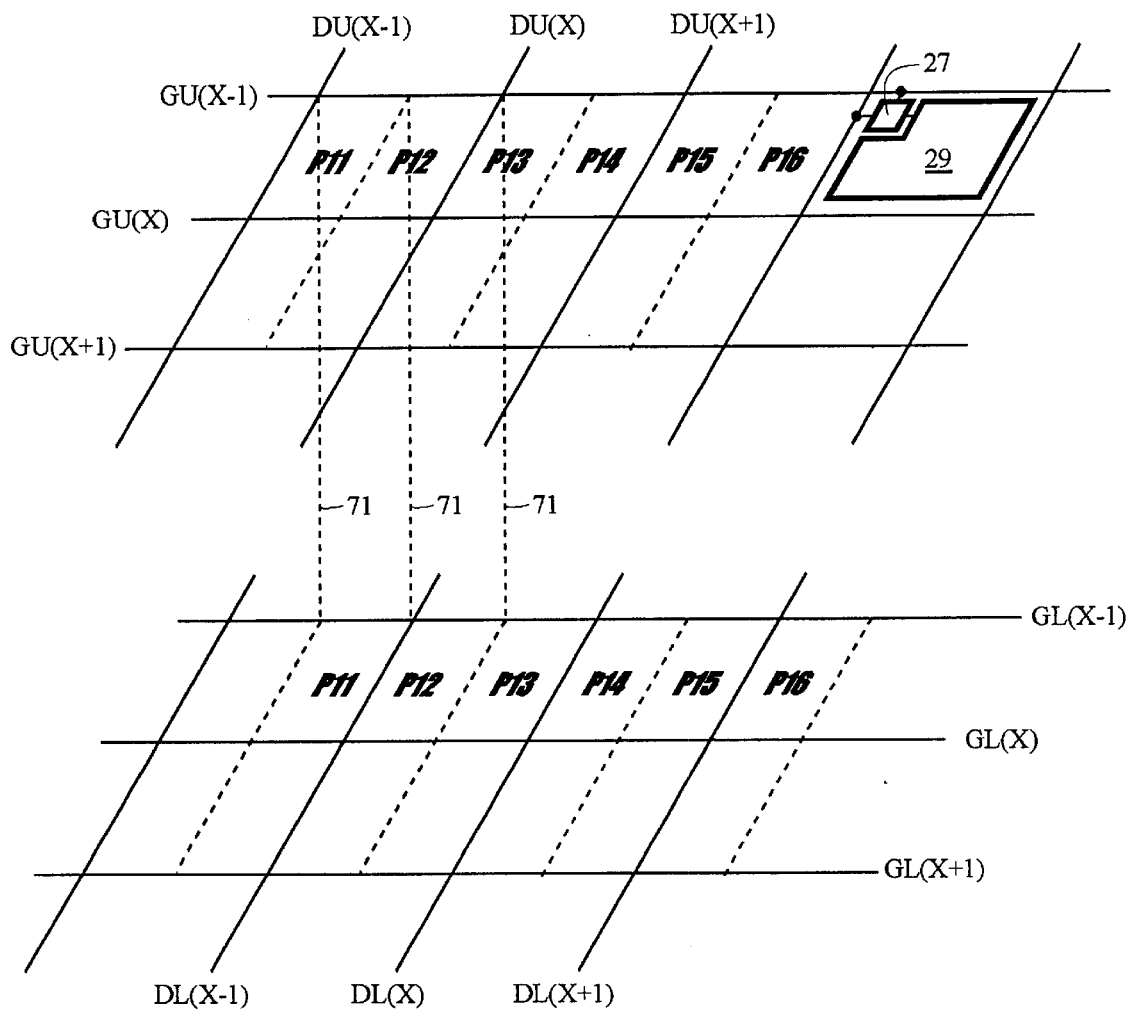
FIG. 13 shows the arrangement of the array on the first or upper glass substrate 22 and the array on the lower glass substrate 23 in the second embodiment of the present invention.

FIGS. 12 and 13 show the arrangement of the pixel array on the first or upper glass substrate 22 and the pixel array on the lower glass substrate 23 in the second embodiment of the present invention. It is noted that the structure of the LCD device of the second embodiment is substantially the same as that of the first embodiment except the positioning of the pixel array of the first or upper glass substrate 22 with respect to the pixel array of the lower glass substrate 23.

The second embodiment of the present invention increases the number of pixels in the horizontal direction along the gate lines viewed by the user to the value which is twice the number of pixels of the first embodiment. In the second embodiment, each of the pixel regions on the upper glass substrate 22 is shifted in the horizontal direction (e.g., the direction along the gate line) by a distance which is equal to half of the width (e.g., the length along the gate line), of the pixel region with respect to the pixel region on the lower glass substrate 23. Each of the pixel regions on the upper glass substrate 22 is not shifted in the vertical direction (e.g., the direction along the data line) with respect to the pixel region on the lower glass substrate 23. That is, each of the pixel regions on the upper glass substrate 22 is aligned to the pixel region on the lower glass substrate 23 in the vertical direction. This alignment is performed by aligning the gate lines on the upper glass substrate 22 to the gate lines on the lower glass substrate 23. In the following description, it is assumed that the width (e.g., the length along the gate line) of the pixel region is equal to a distance between a center of one gate line and a center of an adjacent gate line.

A distance between a center of one data line, (e.g. DU(X−1) or DL(X−1)), and a center of next data line, (e.g. DU(X) or DL(X)) is a distance LX, and a distance between a center of one gate line, (e.g. GU(X−1) or GL(X−1)), and a center of next gate line, (e.g. GU(X) or GL(X)) is a distance LY. The gate lines on the upper glass substrate 22 are aligned to the gate lines on the lower glass substrate 23, respectively, and each of the data lines on the upper glass substrate 22 is aligned to an intermediate position between the data lines on the lower glass substrate 23, respectively, as shown by the dashed lines 71 in FIG. 13. More particularly, the intermediate position is separated by LX/2 from a center of the data line. That is, the data lines on the upper glass substrate 22 are shifted from the data lines on the lower glass substrate 23, respectively in the horizontal direction along the gate lines by the distance LX/2.

As described before, the pixel array on each of the upper and lower glass substrate 22 and 23 includes a plurality of pixel regions, and each of the pixel regions is formed adjacent to each intersection of the gate line and the data lines, and the pixel region includes the display electrode 29 and the TFT 27, as shown in one pixel region in FIG. 13. By shifting the position of the data lines on the upper glass substrate 22 from the position of the data lines on the lower glass substrate 23, one display electrode 29 on the upper and lower glass substrates is divided into the two pixel regions. One pixel region at the intersection of the gate line, for example GU(X−1), and the data line, for example DU(X−1), on the upper glass substrate 22 is divided in the vertical direction to form two pixel regions (P11, P12), so that the number of pixels in the horizontal direction viewed by the user is increased to the value which is twice the number of pixels of the first embodiment.

Figure 14:
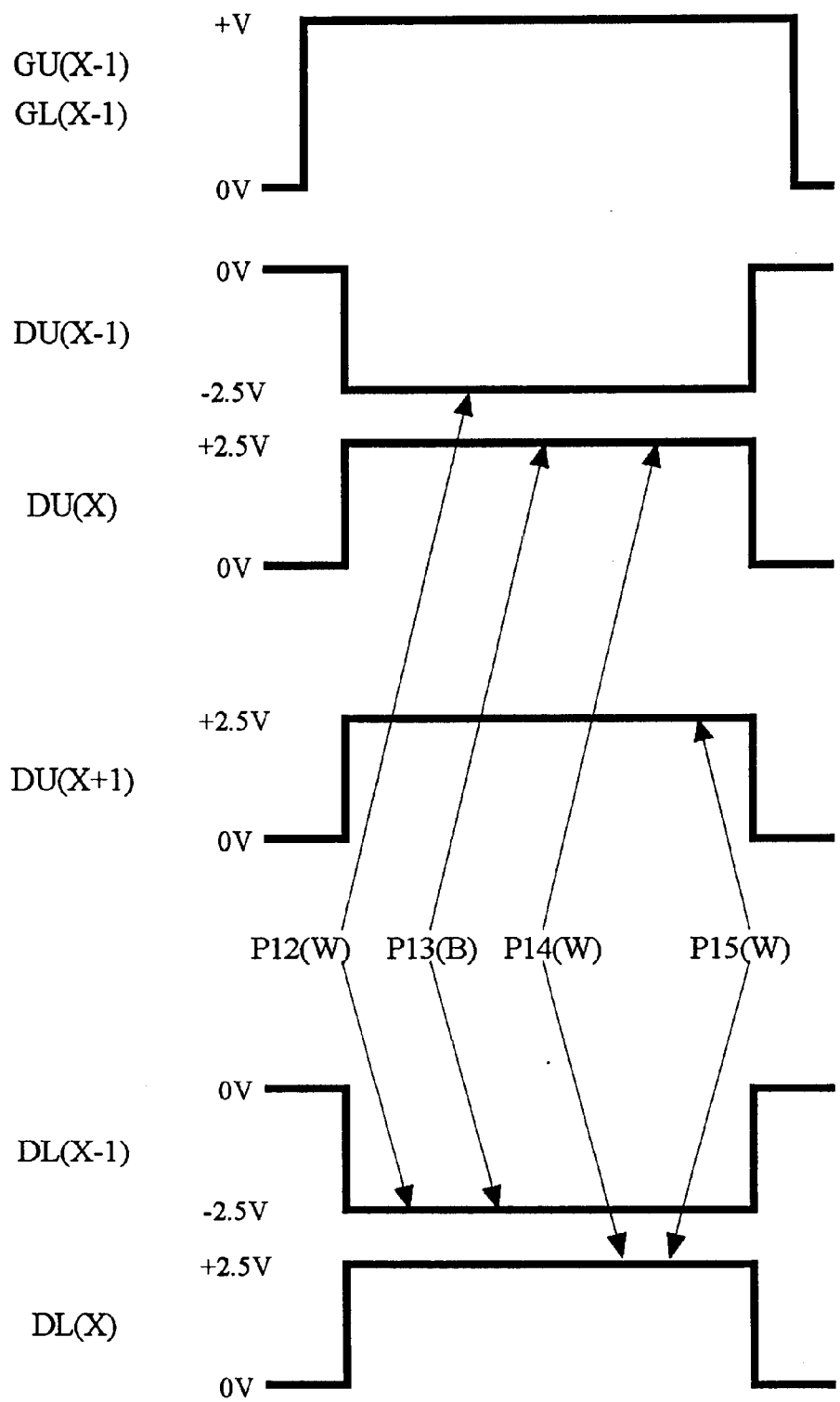
FIG. 14 shows the gate pulses and the data pulses applied to the gate lines and the data lines on the upper and lower glass substrates 22 and 23.

The operation of the second embodiment is described with reference to FIG. 14. FIG. 14 shows the gate pulses and the data pulses applied to the gate lines and the data lines on the upper and lower glass substrates 22 and 23. It is assumed that the pixel P12 displays the white image, the pixel P13 displays the black image, the pixel P14 displays the white image, and the pixel P15 displays the white image.

The Pixel P12 (White Image)

The pixel P12 is constituted by the right half of the upper pixel region at the intersection of the gate line GU(X−1) and the data line DU(X−1) and the left half of the lower pixel region at the intersection of the gate line GL(X−1) and the data line DL(X−1). To display the white image, the voltage 0V is applied to the liquid crystal material, as shown in FIG. 3(A). It is assumed that the voltage −2.5V is applied to the data line DU(X−1). It is noted that the voltage applied to the data line DL(X−1) is selected based upon the value of the voltage on the data line DU(X−1). Therefore, during the application of the gate pulses to the gate lines GU(X−1) and GL(X−1), the voltage −2.5V is applied to the data line DU(X−1), and the voltage −2.5V is applied to the data line DL(X−1), as shown in FIG. 14.

The Pixel P13 (Black Image)

The pixel P13 is constituted by the left half of the upper pixel region at the intersection of the gate line GU(X−1) and the data line DU(X) and the right half of the lower pixel region at the intersection of the gate line GL(X−1) and the data line DL(X−1). To display the black image, the voltage 5V is applied to the liquid crystal material, as shown in FIG. 3(B). Since the voltage −2.5V is being applied to the data line DL(X−1), the voltage applied to the data line DU(X) is selected based upon the value of the voltage on the data line DL(X−1). Therefore, during the application of the gate pulses to the gate lines GU(X−1) and GL(X−1), the voltage +2.5V is applied to the data line DU(X), and the voltage −2.5V is applied to the data line DL(X−1), as shown in FIG. 14.

The Pixel P14 (White Image)

The pixel P14 is constituted by the right half of the upper pixel region at the intersection of the gate line GU(X−1) and the data line DU(X) and the left half of the lower pixel region at the intersection of the gate line GL(X−1) and the data line DL(X). To display the white image, the voltage 0V is applied to the liquid crystal material, as shown in FIG. 3(A). Since the voltage +2.5V is being applied to the data line DU(X), the voltage applied to the data line DL(X) is selected based upon the value of the voltage on the data line DU(X). Therefore, during the application of the gate pulses to the gate lines GU(X−1) and GL(X−1), the voltage +2.5V is applied to the data line DU(X), and the voltage +2.5V is applied to the data line DL(X), as shown in FIG. 14.

The Pixel P15 (White Image)

The pixel P15 is constituted by the left half of the upper pixel region at the intersection of the gate line GU(X−1) and the data line DU(X+1) and the right half of the lower pixel region at the intersection of the gate line GU(X−1) and the data line DL(X). To display the white image, the voltage 0V is applied to the liquid crystal material, as shown in FIG. 3(A). Since the voltage +2.5V is being applied to the data line DL(X), the voltage applied to the data line DU(X+1) is selected based upon the value of the voltage on the data line DL(X). Therefore, during the application of the gate pulses to the gate lines GU(X−1) and GL(X−1), the voltage +2.5V is applied to the data line DU(X+1), and the voltage +2.5V is applied to the data line DL(X), as shown in FIG. 14.

Although the operation for displaying the image is described for only four pixels, the above operation is performed for all the pixels in the second embodiment.

The first and second data line drivers 45 and 46 shown in FIG. 8 simultaneously apply the above data signals to the upper and lower data lines during the application of the gate pulses to the upper and lower gate lines, respectively.

Figure 15:
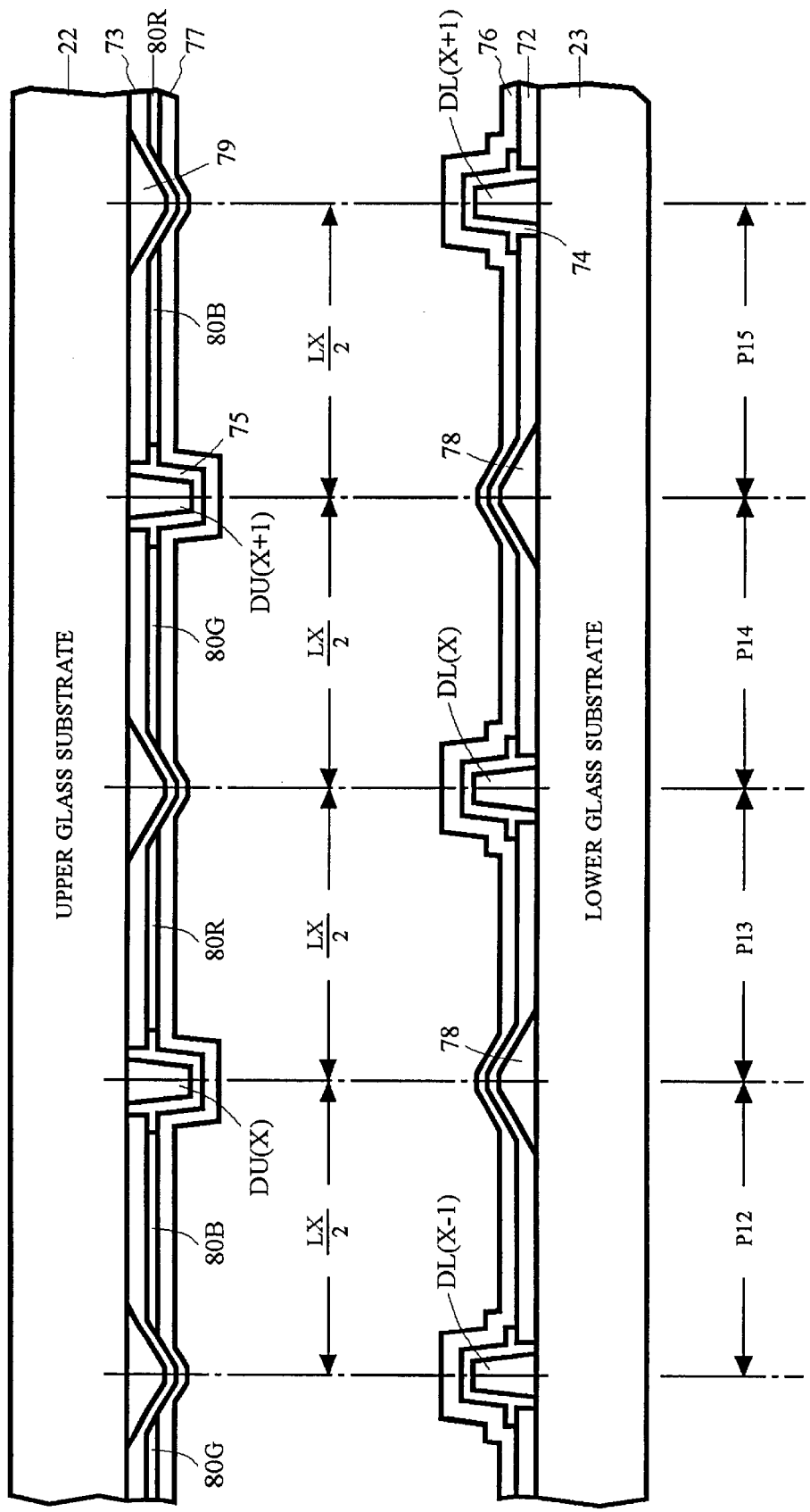
FIG. 15 shows a cross section of the structure formed on the upper and lower glass substrates 22 and 23 along dashed lines 15A—15A in FIG. 12.

FIG. 15 shows a cross section of the structure formed on the upper and lower glass substrates 22 and 23 along dashed lines 15A—15A in FIG. 12. It is noted that the structure on the glass substrates 22 and 23 is simplified to show the concept of the present invention. Although the LCD device of the second embodiment includes the upper polarizer plate 25, the lower polarizer plate 24 and the backlight device 26 shown in FIG. 10, these are not shown in FIG. 15.

Regarding the structure on the lower glass substrate 23, the data lines DL(X−1), DL(X) and DL(X+1) are formed on the lower glass substrate 23. The data lines are constituted by three layers (e.g., Mo layer, Al layer and Mo layer). The display electrodes 72 (e.g., ITO layers) are formed on the glass substrate 23 between the data lines. Passivation layers, such as an $SiN_x$ layer, 74 is formed to cover the data lines and to isolate the ITO layers 72 from the data lines.

Figure 26:
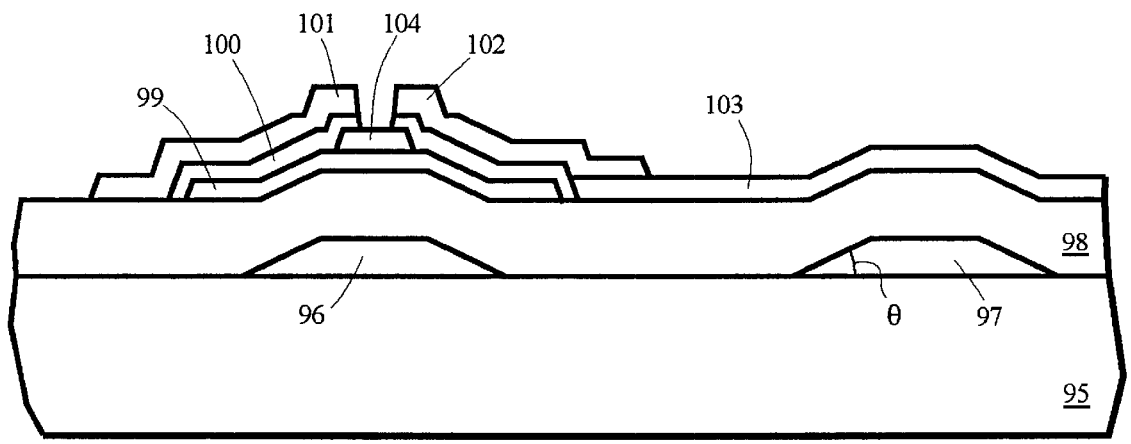
FIG. 26 shows the structure of the pixel region using the reversed staggered type TFT, which can be used in the present invention.
Figure 27:
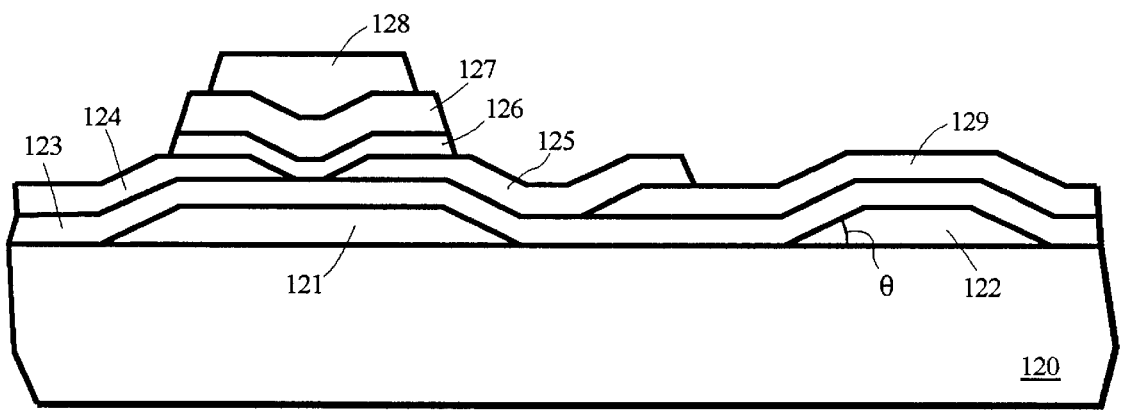
FIG. 27 shows the structure of the pixel region using the staggered type TFT, which can be used in the present invention.
Figure 28:
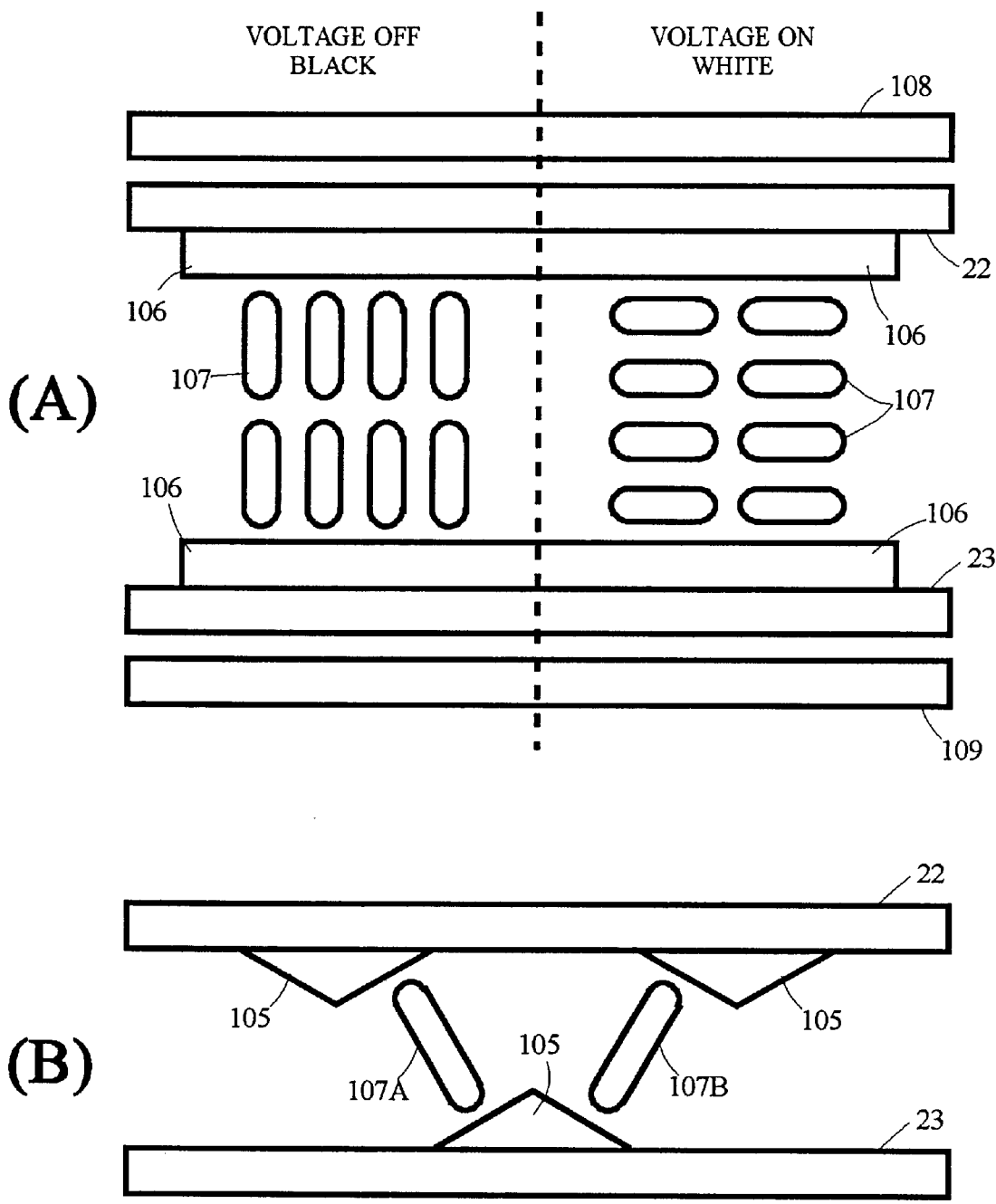
FIG. 28 shows the characteristic of the vertically aligned (VA) liquid crystal material.

Black matrix 78 is formed on the lower glass substrate 23 to face each of the data line on the upper glass substrate 22. It is noted that, when the reversed staggered type TFT, as shown in FIG. 26, is used as the switching element of the pixel region, the black matrices 78 (79), which correspond to the black matrix 97 in FIG. 26, and the gate lines made of MoW are simultaneously formed on the lower or upper glass substrate 23 or 22. When the staggered type TFT, as shown in FIG. 27, is used as the switching element of the pixel region, the black matrix 78 (79), which correspond to the black matrices 122, and the light shielding layer 121 made of Mo or Cu are simultaneously formed on the lower or upper glass substrate 23 or 22. The upper surface of each of the gate lines and the black matrices 78 is inclined to realize the smooth running of the ITO layer 72 and the alignment layer 76, such as the polyimide layer. The alignment layer 76 is formed to cover the entire structure. The distance between the center of the data line and the center of the black matrix 78 is the above value LX/2, so that the pixels P12, P13, P14 and P15 are defined, as shown in FIG. 15.

Regarding the structure on the upper glass substrate 22, the structure on the upper glass substrate 22 is substantially the same as that on the lower glass substrate 23, except that the substrate 22 includes the color filters. More particularly, the upper glass substrate 22 includes the black matrices 79, the data lines DU(X) and DU(X+1), the passivation layers 75, the display electrodes or the ITO layer 73 and the alignment layer 77. Further, one color filter for one pixel is sandwiched between the ITO layer 73 and the alignment layer 77. For example, the blue color filter 80B is form ed for the pixel P12, the red color filter 80R is formed for the green color filter 80G is formed for the pixel P14 and the blue color filter 80B is formed for the pixel P15. The alignment layer 77 is formed on the color filters and the passivation layer 75. The angle between the rubbing direction of the alignment layer 76 and the rubbing direction of the alignment layer 77 is about 90 degrees, as in the conventional technology shown in FIG. 3.

The twisted nematic liquid crystal material, not shown, is sandwiched between the lower alignment layer 76 and the upper alignment layer 77, and is twisted between the alignment layer 76 and the alignment layer 77 by 90 degrees, when the voltage 0V is applied, as in the conventional technology shown in FIG. 3.

In this manner, a plurality of black matrices 79, each of which is positioned to face one data line formed on the second or lower glass substrate 23, are formed in parallel to the data lines on the first or upper glass substrate 22, and a plurality of black matrices 78, each of which is positioned to face one data line formed on the upper glass substrate 22, are formed in parallel to the data lines on the lower glass substrate 23. A plurality of color filters are formed on the upper glass substrate 22, and each of the color filters is formed at a position between the upper data line and the black matrix. The center of the data line and the center of the black matrix is spaced by the distance LX/2.

Figure 16:
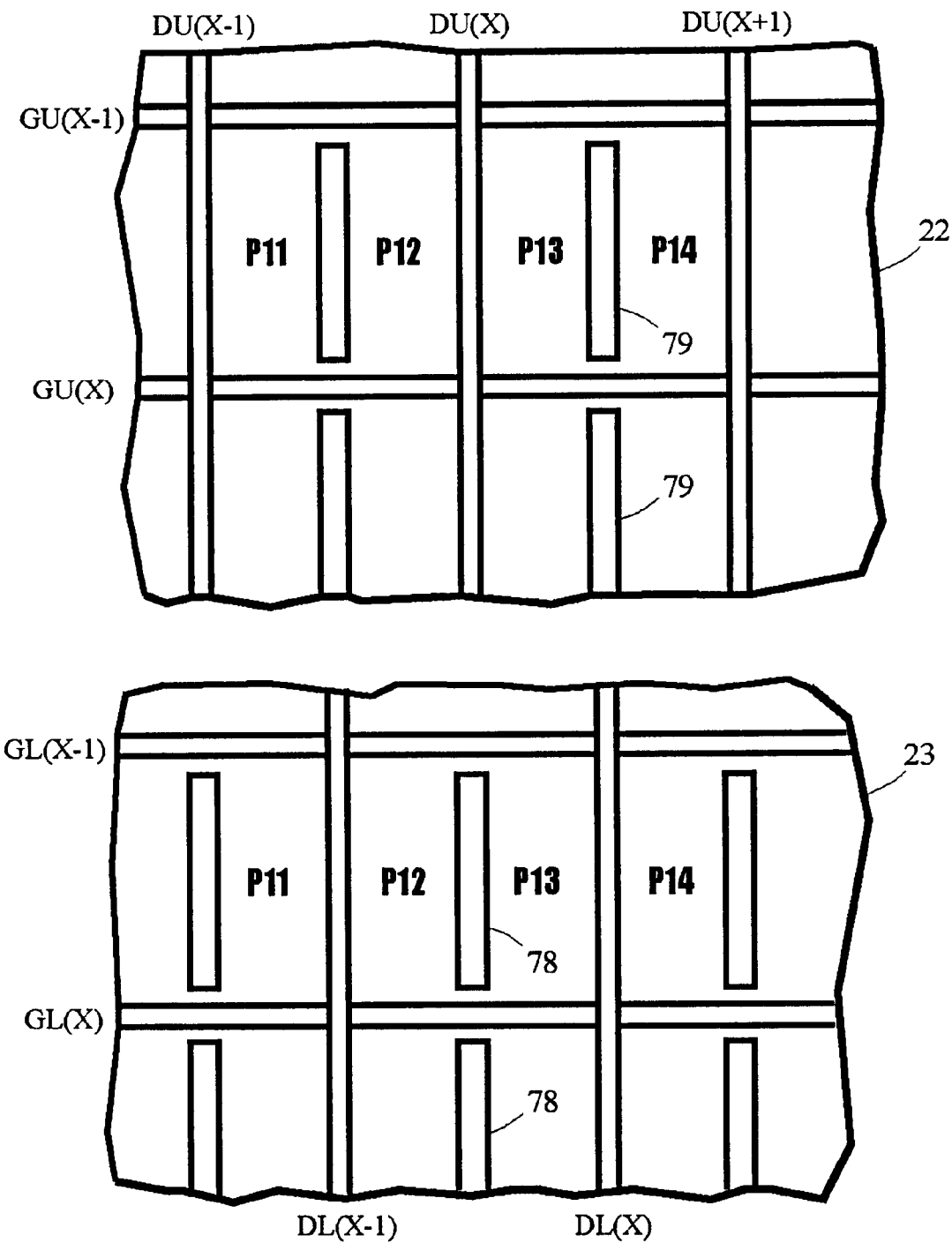
FIG. 16 shows the arrangement of the data lines and the gate lines on the upper and the lower glass substrates 22 and 23.

FIG. 16 shows the arrangement of the data lines and the gate lines on the upper and the lower glass substrates 22 and 23. The data lines and the gate lines at their intersection are separated by the insulating layers. The TFT and the ITO layer in each of the pixel regions are not shown in FIG. 16 for simplifying the drawing. A plurality of black matrices 79, each of which is positioned to face one data line formed on the lower glass substrate 23, are formed in parallel to the data lines on the upper glass substrate 22, and a plurality of black matrices 78, each of which is positioned to face one data line formed on the upper glass substrate 22, are formed in parallel to the data lines on the lower glass substrate 23. The black matrices 78 and 79, which extend in the perpendicular direction to the gate lines, are separated from the gate lines to prevent the shortage of the adjacent gate lines.

The fabricating process of the second embodiment includes the first step through the sixth step of the first embodiment, but the first and third steps are modified, as follows.

First Step

When the reversed staggered type TFT, as shown in FIG. 26, is used as the switching element of the pixel region, the black matrices 78 (79) and the gate lines made of MoW are simultaneously formed on the lower or upper glass substrate 23 or 22. When the staggered type TFT, as shown in FIG. 27, is used as the switching element of the pixel region, the black matrices 122 and the light shielding layer 121 made of Mo or Cu are simultaneously formed on the lower or upper glass substrate 23 or 22. Further, a plurality of color filters are formed on the upper glass substrate 22, wherein each of the color filters is formed at a position between the upper data line and the black matrix.

Third Step

Each of the pixel regions on the upper glass substrate 22 is shifted in the horizontal direction (e.g., the direction along the gate line) by a distance which is equal to half of the width (e.g., the length along the gate line) of the pixel region with respect to the pixel region on the lower glass substrate 23. Each of the pixel regions on the upper glass substrate 22 is not shifted in the vertical direction (e.g., the direction along the data line) with respect to the pixel region on the lower glass substrate 23. The data lines on the upper glass substrate 22 face the black matrices 78 on the lower glass substrate 23, respectively, and the data lines on the lower glass substrate 23 face the black matrices 79 on the upper glass substrate 22, respectively.

Third Embodiment

Figure 17:
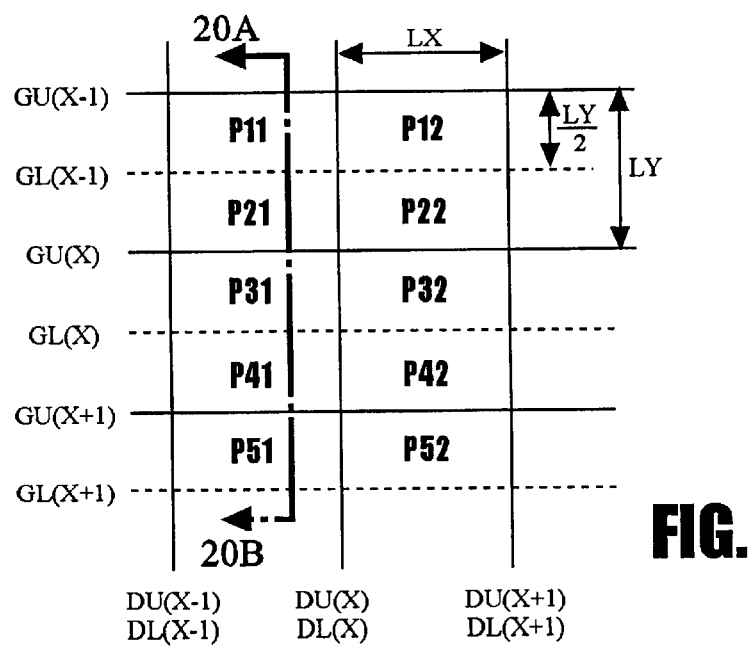
FIG. 17 shows the arrangement of the array on the first or upper glass substrate 22 and the array on the lower glass substrate 23 in a third embodiment of the present invention.
Figure 18:
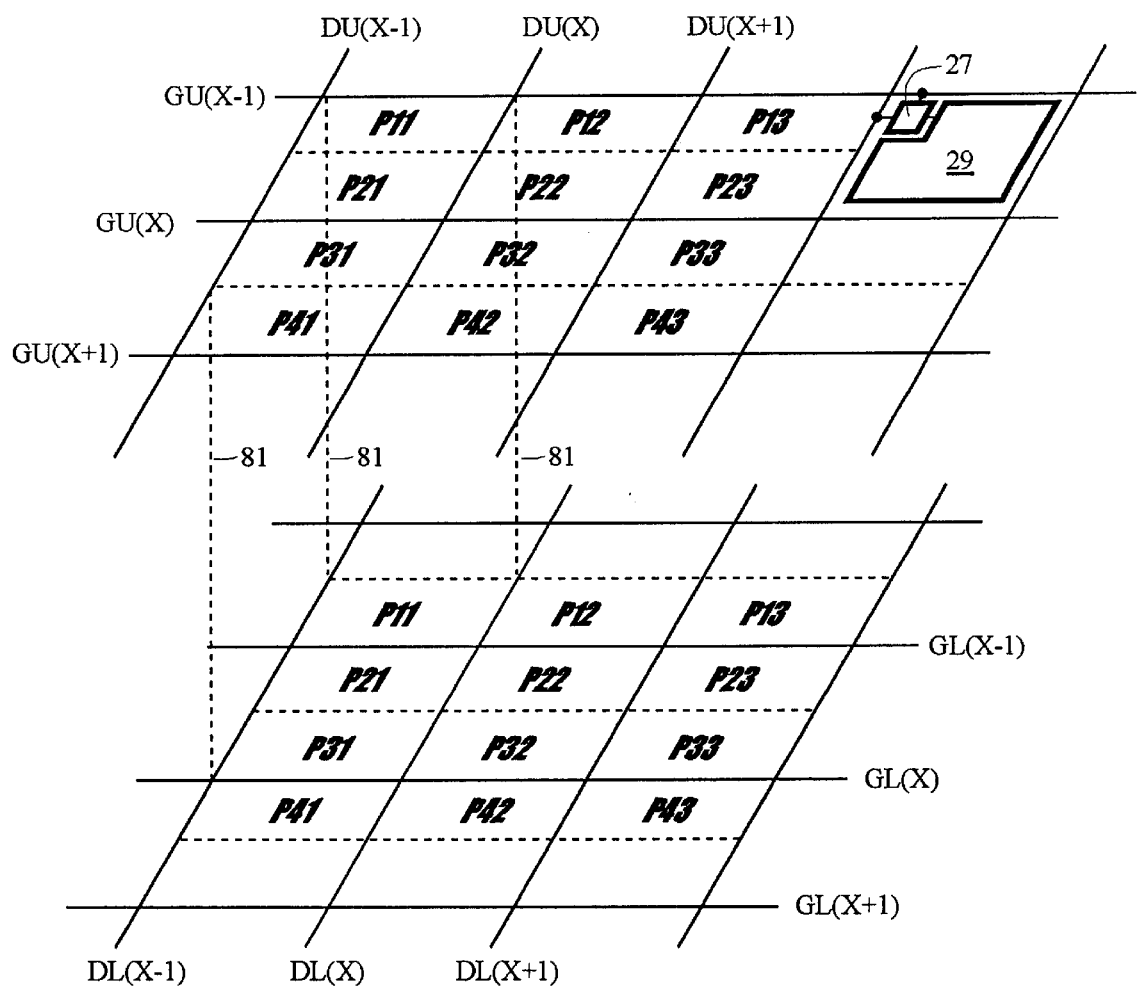
FIG. 18 show the arrangement of the array on the first or upper glass substrate 22 and the array on the lower glass substrate 23 in the third embodiment of the present invention.

FIGS. 17 and 18 show the arrangement of the pixel array on the first or upper glass substrate 22 and the pixel array on the lower glass substrate 23 in the third embodiment of the present invention. It is noted that the structure of the LCD device of the third embodiment is substantially the same as that of the first embodiment except the positioning of the array on the first or upper glass substrate 22 with respect to the array on the lower glass substrate 23.

The third embodiment of the present invention increases the number of pixels in the vertical direction along the data lines viewed by the user to twice the number of pixels of the first embodiment. In the third embodiment, each of the pixel regions on the upper glass substrate 22 is shifted in the vertical direction (e.g., the direction along the data line) by a distance which is equal to the half of the height (e.g., the length along the data line) of the pixel region with respect to the pixel region on the lower glass substrate 23. Each of the pixel regions on the upper glass substrate 22 is not shifted in the horizontal direction (e.g., the direction along the gate line) with respect to the pixel region on the lower glass substrate 23. That is, each of the pixel regions on the upper glass substrate 22 is aligned to the pixel region on the lower glass substrate 23 in the horizontal direction. This alignment is performed by aligning the data lines on the upper glass substrate 22 to the data lines on the lower glass substrate 23.

In the following description, it is assumed that the height (e.g., the length along the data line) of the pixel region is equal to a distance between a center of one data line and a center of an adjacent data line. A distance between a center of one data line (e.g., DU(X−1) or DL(X−1)), and a center of next data line (e.g., DU(X) or DL(X)) is a distance LX, and a distance between a center of one gate line (e.g., GU(X−1) or GL(X−1)), and a center of next gate line (e.g., GU(X) or GL(X)), is a distance LY. The data lines on the upper glass substrate 22 are aligned to the data lines on the lower glass substrate 23, respectively, and each of the gate lines on the upper glass substrate 22 is aligned to an intermediate position between the gate lines on the lower glass substrate 23, respectively, as shown by the dashed lines 81 in FIG. 18. More particularly, the intermediate position is separated by LY/2 from a center of the gate line. That is, the gate lines on the upper glass substrate 22 are shifted from the gate lines on the lower glass substrate 23, respectively in the vertical direction along the data lines by the distance LY/2.

As described before, the pixel array on each of the upper and lower glass substrate 22 and 23 includes a plurality of pixel regions, and each of the pixel regions is formed adjacent to each intersection of the gate line and the data lines, and the pixel region includes the display electrode 29 and the TFT 27, as shown in one pixel region in FIG. 18. By shifting the position of the gate lines on the upper glass substrate 22 from the position of the gate lines on the lower glass substrate 23, one display electrode 29 on the upper and lower glass substrates is divided into the two pixel regions. One pixel region at the intersection of the gate line, for example GU(X−1), and the data line, for example DU(X−1), on the upper glass substrate 22 is divided in the horizontal direction to form the two pixel regions (P11, P21). Thus, the number of pixels in the vertical direction viewed by the user is increased to twice the number of pixels of the first embodiment.

Figure 19:
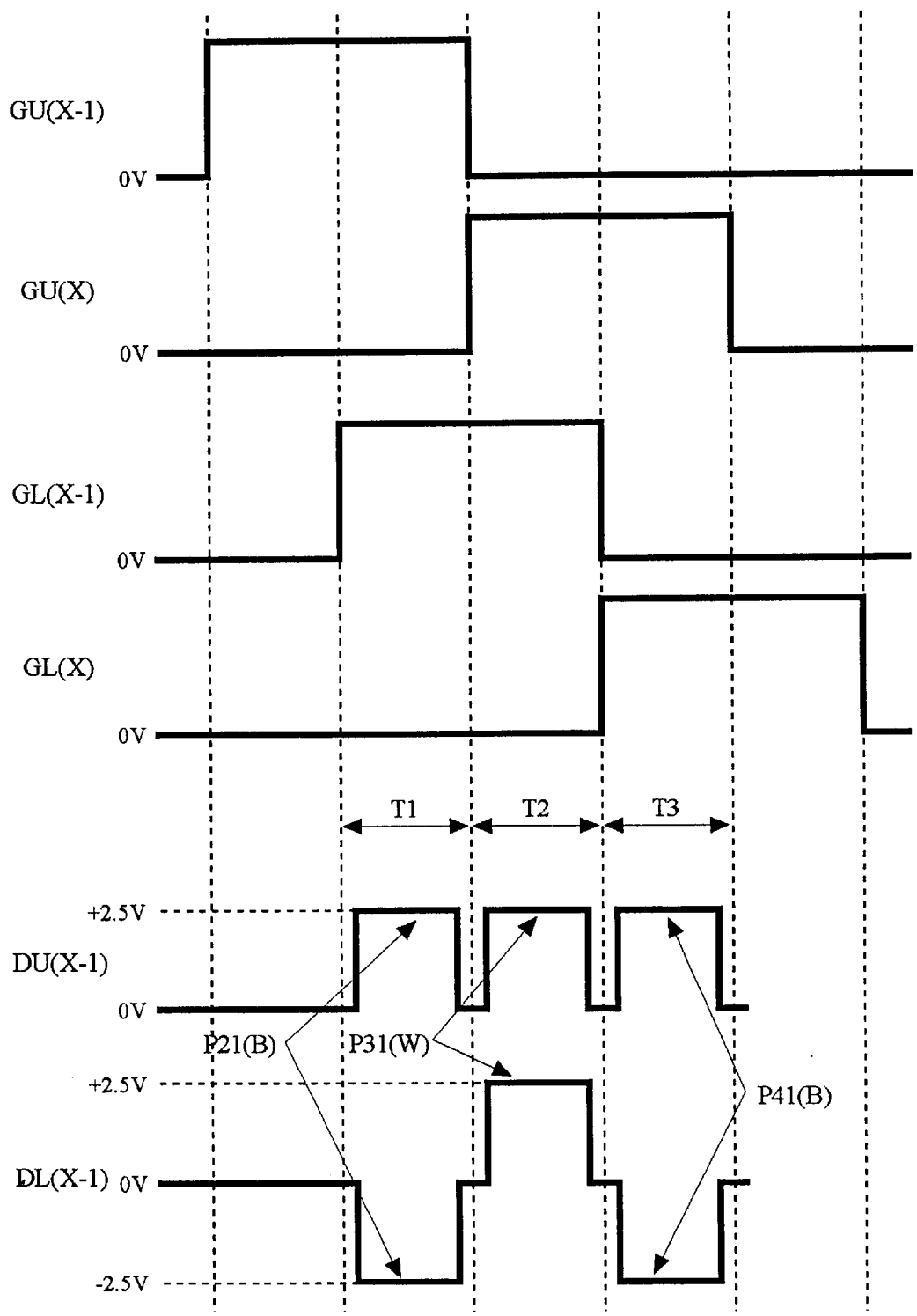
FIG. 19 shows the gate pulses and the data pulses applied to the gate lines and the data lines on the upper and lower glass substrates 22 and 23.

The operation of the third embodiment is described with reference to FIG. 19. FIG. 19 shows the gate pulses and the data pulses applied to the gate lines and the data lines on the upper and lower glass substrates 22 and 23. It is assumed that the pixel P21 displays the black image, the pixel P31 displays the white image, and the pixel P41 displays the black image.

In the third embodiment, the phase of the gate pulse to the upper glass substrate 22 is shifted from the phase of the gate pulse to the lower glass substrate 23 by a period T which is substantially equal to half of the duration of the gate pulse. For example, the difference between a rising edge of the gate pulse GU(X−1) and the rising edge of the gate pulse GL(X−1) relating to one pixel row is substantially equal to the period T.

To display the image on one pixel, the data signals are applied to the upper and lower data lines, respectively, during the period T, which is defined by the first half of the gate pulse to the upper gate line and the second half of the gate pulse to the lower gate line, or the period T, which is defined by the second half of the gate pulse to the upper gate line and the first half of the gate pulse to the lower gate line.

The Pixel P21 (Black Image)

The pixel P21 is constituted by the lower half of the upper pixel region at the intersection of the gate line GU(X−1) and the data line DU(X−1) and the upper half of the lower pixel region at the intersection of the gate line GL(X−1) and the data line DL(X−1). To display the black image, the voltage 5V is applied to the liquid crystal material, as shown in FIG. 3(B). During the period T1 which is defined by the second half of the gate pulse GU(X−1) and the first half of the gate pulse GL(X−1), the voltage +2.5V is applied to the data line DU(X−1), and the voltage −2.5V is applied to the data line DL(X−1), as shown in FIG. 19.

The Pixel P31 (White Image)

The pixel P31 is constituted by the upper half of the upper pixel region at the intersection of the gate line GU(X) and the data line DU(X−1) and the lower half of the lower pixel region at the intersection of the gate line GL(X−1) and the data line DL(X−1). To display the white image, the voltage 0V is applied to the liquid crystal material, as shown in FIG. 3(A). During the period T2 which is defined by the first half of the gate pulse GU(X) and the second half of the gate pulse GL(X−1), the voltage +2.5V is applied to the data line DU(X−1), and the voltage +2.5V is applied to the data line DL(X−1), as shown in FIG. 19.

The Pixel P41 (Black Image)

The pixel P41 is constituted by the lower half of the upper pixel region at the intersection of the gate line GU(X) and the data line DU(X−1) and the upper half of the lower pixel region at the intersection of the gate line GL(X) and the data line DL(X−1). To display the black image, the voltage 5V is applied to the liquid crystal material, as shown in FIG. 3(B). During the period T3 which is defined by the second half of the gate pulse GU(X) and the first half of the gate pulse GL(X), the voltage +2.5V is applied to the data line DU(X−1), and the voltage −2.5V is applied to the data line DL(X−1), as shown in FIG. 19.

Although the operation for displaying the image is described for only three pixels, the above operation is performed for all the pixels in the third embodiment.

The first and second gate line drivers 47 and 48 shown in FIG. 8 apply the above gate pulses, and the first and second data line drivers 45 and 46 shown in FIG. 8 simultaneously apply the above data signals to the upper and lower data lines during the application of the gate pulses to the upper and lower gate lines, respectively.

Figure 20:
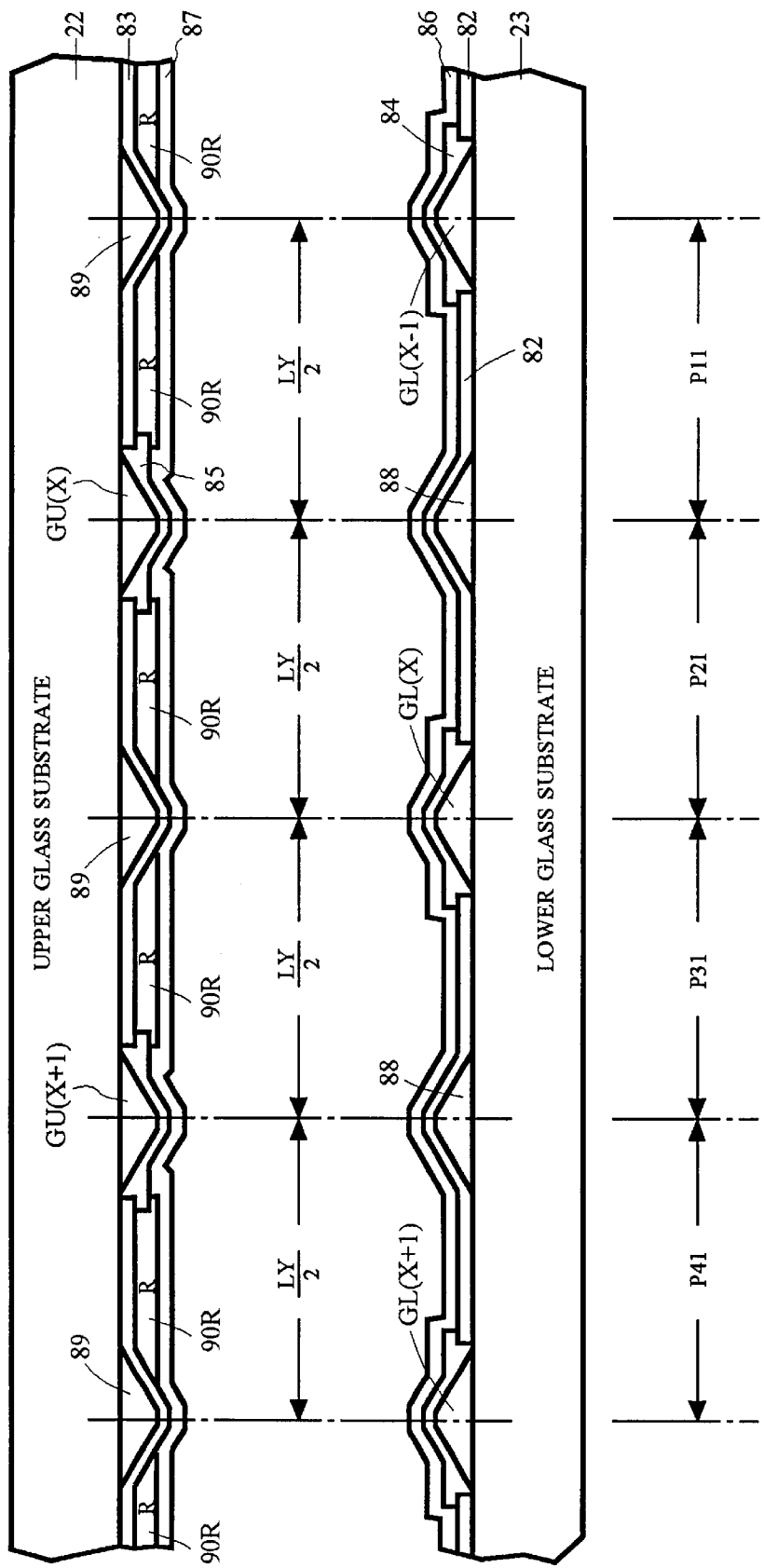
FIG. 20 shows a cross section of the structure formed on the upper and lower glass substrates 22 and 23 along dashed lines 20A—20B in FIG. 17.

FIG. 20 shows a cross section of the structure formed on the upper and lower glass substrates 22 and 23 along dashed lines 20A–20B in FIG. 17. It is noted that the structure on the glass substrates 22 and 23 is simplified to show the concept of the present invention. Although the LCD device of the third embodiment includes the upper polarizer plate 25, the lower polarizer plate 24 and the backlight device 26 shown in FIG. 10, these are not shown in FIG. 20.

Regarding the structure on the lower glass substrate 23, the data lines DL(X−1), DL(X) and DL(X+1) are formed on the lower glass substrate 23. The data lines are constituted by three layers (e.g., Mo layer, Al layer and Mo layer). The display electrodes 82 (e.g., ITO layers) are formed on the glass substrate 23 between the data lines. Passivation layers 84, such as an $SiN_x$ layer, is formed to cover the data lines and to isolate the ITO layers 82 from the data lines. Black matrix 88 is formed on the lower glass substrate 23 to face each of the gate lines on the upper glass substrate 22.

It is noted that, when the reversed staggered type TFT, as shown in FIG. 26, is used as the switching element of the pixel region, the black matrices 88 (89), which correspond to the black matrix 97 in FIG. 26, and the gate lines made of MoW are simultaneously formed on the lower or upper glass substrate 23 or 22. When the staggered type TFT, as shown in FIG. 27, is used as the switching element of the pixel region, the black matrix 88 (89), which correspond to the black matrices 122, and the light shielding layer 121 made of Mo or Cu are simultaneously formed on the lower or upper glass substrate 23 or 22. The upper surface of each of the gate lines and the black matrices 88 is inclined to realize the smooth running of the ITO layer 82 and the alignment layer 86, such as the polyimide layer. The alignment layer 86 is formed to cover the entire structure. The distance between the center of the gate line and the center of the black matrix 88 is the above value LY/2, so that the pixels P21, P31 and P41 are defined, as shown in FIG. 20.

Regarding the structure on the upper glass substrate 22, the black matrices 89, the gate lines GU(X) and GU(X+1), the passivation layers 85, the display electrodes or the ITO layer 83 and the alignment layer 87 are formed on the upper glass substrate 22. Further, one color filter for one pixel is sandwiched between the ITO layer 83 and the alignment layer 87. For example, the red color filter 90R is formed for the pixel P11, P21, P31 and P41, since the same color is arranged in the vertical direction. The alignment layer 87 is formed on the color filters and the passivation layer 85. The angle between the rubbing direction of the alignment layer 86 and the rubbing direction of the alignment layer 87 is about 90 degrees, as in the conventional technology shown in FIG. 3. The twisted nematic liquid crystal, not shown, is sandwiched between the lower alignment layer 86 and the upper alignment layer 87, and is twisted between the alignment layer 86 and the alignment layer 87 by 90 degrees, when the voltage 0V is applied, as in the conventional technology shown in FIG. 3.

In this manner, a plurality of black matrices 89, each of which is positioned to face one gate line formed on the second or lower glass substrate 23, are formed in parallel to the gate lines on the first or upper glass substrate 22, and a plurality of black matrices 88, each of which is positioned to face one gate line formed on the upper glass substrate 22, are formed in parallel to the gate lines on the lower glass substrate 23. A plurality of color filters are formed on the upper glass substrate 22, and each of the color filters is formed at a position between the upper gate line and the black matrix. The center of the gate line and the center of the black matrix is spaced by the distance LY/2.

Figure 21:
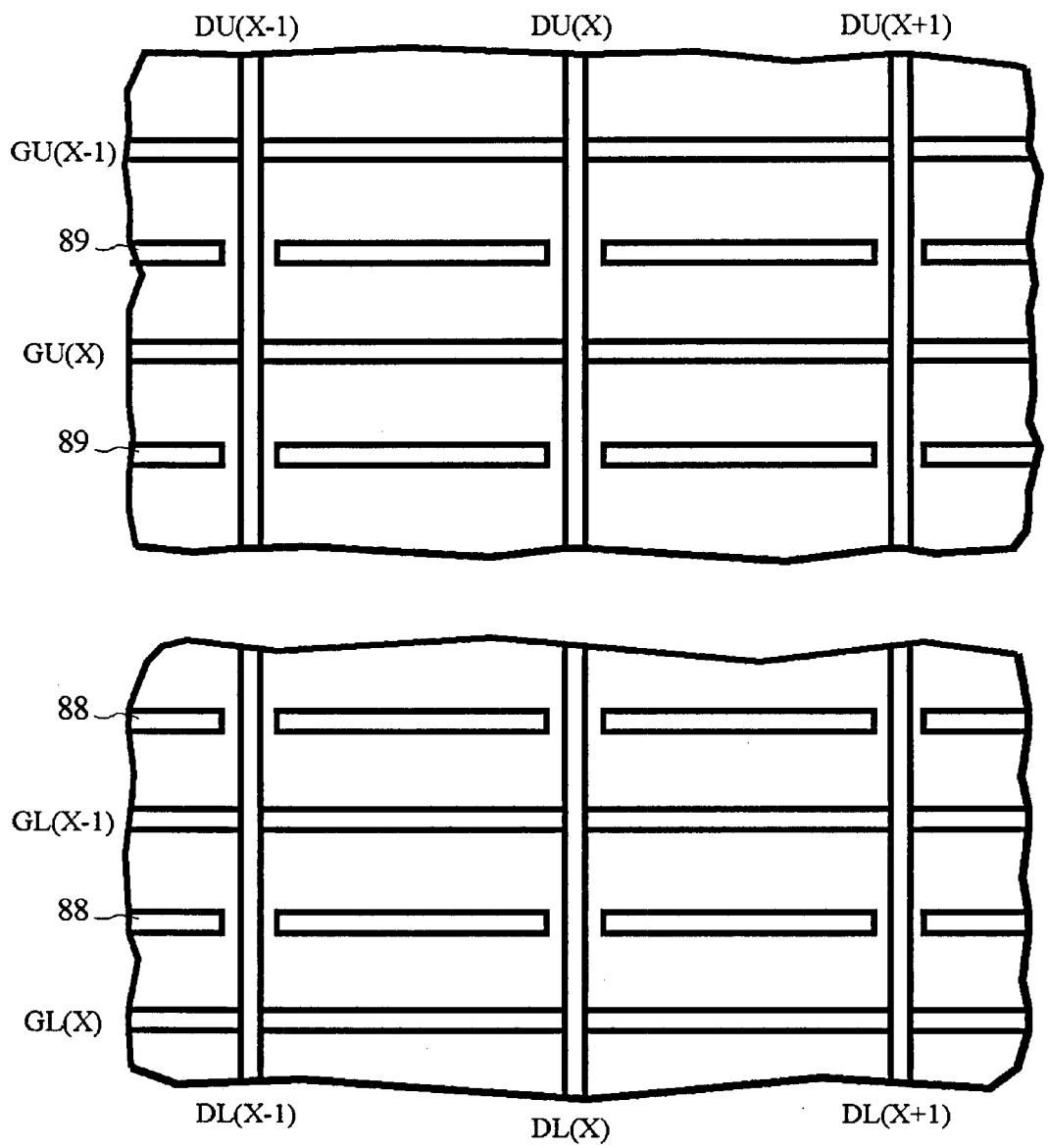
FIG. 21 shows the arrangement of the data lines and the gate lines on the upper and lower glass substrates 22 and 23.

FIG. 21 shows the arrangement of the data lines and the gate lines on the upper and the lower glass substrates 22 and 23. The data lines are separated from the gate lines and the black matrices by the insulating layers. It is noted that the TFT and the ITO layer in each of the pixel regions are not shown in FIG. 21 for simplifying the drawing. A plurality of black matrices 89, each of which is positioned to face one gate line formed on the lower glass substrate 23, are formed in parallel to the gate lines on the upper glass substrate 22, and a plurality of black matrices 88, each of which is positioned to face one gate line formed on the upper glass substrate 22, are formed in parallel to the gate lines on the lower glass substrate 23. Since if the black matrices 88 and 89 overlap with the data lines, undesired electric charges are stored in a capacitor constituted by the data line, the insulating material and the black matrix, each of the black matrices 88 and 89 are cut at a portion adjacent to the data line, as shown in FIG. 21.

The fabricating process of the third embodiment includes the first step through the sixth step of the first embodiment, but the first and third steps are modified, as follows.

First Step

When the reversed staggered type TFT, as shown in FIG. 26, is used as the switching element of the pixel region, the black matrices 88 (89) and the gate lines made of MoW are simultaneously formed on the lower or upper glass substrate 23 or 22. When the staggered type TFT, as shown in FIG. 27, is used as the switching element of the pixel region, the black matrices 122 and the light shielding layer 121 made of Mo or Cu are simultaneously formed on the lower or upper glass substrate 23 or 22. Further, a plurality of color filters are formed on the upper glass substrate 22, wherein each of the color filters is formed at a position between the upper gate line and the black matrix.

Third Step

Each of the pixel regions on the upper glass substrate 22 is shifted in the vertical direction (e.g., the direction along the data line) by a distance which is equal to half of the height (e.g., the length along the data line) of the pixel region with respect to the pixel region on the lower glass substrate 23. Each of the pixel regions on the upper glass substrate 22 is not shifted in the horizontal direction (i.e. the direction along the gate line) with respect to the pixel region on the lower glass substrate 23. The gate lines on the upper glass substrate 22 face the black matrices 88 on the lower glass substrate 23, respectively, and the gate lines on the lower glass substrate 23 face the black matrices 89 on the upper glass substrate 22, respectively.

Fourth Embodiment

Figure 22:
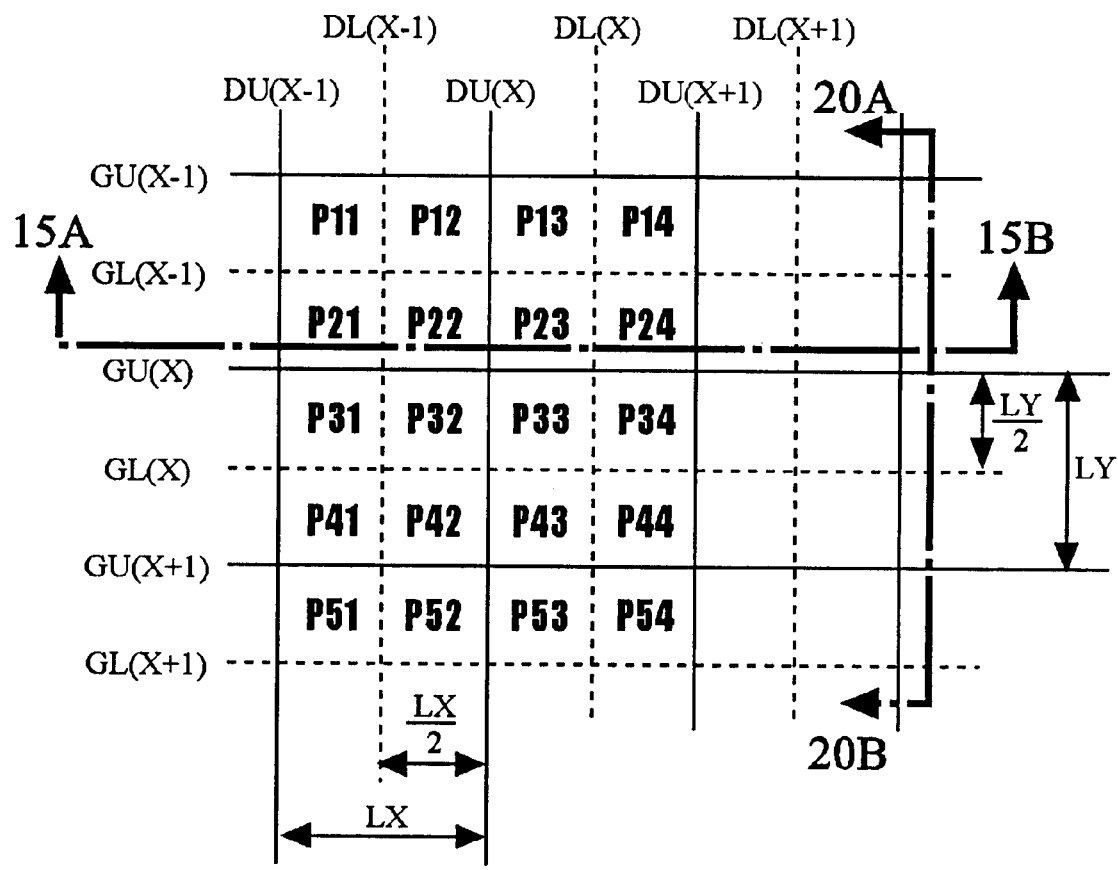
FIG. 22 shows the arrangement of the array on the first or upper glass substrate 22 and the array on the lower glass substrate 23 in a fourth embodiment of the present invention.
Figure 23:
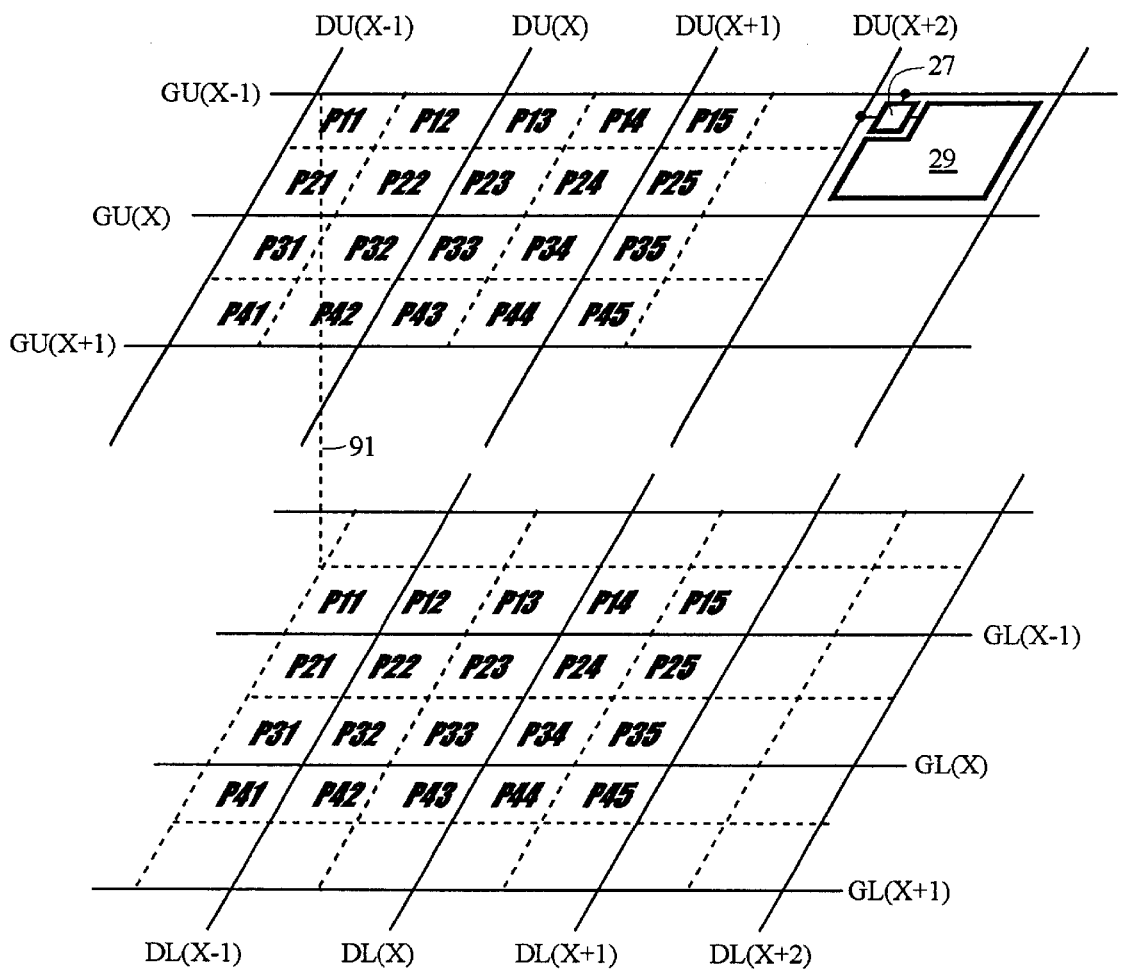
FIG. 23 shows the arrangement of the array on the first or upper glass substrate 22 and the array on the lower glass substrate 23 in the fourth embodiment of the present invention.

FIGS. 22 and 23 show the arrangement of the array on the first or upper glass substrate 22 and the array on the lower glass substrate 23 in the fourth embodiment of the present invention. It is noted that the structure of the LCD device of the fourth embodiment is substantially the same as that of the first embodiment except the positioning of the array of the first or upper glass substrate 22 with respect to the array of the lower glass substrate 23.

The fourth embodiment of the present invention increases the number of pixels in the horizontal direction along the gate lines viewed by the user to twice the number of pixels of the first embodiment, and increases the number of pixels in the vertical direction along the data lines viewed by the user to twice the number of pixels of the first embodiment. Thus, the total number of pixels is increased to four times the number of pixels of the first embodiment.

If the LCD panel has 1024 data lines and 768 gate lines and can display the 1024×768 pixels of XGA (Extended Graphic Array) scheme, the fourth embodiment can display the image on 2048×1536 pixels of QXGA (Quad Extended Graphic Array) scheme, without increasing the number of gate and data lines. If the LCD panel has 1280 data lines and the 1024 gate lines and can display the 1280×1024 pixels of SXGA (Supper Extended Graphic Array) scheme, the fourth embodiment can display the image on the 2560×2048 pixels of QSXGA (Quad Supper Extended Graphic Array) scheme, without increasing the number of gate and data lines.

In the fourth embodiment, each of the pixel regions on the upper glass substrate 22 is shifted, in the horizontal direction (e.g., the direction along the gate line), by a distance which is equal to half of the width (e.g., the length along the gate line) of the pixel region, and is shifted, in the vertical direction (e.g., the direction along the data line), by a distance which is equal to half of the height (e.g., the length along the data line) of the pixel region, with respect to the pixel region on the lower glass substrate 23. A distance between a center of one data line (e.g. DU(X−1) or DL(X−1)), and a center of next data line, (e.g. DU(X) or DL(X)) is the distance LX, and a distance between a center of one gate line (e.g. GU(X−1) or GL(X−1)), and a center of next gate line (e.g. GU(X) or GL(X)) is the distance LY.

Each of the gate lines on the upper glass substrate 22 is aligned to an intermediate position between the gate lines on the lower glass substrate 23, respectively, and each of the data lines on the upper glass substrate 22 is aligned to an intermediate position between the data lines on the lower glass substrate 23, respectively, as shown by the dashed lines 91 in FIG. 23. More particularly, the intermediate position between the gate lines is separated by LY/2 from a center of the gate line, and the intermediate position between the data lines is separated by LX/2 from a center of the data line. That is, the gate lines on the upper glass substrate 22 are shifted from the gate lines on the lower glass substrate 23, respectively in the vertical direction along the data lines by the distance LY/2, and the data lines on the upper glass substrate 22 are shifted from the data lines on the lower glass substrate 23, respectively in the horizontal direction along the gate lines by the distance LX/2.

As described before, the pixel array on each of the upper and lower glass substrate 22 and 23 includes a plurality of pixel regions, and each of the pixel regions is formed adjacent to each intersection of the gate line and the data lines, and the pixel region includes the display electrode 29 and the TFT 27, as shown in one pixel region in FIG. 23. By shifting the position of the data lines on the upper glass substrate 22 from the position of the data lines on the lower glass substrate 23, and shifting the position of the gate lines on the upper glass substrate 22 from the position of the gate lines on the lower glass substrate 23, one display electrode 29 on the upper and lower glass substrates is divided into the four pixel regions. One pixel region at the intersection of the gate line, for example GU(X−1), and the data line, for example DU(X−1), on the upper glass substrate 22 is divided in the horizontal and vertical directions to form four pixel regions (P11, P12, P21, P22), so that the number of pixels in the horizontal and vertical directions viewed by the user is increased to four times the number of pixels of the first embodiment.

Figure 24:
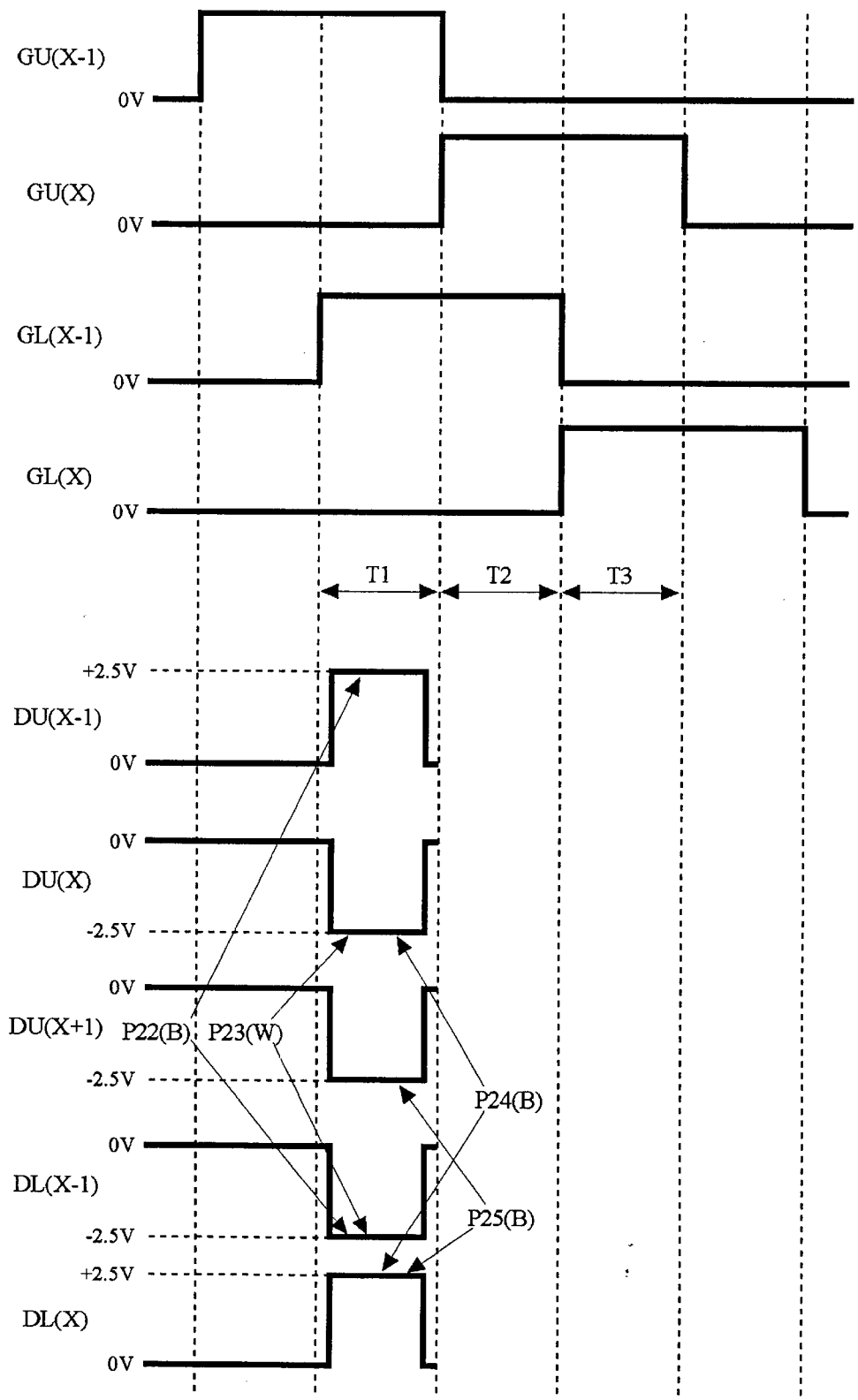
FIG. 24 shows the gate pulses and the data pulses applied to the gate lines and the data lines on the upper and lower glass substrates 22 and 23.

The operation of the fourth embodiment is described with reference to FIG. 24. FIG. 24 shows the gate pulses and the data pulses applied to the gate lines and the data lines on the upper and lower glass substrates 22 and 23. It is assumed that the pixel P22 displays the black image, the pixel P23 displays the white image, the pixel P24 displays the black image, and the pixel P25 displays the black image.

It is noted that the operation for displaying the image on the pixels in the fourth embodiment is based upon the combination of the operation of the second embodiment and the third embodiment. As described in the third embodiment, one pixel row including pixels P21, P22, P23, . . . , shown in FIG. 23 is displayed during the time period T1, shown in FIG. 24, one pixel line including pixels P31, P32, P33, . . . is displayed during the time period T2, and one pixel line including pixels P41, P42, P43, . . . is displayed during the time period T3. The selection of the voltage to the data lines on the upper and lower glass substrates 22 and 23 during the time period T is performed in the same manner as that in the second embodiment.

The Pixel P22 (Black Image)

The pixel P22 is constituted by the lower right portion of the upper pixel region at the intersection of the gate line GU(X−1) and the data line DU(X−1) and the upper left portion of the lower pixel region at the intersection of the gate line GL(X−1) and the data line DL(X−1). To display the black image, the voltage 5V is applied to the liquid crystal material, as shown in FIG. 3(B). It is assumed that the voltage +2.5V is applied to the data line DU(X−1). It is noted that the voltage applied to the data line DL(X−1) is selected based upon the value of the voltage on the data line DU(X−1). Therefore, during the time period T1, the voltage +2.5V is applied to the data line DU(X−1), and the voltage −2.5V is applied to the data line DL(X−1), as shown in FIG. 24.

The Pixel P23 (White Image)

The pixel P23 is constituted by the lower left portion of the upper pixel region at the intersection of the gate line GU(X−1) and the data line DU(X) and the upper right portion of the lower pixel region at the intersection of the gate line GL(X−1) and the data line DL(X−1). To display the white image, the voltage 0V is applied to the liquid crystal material, as shown in FIG. 3(A). Since the voltage −2.5V is applied to the data line DL(X−1), the voltage −2.5V is applied to the data line DU(X), during the time period T1.

The Pixel P24 (Black Image)

The pixel P24 is constituted by the lower right portion of the upper pixel region at the intersection of the gate line GU(X−1) and the data line DU(X) and the upper left portion of the lower pixel region at the intersection of the gate line GL(X−1) and the data line DL(X). To display the black image, the voltage 5V is applied to the liquid crystal material, as shown in FIG. 3(B). Since the voltage −2.5V is applied to the data line DU(X), the voltage +2.5V is applied to the data line DL(X), during the time period T1.

The Pixel P25 (Black Image)

The pixel P25 is constituted by the lower left portion of the upper pixel region at the intersection of the gate line GU(X−1) and the data line DU(X+1) and the upper right portion of the lower pixel region at the intersection of the gate line GL(X−1) and the data line DL(X). To display the black image, the voltage 5V is applied to the liquid crystal material, as shown in FIG. 3(B). Since the voltage +2.5V is applied to the data line DL(X), the voltage −2.5V is applied to the data line DU(X+1), during the time period T1.

Although the operation for displaying the image is described for only four pixels, the above operation is performed for all the pixels in the fourth embodiment.

The first and second data line drivers 45 and 46 shown in FIG. 8 simultaneously apply the above data signals to the upper and lower data lines during each of the time periods T1, T2, T3, . . . , respectively.

Since the fourth embodiment combines the second and third embodiments, the cross section of the upper and lower glass substrates 22 and 23 along the dashed line 15A–15B in FIG. 22 is substantially the same as the structure shown in FIG. 15 of the second embodiment, and the cross section of the upper and lower glass substrates 22 and 23 along the dashed line 20A–20B in FIG. 22 is substantially the same as the structure shown in FIG. 20 of the third embodiment.

Figure 25:
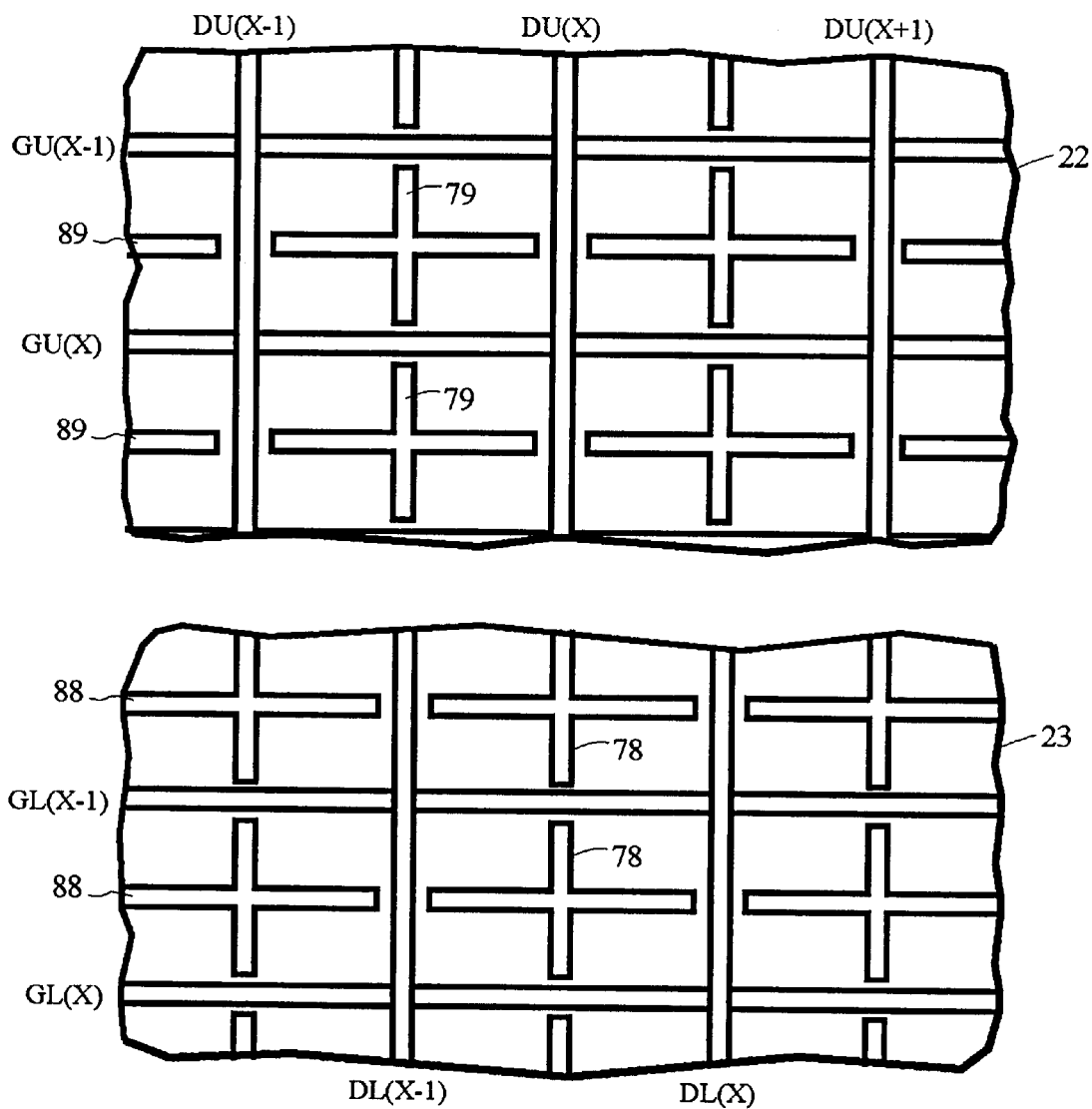
FIG. 25 shows the data lines, the gate lines and the black matrices on the upper and lower glass substrates 22 and 23.

FIG. 25 shows the data lines, the gate lines and the black matrices on the upper and lower glass substrates 22 and 23. The data lines and the gate lines are separated at their intersection by the insulating layers. The black matrix including the portions 78 and 88 is formed on the lower glass substrate 23 to face each of the data and gate lines on the upper glass substrate 22, and black matrix including the portions 79 and 89 is formed on the upper glass substrate 22 to face each of the data and gate lines on the lower glass substrate 23.

When the reversed staggered type TFT, as shown in FIG. 26, is used as the switching element of the pixel region, the black matrices 88 (89, 78, 79), which correspond to the black matrix 97 in FIG. 26, and the gate lines made of MoW are simultaneously formed on the lower or upper glass substrate 23 or 22. When the staggered type TFT, as shown in FIG. 27, is used as the switching element of the pixel region, the black matrix 88 (89, 78, 79), which correspond to the black matrices 122, and the light shielding layer 121 made of Mo or Cu are simultaneously formed on the lower or upper glass substrate 23 or 22. The alignment layer is formed to cover the entire structure. The black matrices 78 and 79, which extend in the perpendicular direction to the gate lines, are separated from the gate lines to prevent the shortage of the adjacent gate lines. The fabricating process of the fourth embodiment includes the first step through the sixth step of the first embodiment, but the first and third steps are modified, as follows.

First Step

When the reversed staggered type TFT, as shown in FIG. 26, is used as the switching element of the pixel region, the black matrices 88 (89, 78, 79) and the gate lines made of MoW are simultaneously formed on the lower or upper glass substrate 23 or 22. When the staggered type TFT, as shown in FIG. 27, is used as the switching element of the pixel region, the black matrix 88 (89,78,79), which correspond to the black matrices 122, and the light shielding layer 121 made of Mo or Cu are simultaneously formed on the lower or upper glass substrate 23 or 22. Further, a plurality of color filters are formed on the upper glass substrate 22.

Third Step

Each of the pixel regions on the upper glass substrate 22 is shifted, in the horizontal direction (e.g., the direction along the gate line) by a distance which is equal to half of the width (e.g., the length along the gate line) of the pixel region, and is shifted, in the vertical direction (e.g., the direction along the data line) by a distance which is equal to half of the height (e.g., the length along the data line) of the pixel region, with respect to the pixel region on the lower glass substrate 23.

FIG. 26 shows the structure of the pixel region using the reversed staggered type TFT, which can be used in the present invention. As described before, the pixel region is formed adjacent to each intersection of the gate line and the data line, and includes the TFT and the display electrode. It is noted that the size of the TFT is enlarged. The MoW layer is deposited on the transparent substrate or the glass substrate 95, and etched to simultaneously form the gate electrode 96 of the TFT, the gate line and the black matrix 97. In this etching process, the shoulder portions of the gate line, the gate electrode 96 and the black matrix 97 are tapered to realize the smooth processing of other layers on these layers 96 and 97. In the following embodiment using a vertical alignment (VA) liquid crystal material, the angle between the surface of the glass substrate 95 and the slope of the black matrix is selected to a range of 30±10 degrees.

A gate insulating layer 98 of $SiN_x$ is formed on the gate line, the gate electrode 96, the black matrix 97 and the exposed surface of the glass substrate 95. An island of an amorphous Si 99 is formed on the insulating layer 98. A channel stopper layer 104 is formed on the amorphous Si layer 99. An ohmic layer 100, such as N+ amorphous Si, is formed on the layer 104 and the amorphous Si layer 99 to expose a top portion of the channel stopper layer 104. The display electrode (e.g., the ITO layer) 103 is formed on the insulating layer 98. The three layers (e.g., Mo layer, Al layer and Mo layer) are formed on the structure, and are etched to form the data lines, the drain electrode 101 and the source electrode 102.

In the case of the first through fourth embodiments using the TN liquid crystal material, the alignment layer, not shown in FIG. 26, is formed on the structure. The passivation layers, such as $SiN_x$ layers, can be formed to cover the data lines, not shown, and to isolate the ITO layers from the data lines. The structure having the black matrix 97 formed in a portion of the display electrode 103, which can be used in the second through seventh embodiments. The reversed staggered type TFT without the black matrix 97 can be also used in the first embodiment.

FIG. 27 shows the structure of the pixel region using the staggered type TFT, which can be used in the present invention. As described before, the pixel region is formed adjacent to each intersection of the gate line and the data line, and includes the TFT and the display electrode. It is noted that the size of the TFT is enlarged. In the staggered type TFT, a light shielding layer, or the black matrix 121 is formed on the surface of the glass substrate 120 to prevent the light passing through the glass substrate 120 from being transmitted to the channel region of the TFT. Mo (molybdenum) or Cu is deposited on the transparent substrate or the glass substrate 120, and etched to simultaneously form the light shielding layer 121 and the black matrix 122. In this etching process, the shoulder portions of the light shielding layer 121 and black matrix 122 are tapered to realize the smooth processing of the layers on these layers 121 and 122. In the following embodiment using a vertical alignment (VA) liquid crystal material, the angle between the surface of the glass substrate 120 and the slope of the black matrix 122 is selected to a range of 30±10 degrees. An insulating layer 123 made of $SiN_x$ or $SiO_x$ is formed on the exposed surface of the glass substrate 120, the light shielding layer 121 and the black matrix 122. The display electrode (e.g., the ITO layer) 129 is formed on the insulating layer 123.

The three layers (e.g., Mo layer, Al layer and Mo layer) are formed on the structure, and are etched to form the data lines, the drain electrode 124 and the source electrode 125. An amorphous Si layer 126 is formed on the drain electrode 124, the source electrode 125 and an exposed surface of the insulating layer 123. A gate insulating layer 127 of SiNx is formed on the amorphous Si layer 126, and the gate electrode of MoW is formed on the gate insulating layer 127.

In the case of the first through fourth embodiments using the TN liquid crystal material, the alignment layer, not shown in FIG. 27, is formed on the structure. The passivation layers, such as $SiN_x$ layers, can be formed to cover the data lines, not shown, and to isolate the ITO layers from the data lines. The structure having the black matrix 122 formed in the portion of the display electrode 129, which can be used in the second through seventh embodiments. The staggered type TFT without the black matrix 122 can be also used in the first embodiment.

The following embodiments use a liquid crystal material known as the VA liquid crystal material which realizes a wide viewing angle. FIGS. 28(A) and 28(B) show the characteristic of the VA liquid crystal material. Referring to FIG. 28(A), the display electrodes or the ITO layers 106 are formed on the upper and lower glass substrates 22 and 23, respectively. The alignment layer required in the TN liquid crystal is not provided in the VA liquid crystal display device. The upper and lower polarizer plates 108 and 109 are mounted to sandwich the LCD panel. The backlight device, not shown in FIGS. 28(A) and 28(B), is arranged below the LCD panel. When the voltage is not applied across the upper and lower ITO layers 106, the VA liquid crystal molecules 107 tend to align in the direction which is perpendicular to the surface of the ITO layers 106 to display the black image.

When the voltage is applied across the upper and lower ITO layers 106, the VA liquid crystal molecules 107 tend to align in the direction which is substantially parallel to the surface of the ITO layers 106 to display the white image. It has been known that if the structures 105, each of which has sloped surfaces, are formed on the upper and lower glass substrates 22 and 23, as shown in FIG. 28(B), the VA liquid crystal molecules incline along the two directions to form two domains (e.g., domain 107A and domain 107B), and the two domains provide the wide viewing angle. The above characteristic of the VA liquid crystal material is described in the Japanese magazine, *Flat Panel Display*, 1998, pp. 146–149.

Fifth Embodiment

Figure 29:
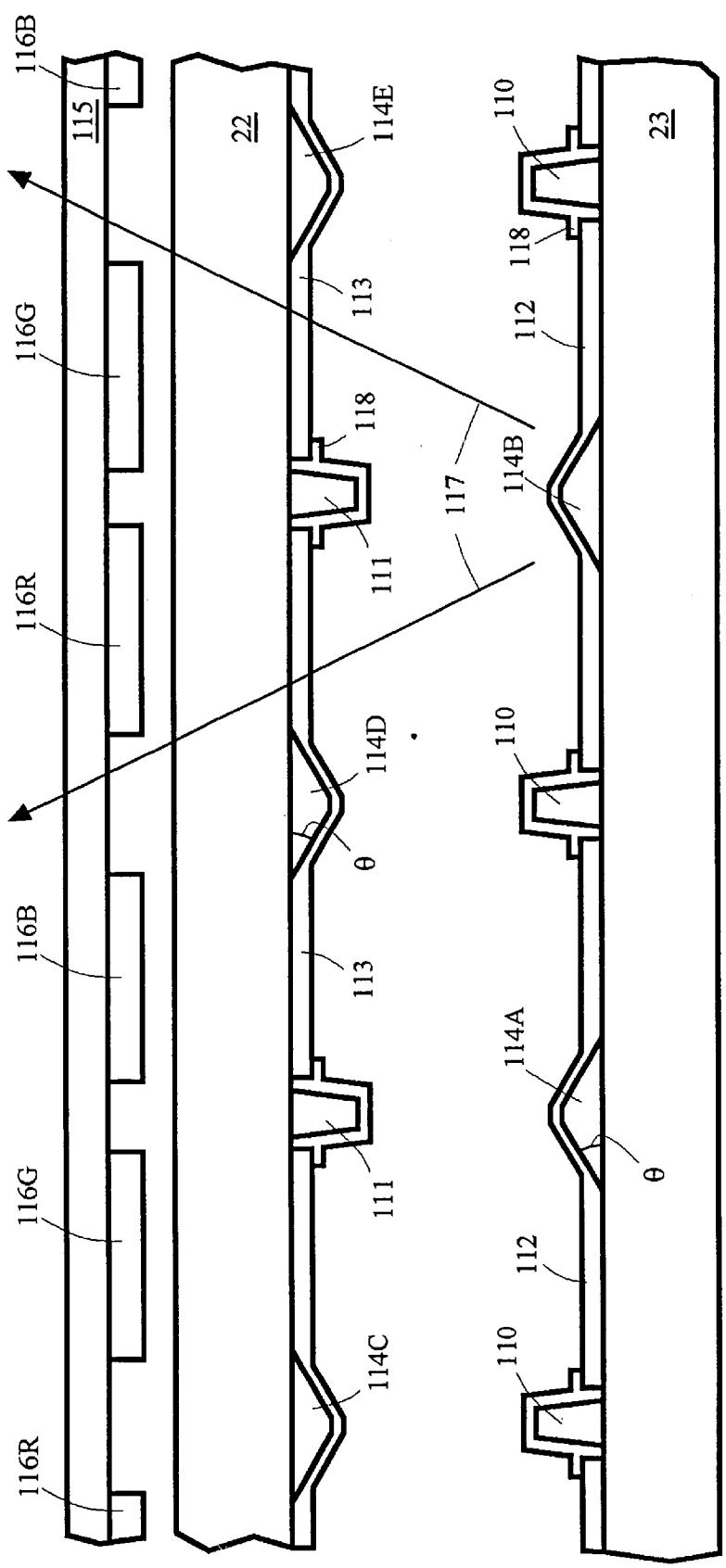
FIG. 29 shows a cross section of the structure formed on the upper and lower glass substrates 22 and 23.

FIG. 29 shows a cross section of the structure formed on the upper and lower glass substrates 22 and 23. In the fifth embodiment, the VA liquid crystal material is used, the alignment layer is not provided, and the positioning or positional shift of the upper glass substrate 22 and the lower glass substrate 23 is the same as that in the second embodiment.

That is, each of the pixel regions on the upper glass substrate 22 is shifted, in the horizontal direction (e.g., the direction along the gate line) by a distance which is equal to half of the width (e.g., the length along the gate line) of the pixel region with respect to the pixel region on the lower glass substrate 23. Each of the pixel regions on the upper glass substrate 22 is not shifted in the vertical direction (e.g., the direction along the data line) with respect to the pixel region on the lower glass substrate 23. That is, each of the pixel regions on the upper glass substrate 22 is aligned to the pixel region on the lower glass substrate 23 in the vertical direction.

This alignment is performed by aligning the gate lines on the upper glass substrate 22 to the gate lines on the lower glass substrate 23. That is, the gate lines on the upper glass substrate 22 are aligned to the gate lines on the lower glass substrate 23, respectively, and each of the data lines on the upper glass substrate 22 is aligned to an intermediate position between the data lines on the lower glass substrate 23, respectively. The intermediate position is separated by LX/2 from a center of the data line. That is, the data lines on the upper glass substrate 22 are shifted from the data lines on the lower glass substrate 23, respectively in the horizontal direction along the gate lines by the distance LX/2.

The data lines 110, the insulating layer 118, the black matrices 114A and 114B of the trapezoidal cross section, and the display electrode or the ITO layer 112 are formed on the lower glass substrate 23. The data lines 111, the insulating layer 118, the black matrices 114C, 114D and 114E of the trapezoidal cross section, and the ITO layer 113 are formed on the upper glass substrate 22. The VA liquid crystal material, not shown, is enclosed within the space between the upper and lower glass substrates 22 and 23. The VA liquid crystal molecules are aligned in the state shown in FIG. 28(B) at the turn off of the voltage applied across the ITO layer 112 and the ITO layer 113. Thus, the black image is viewed by the user in the direction shown by the lines 117, whereby the wide viewing angle is realized.

In the present invention, the angle between the surface of the glass substrate and the slope of the trapezoid like black matrix is selected to a range of 30±10 degrees to provide the widest viewing angle. The combination of the upper and lower glass substrates 22 and 23 shown in FIG. 29 provides the black and white LCD device. If a color display is required, a separate glass substrate 115 on which the color filters 116R, 116G and 116B are formed, can be bonded to the outside surface of the upper glass substrate 22 or the outside surface of the lower glass substrate 23 by a bonding agent. It is noted that the polarizer plates and the backlight device are provided in the LCD device of the fifth embodiment, but these are not shown in FIG. 29.

Sixth Embodiment

To provide the sixth embodiment, the fifth embodiment is modified to use the arrangement or the positional shift of the upper glass substrate 22 and the lower glass substrate 23 in the third embodiment. That is, each of the pixel regions on the upper glass substrate 22 is shifted, in the vertical direction (e.g., the direction along the data line) by a distance which is equal to half of the height (e.g., the length along the data line) of the pixel region with respect to the pixel region on the lower glass substrate 23. Each of the pixel regions on the upper glass substrate 22 is not shifted in the horizontal direction (e.g., the direction along the gate line) with respect to the pixel region on the lower glass substrate 23. That is, each of the pixel regions on the upper glass substrate 22 is aligned to the pixel region on the lower glass substrate 23 in the horizontal direction. This alignment is performed by aligning the data lines on the upper glass substrate 22 to the data lines on the lower glass substrate 23.

More particularly, the data lines on the upper glass substrate 22 are aligned to the data lines on the lower glass substrate 23, respectively, and each of the gate lines on the upper glass substrate 22 is aligned to an intermediate position between the gate lines on the lower glass substrate 23, respectively, as shown in FIG. 18. The intermediate position is separated by LY/2 from a center of the gate line. That is, the gate lines on the upper glass substrate 22 are shifted from the gate lines on the lower glass substrate 23, respectively in the vertical direction along the data lines by the distance LY/2.

Seventh Embodiment

To provide the seventh embodiment, the fifth embodiment is modified to use the arrangement or the positional shift of the upper glass substrate 22 and the lower glass substrate 23 in the fourth embodiment. That is, each of the pixel regions on the upper glass substrate 22 is shifted, in the horizontal direction (e.g., the direction along the gate line), by a distance which is equal to half of the width (e.g., the length along the gate line) of the pixel region, and is shifted, in the vertical direction (e.g., the direction along the data line), by a distance which is equal to half of the height (e.g., the length along the data line) of the pixel region, with respect to the pixel region on the lower glass substrate 23.

More particularly, each of the gate lines on the upper glass substrate 22 are aligned to an intermediate position between the gate lines on the lower glass substrate 23, respectively, and each of the data lines on the upper glass substrate 22 is aligned to an intermediate position between the data lines on the lower glass substrate 23, respectively, as shown in FIG. 23. More particularly, the intermediate position between the gate lines is separated by LY/2 from a center of the gate line, and the intermediate position between the data lines is separated by LX/2 from a center of the data line. That is, the gate lines on the upper glass substrate 22 are shifted from the gate lines on the lower glass substrate 23, respectively in the vertical direction along the data lines by the distance LY/2, and the data lines on the upper glass substrate 22 are shifted from the data lines on the lower glass substrate 23, respectively in the horizontal direction along the gate lines by the distance LX/2.

Although the color filters are formed on the upper glass substrate in the first, second, third and fourth embodiments, the color filters can be formed on the separate glass substrate 115, and this separate glass substrate 115 can be bonded to the outside surface of the upper glass substrate or the outside surface of the lower glass substrate by the bonding agent, as in the fifth, sixth and seventh embodiments. Although the color filters are formed on the separate glass substrate 115 in the fifth, sixth and seventh embodiments, the color filters can be formed on the upper glass substrate, as in the first, second, third and fourth embodiments.

Thus, as described above, the present invention provides an LCD device which can minimize, if not completely overcome, the degradation of image quality due to the dot defect or the line defect, can increase the number of pixels without increasing the number of data and gate lines, can realize a wide viewing angle and can decrease the voltage level of the output signals of the data line drivers in performing the H/V inversion scheme.

While the invention has been described in terms of preferred embodiments, those skilled in the art will recognize that the invention can be practiced with modification within the spirit and scope of the appended claims.

What is claimed is:

1. A liquid crystal display device, comprising:

a first transparent substrate having a first surface and a second surface; and a second transparent substrate having a first surface and a second surface, wherein said first transparent substrate and said second transparent substrate are arranged such that said first surface of said first transparent substrate faces said first surface of said second transparent substrate, and a liquid crystal material is enclosed between said first surface of said first transparent substrate and said first surface of said second transparent substrate, wherein a pixel array is formed on each of said first surface of said first transparent substrate and said first surface of said second transparent substrate, wherein each said pixel array comprises transistors, data lines and gate lines defining a plurality of pixel regions, and each pixel region comprises pixel electrode, wherein said plurality of pixel regions are arranged in row and column directions, wherein said data lines are arranged in one of said row and column directions, gate lines are arranged in the other direction of said row and column directions, and each of said pixel regions on said first transparent substrate is aligned with each of said pixel regions on said second transparent substrate, wherein said gate lines on said first transparent substrate are aligned with said gate lines on said second transparent substrate, respectively, and said data lines on said first transparent substrate are aligned with said data lines on said second transparent substrate, wherein said gate lines on said first surface of said first transparent substrate are connected to a first gate line driver, said data lines on said first surface of said first transparent substrate are connected to a first data line driver, said gate lines on said first surface of said second transparent substrate are connected to a second gate line driver, and said data lines on said first surface of said second transparent substrate are connected to a second data line driver, wherein each of said first and second transparent substrates has a top edge, a bottom edge, a left side edge and a right side edge.

wherein data line pads respectively connected to said data lines on said first transparent substrate are formed in a first area adjacent to one of said top edge and bottom edge of said first transparent substrate, gate line pads respectively connected to said gate lines on said first transparent substrate are formed in a second area adjacent to one of said left side edge and said right edge of said first transparent substrate, data line pads respectively connected to said data lines on said second transparent substrate are formed in a third area adjacent to the other of said top edge and said bottom edge of said second transparent substrate, and gate line pads respectively connected to said gate lines are formed in a fourth area adjacent to the other of said left edge and said right side edge of said second transparent substrate, wherein said first data line driver is connected to said data line pads in said first area, said first gate line driver is connected to said gate line pads in said second area, said second data line driver is connected to said data line pads in said third area, and said second gate line driver is connected to said gate line pads in said fourth area, wherein said liquid crystal material is switched from a first state, in which no voltage is applied, to a second state, in which a switching voltage is applied to said liquid crystal material, wherein said first gate line driver applies a gate pulse to a selected one gate line on said first transparent substrate, said second gate line driver applies a gate pulse to one gate line, which faces said selected one gate line, on said second transparent substrate, and said application of said two gate pulses are simultaneously performed, and wherein said first data line driver applies a data signal having a value, which is half of said switching voltage, to at least one data line on said first transparent substrate, during the application of said gate pulse to said gate line on said first transparent substrate, and said second data line driver applies a data signal having an amplitude, which is half of said switching voltage, to a data line on said second transparent substrate, which faces said one data line on said first transparent substrate, during the application of said gate pulse to said gate line on said second transparent substrate.

2. A liquid crystal display device according to claim 1, wherein said liquid crystal device further includes:

a memory for storing a dot defect information, which includes data representing the position of a defective pixel and an identifying data representing one of said first and second transparent substrates on which a pixel region of said defective pixel is formed; and a controller for responding to said dot defect information to increase a value of data signal applied to a pixel region, which is formed on the other of said first and second transparent substrates, of said defective pixel to the value of said switching voltage to said liquid crystal material.

3. A liquid crystal display device according to claim 2, wherein said controller determines whether said defective pixel requires an application of said switching voltage, or not, and if said defective pixel requires said application of said switching voltage, said controller increases said value of data signal applied to said pixel region, which is formed on the other of said first and second transparent substrates, of said defective pixel to said value of said switching voltage to said liquid crystal material.

4. A liquid crystal display device according to claim 1, wherein said liquid crystal device further includes:
   a memory for storing a data line defect information, which includes data representing the position of a defect on said data line and an identifying data representing one of said first and second transparent substrates on which said defective data line is formed; and
   a controller for responding to said data line defect information to increase a value of data signal applied to pixel regions, which are formed on the other of said first and second transparent substrates, of pixels affected by said data line defect to the value of said switching voltage to said liquid crystal material.

5. A liquid crystal display device according to claim 4, wherein said controller determines whether said pixels affected by said data line defect require an application of said switching voltage, or not, and
   if said pixels affected by said data line defect require said application of said switching voltage, said controller increases said value of data signal applied to pixel regions, which are formed on the other of said first and second transparent substrates, of said pixels affected by said data line defect, to said switching voltage to said liquid crystal material.

6. A liquid crystal display device according to claim 1, wherein said liquid crystal device further includes:
   a memory for storing a gate line defect information, which includes data representing the position of a defect on said gate line and an identifying data representing one of said first and second transparent substrates on which said defective gate line is formed; and
   a controller for responding to said gate line defect information to increase a value of data signal applied to pixel regions, which are formed on the other of said first and second transparent substrates, of pixels affected by said gate line defect to the value of said switching voltage to said liquid crystal material.

7. A liquid crystal display device according to claim 6, wherein said controller determines whether said pixels affected by said gate line defect require an application of said switching voltage, or not, and
   if said pixels affected by said gate line defect require said application of said switching voltage, said controller increases said value of data signal applied to said pixel regions, which are formed on the other of said first and second transparent substrates, of said pixels affected by said gate line defect, to said switching voltage to said liquid crystal material.

8. A liquid crystal display device, comprising:
   a first transparent substrate having a first surface and a second surface;
   a second transparent substrate having a first surface and a second surface;
      wherein said first transparent substrate and said second transparent substrate are arranged such that said first surface of said first transparent substrate faces said first surface of said second transparent substrate, and a liquid crystal material is enclosed between said first surface of said first transparent substrate and said first surface of said second transparent substrate,
      wherein a pixel array is formed on each of said fist surface of said first transparent substrate and said fist surface of said second transparent substrate,
      wherein each said pixel array comprises transistors, data lines and gate lines defining a plurality of pixel regions, and each pixel region comprises a pixel electrode, and
      wherein said plurality of pixel regions are arranged in row and column directions;
   a first gate line driver connected to said gate lines on said first transparent substrate; and
   a second gate line driver connected to said gate lines on said second transparent substrate, wherein said first gate line driver applies a gate pulse to a selected one gate line and said second gate line driver applies a gate pulse to one gate line simultaneously.

9. A liquid crystal display device, comprising:
   a first transparent substrate having a first surface and a second surface;
   a second transparent substrate having a first surface and a second surface;
      wherein said first transparent substrate and said second transparent substrate are arranged such that said first surface of said first transparent substrate faces said first surface of said second transparent substrate, and a liquid crystal material is enclosed between said first surface of said first transparent substrate and said first surface of said second transparent substrate,
      wherein a pixel array is formed on each of said first surface of said first transparent substrate and said first surface of said second transparent substrate,
      wherein each said pixel array comprises transistors, data lines and gate lines defining a plurality of pixel regions, and each pixel region comprises a pixel electrode, and
      wherein said plurality of pixel regions are arranged in row and column directions;
   a first data line driver connected to said data lines on said first transparent substrate; and
   a second data line driver connected to said data lines on said second transparent substrate, wherein one of said first data line driver and said second data line driver applies a voltage which is half of a switching voltage to at least one data line.

10. A method for fabricating a liquid crystal display device, comprising:
   (a) forming a pixel array in which a plurality of pixel regions are arranged in row and column directions and a data signal is applied to said pixel regions through data lines, in each of a first portion and a second portion of one transparent substrate, wherein each pixel array comprises gate lines and wherein each pixel region comprises a pixel electrode;
   (b) cutting said transparent substrate into said first portion and said second portion;
   (c) arranging said first portion and said second portion such that said pixel array on said first portion faces said pixel array on said second portion;
   (d) bonding said first portion and said second portion at a sealing area to surround said pixel arrays on said first and second portions; and
   (e) filling a liquid crystal material into a space surrounded by said sealing area.

11. A method for fabricating a liquid crystal display device according to claim 10, wherein, in said pixel array, data lines are arranged in one of said row and column directions, gate lines are arranged in the other direction of said row and column directions, and each of said pixel regions is formed at a region adjacent to each intersection of said gate line and said data lines, respectively, and wherein each of said pixel regions includes a display electrode and a thin film transistor connected between said gate and data lines and said display electrode.

12. A method for fabricating a liquid crystal display panel according to claim 11, wherein each of said first and second portions has a top edge, a bottom edge, a left side edge and a right side edge, and wherein, in said step (a), data line pads connected to said data lines on said first portion, respectively, are formed in a first area adjacent to one of said top edge and said bottom edge of said first portion, gate line pads connected to said gate lines on said first portion, respectively, are formed in a second area adjacent to one of said left side edge and said right side edge of said first portion, data line pads connected to said data lines on said second portion, respectively, are formed in a third area adjacent to the other of said top edge and said bottom edge of said second portion, and gate line pads connected to said gate lines on said second portion, respectively, are formed in a fourth area adjacent to the other of said left side edge and said right side edge of said second portion.

13. A method for fabricating a liquid crystal display panel according to claim 12, wherein said method further includes:

connecting a first data line driver to said data line pads in said first area;

connecting a first gate line driver to said gate line pads in said second area;

connecting a second data line driver to said data line pads in said third area; and connecting a second gate line driver to said gate line pads in said fourth area.

14. A method for fabricating a liquid crystal display panel according to claim 11, wherein, in said step (c), said first portion and said second portion are arranged to align said gate lines n said first portion with said gate lines on said second portion, respectively, and to align said data lines on said first portion with said data lines on said second portion, respectively.

15. A method for fabricating a liquid crystal display panel according to claim 11, wherein, in said step (c), each of said pixel regions on said first portion is shifted with respect to each of said pixel regions on said second portion, in the direction along said gate lines, by a distance which is half of a width of said pixel region along said gate lines.

16. A method for fabricating a liquid crystal display panel according to claim 11, wherein, in said step (a), a plurality of black matrices, each of which is positioned to face one data line on said second portion, are formed on said first portion, and a plurality of black matrices, each of which is positioned to face one data line on said first portion, are formed on said second portion.

17. A method for fabricating a liquid crystal display panel according to claim 16, wherein said thin film transistor comprises a reversed staggered type thin film transistor, and wherein, in said step (a), gate electrodes of said reversed staggered type thin film transistors and a plurality of black matrices are simultaneously formed on said first and second portions.

18. A method for fabricating a liquid crystal display panel according to claim 16, wherein said thin film transistor comprises a staggered type thin film transistor which includes a light shielding layer below a gate electrode, and wherein, in said step (a), said light shielding layers of said staggered type thin film transistors and a plurality of black matrices are simultaneously formed on said first and second portions.

19. A method for fabricating a liquid crystal display panel according to claims 11, wherein, in said step (a), a plurality of color filters are formed on said first portion, and wherein each of said color filters is formed at a position between said data line and said black matrix.

20. A method for fabricating a liquid crystal display panel according to claim 11, wherein, in said step (c), each of said pixel regions on said first portion is shifted with respect to each of said pixel regions on said second portion, in the direction along said data lines, by a distance which is half of a height of said pixel region along said data lines.

21. A method for fabricating a liquid crystal display panel according to claim 11, wherein, in said step (a), a plurality of black matrices, each of which is positioned to face one gate line on said second portion, are formed on said first portion, and a plurality of black matrices, each of which is positioned to face one gate line on said first portion, are formed on said second portion.

22. A method for fabricating a liquid crystal display panel according to claim 21, wherein said thin film transistor comprises a reversed staggered type thin film transistor, and wherein, in said step (a), gate electrodes of said reversed staggered type thin film transistors and a plurality of black matrices are simultaneously formed on said first and second portions.

23. A method for fabricating a liquid crystal display panel according to claim 21, wherein said thin film transistor comprises a staggered type thin film transistor which includes a light shielding layer below a gate electrode, and wherein, in said step (a), said light shielding layers of said staggered type thin film transistors and a plurality of black matrices are simultaneously formed on said first and second portions.

24. A method for fabricating a liquid crystal display panel according to claim 11, wherein, in said step (a), a plurality of color filters are formed on said first portion, and wherein each of said color filters is formed at a position between said gate line and said black matrix.

25. A method for fabricating a liquid crystal display panel according to claim 11, wherein, in said step (c), each of said pixel regions on said first portion is shifted, in the direction along said gate lines, by a distance which is half of a width of said pixel region along said gate lines, and is shifted, in the direction along said data lines, by a distance which is half of a height of said pixel region along said data lines, with respect to said pixel regions on said second portion.

26. A method for fabricating a liquid crystal display panel according to claim 11, wherein, in said step (a), a plurality of black matrices, each of which is positioned to face one data line and one gate line on said second portion, are formed on said first portion, and a plurality of black matrices, each of which is positioned to face one data line and one gate line on said first portion, are formed on said second portion.

27. A method for fabricating a liquid crystal display panel according to claim 26, wherein said thin film transistor comprises a reversed staggered type thin film transistor, and wherein, in said step (a), gate electrodes of said reversed staggered type thin film transistors and a plurality of black matrices are simultaneously on said first and second portions.

28. A method for fabricating a liquid crystal display panel according to claim 26, wherein said thin film transistor comprises a staggered type thin film transistor which includes a light shielding layer below a gate electrode, and wherein, in said step (a), said light shielding layers of said staggered type thin film transistors and a plurality of black matrices are simultaneously on said first and second portions.

* * * * *